US009436911B2

(12) United States Patent
Spagnola

(10) Patent No.: US 9,436,911 B2
(45) Date of Patent: Sep. 6, 2016

(54) NEURAL NETWORKING SYSTEM AND METHODS

(71) Applicant: Perry M. Spagnola, Phoenix, AZ (US)

(72) Inventor: Perry M. Spagnola, Phoenix, AZ (US)

(73) Assignee: PEARSON EDUCATION, INC., New York, NY (US)

( * ) Notice: Subject to any disclaimer, the term of this patent is extended or adjusted under 35 U.S.C. 154(b) by 0 days.

(21) Appl. No.: 14/754,337

(22) Filed: Jun. 29, 2015

(65) Prior Publication Data

US 2016/0055410 A1    Feb. 25, 2016

Related U.S. Application Data

(63) Continuation-in-part of application No. 14/724,620, filed on May 28, 2015, now Pat. No. 9,288,056, and a continuation-in-part of application No. 14/089,432, filed on Nov. 25, 2013, and a continuation-in-part of application No. 14/137,890, filed on Dec. 20, 2013, and a continuation-in-part of application No. 14/154,050, filed on Jan. 13, 2014, and a continuation-in-part of application No. 14/524,948, filed on Oct. 27, 2014, which is a continuation-in-part of application No. 14/154,050, filed on Jan. 13, 2014, and a continuation-in-part of application No. 14/137,890, filed on Dec. 20, 2013, and a continuation-in-part of application No. 14/089,432, filed on Nov. 25, 2013, application No. 14/754,337, which is a continuation-in-part of application No. 14/614,279, filed on Feb. 4, 2015, which is a continuation of application No. 13/655,507, filed on Oct. 19, 2012, now Pat. No. 8,984,650, application No. 14/754,337, which is a continuation-in-part of application No. 14/144,437, filed on Dec. 30, 2013, now abandoned.

(60) Provisional application No. 61/895,556, filed on Oct. 25, 2013.

(51) Int. Cl.
*G06N 3/08* (2006.01)
*G06F 17/16* (2006.01)

(52) U.S. Cl.
CPC ............... *G06N 3/08* (2013.01); *G06F 17/16* (2013.01)

(58) Field of Classification Search
None
See application file for complete search history.

(56) References Cited

U.S. PATENT DOCUMENTS

| 4,175,339 | A | 11/1979 | Jones | |
|---|---|---|---|---|
| 6,484,010 | B1 * | 11/2002 | Sheehan | G09B 7/02 434/118 |
| 8,641,424 | B2 | 2/2014 | Soldavini | |
| 2002/0160347 | A1 | 10/2002 | Wallace | |
| 2004/0083229 | A1 | 4/2004 | Porter | |
| 2006/0257841 | A1 | 11/2006 | Mangano | |
| 2009/0170058 | A1 | 7/2009 | Walker | |
| 2010/0143873 | A1 * | 6/2010 | Keim | G09B 5/00 434/156 |
| 2011/0189643 | A1 | 8/2011 | Hutchinson | |
| 2012/0040326 | A1 * | 2/2012 | Larson-Rutter | G09B 5/00 434/350 |
| 2012/0231438 | A1 | 9/2012 | Fakhrai | |
| 2014/0310729 | A1 | 10/2014 | Chaniotakis | |

OTHER PUBLICATIONS

First Action Interview Pilot Program Pre-Interview Communication dated Sep. 3, 2015, in U.S. Appl. No. 14/788,228, 23 pages.
Applicant-Initiated Interview Summary dated Oct. 29, 2015, in U.S. Appl. No. 14/788,228, 13 pages.

*Primary Examiner* — Kakali Chaki
*Assistant Examiner* — Eric Nilsson
(74) *Attorney, Agent, or Firm* — Kilpatrick Townsend & Stockton LLP

(57) ABSTRACT

A method/apparatus/system for generating a request for improvement of a data object in a neural network is described herein. The neural network contains a plurality of data objects each made of an aggregation of content. The data objects of the neural network are interconnected based on one or several skill levels embodied in the content of the data objects via a plurality of connecting vectors. These connecting vectors can be generated and/or modified based on data collected from the iterative transversal of the connecting vectors by one or several users of the neural network.

20 Claims, 24 Drawing Sheets

NEURAL NETWORKING SYSTEM AND METHODS

BACKGROUND OF THE INVENTION

This application is a continuation-in-part of U.S. application Ser. No. 14/724,620, filed on May 28, 2015; this application is a continuation-in-part of U.S. application Ser. No. 14/089,432, filed on Nov. 25, 2013; this application is a continuation-in-part of U.S. application Ser. No. 14/137,890, filed on Dec. 20, 2013; this application is a continuation-in-part of U.S. application Ser. No. 14/154,050, filed on Jan. 13, 2014; this application is a continuation-in-part of U.S. application Ser. No. 14/524,948, filed on Oct. 27, 2014, which is a continuation-in-part of U.S. application Ser. No. 14/154,050, filed on Jan. 13, 2014, and which is a continuation-in-part of U.S. application Ser. No. 14/137,890, filed on Dec. 20, 2013, and which is a continuation-in-part of U.S. application Ser. No. 14/089,432, filed on Nov. 25, 2013, and which claims the benefit of U.S. Provisional Application No. 61/895,556 filed on Oct. 25, 2013; this application is a continuation-in-part of U.S. application Ser. No. 14/614,279, filed on Feb. 4, 2015, which is a continuation of U.S. application Ser. No. 13/655,507, filed on Oct. 19, 2012; and this application is a continuation-in-part of U.S. application Ser. No. 14/144,437, filed on Dec. 30, 2013.

BACKGROUND OF THE INVENTION

This disclosure relates in general to gaming and in particular to machine learning. Machine learning is a subfield of computer science that evolved from the study of pattern recognition and computational learning theory in artificial intelligence. Machine learning explores the construction and study of algorithms that can learn from and make predictions on data. Such algorithms operate by building a model from example inputs in order to make data-driven predictions or decisions, rather than following strictly static program instructions.

Machine learning is closely related to and often overlaps with computational statistics; a discipline that also specializes in prediction-making. It has strong ties to mathematical optimization, which deliver methods, theory and application domains to the field. Machine learning is employed in a range of computing tasks where designing and programming explicit, rule-based algorithms is infeasible. Example applications include spam filtering, optical character recognition (OCR), search engines and computer vision. Machine learning is sometimes conflated with data mining, although that focuses more on exploratory data analysis.

Machine learning and pattern recognition can be viewed as two facets of the same field. When employed in industrial contexts, machine learning methods may be referred to as predictive analytics or predictive modelling.

In machine learning and cognitive science, artificial neural networks (ANNs) are a family of statistical learning models inspired by biological neural networks (the central nervous systems of animals, in particular the brain) and are used to estimate or approximate functions that can depend on a large number of inputs and are generally unknown. Artificial neural networks are generally presented as systems of interconnected "neurons" which send messages to each other. The connections have numeric weights that can be tuned based on experience, making neural nets adaptive to inputs and capable of learning.

Like other machine learning methods—systems that learn from data—neural networks have been used to solve a wide variety of tasks that are hard to solve using ordinary rule-based programming, including computer vision and speech recognition.

While neural networking provides many advantages, its use is limited in many fields, and thus its potential remains unharnessed. This is particularly the case in selective content distribution. Accordingly, new methods and techniques for the application of machine learning and neural networking are desired.

BRIEF SUMMARY OF THE INVENTION

One aspect of the present disclosure relates to a machine learning system for generating a request for improvement of a data object in a neural network. The machine learning system includes a database server including data identifying a plurality of data objects including an aggregation of content associated with an assessment. In some embodiments, the plurality of data objects are included in a neural network. The database can include information associated with the data objects and identifying an aspect of the therewith associated data object. The machine learning system can include a content management server that can be controlled by software code to identify a set of the plurality of data objects, output a query requesting information relating to at least one of the set of the plurality of data objects from the database server, and identify a plurality of connecting vectors. In some embodiments, each of the plurality of connecting vectors connects at least two of the set of the plurality of data objects in a prerequisite relationship. In some embodiments, each of the plurality of connecting vectors includes a direction identifying the hierarchy of the prerequisite relationship and a magnitude, and in some embodiments, the magnitude of at least one of the plurality of connecting vector is the aggregate of binary indicators based on a user experience with the at least one of the plurality of connecting vectors generated via machine learning from iterated traversals of the connecting vector. The content management server that can be controlled by software code to determine a deficiency in the content of at least one of the data objects based on the magnitude of at least one connecting vector of the at least one of the data objects.

In some embodiments, determining a deficiency in the content of at least one of the data objects based on the magnitude of at least one connecting vector of the at least one of the data objects can include retrieving a strength threshold value, which strength threshold value indicates a minimum acceptable strength, and comparing the magnitude of at least some of the plurality of connecting vectors to the strength threshold value. In some embodiments, determining a deficiency in the content of at least one of the data objects based on the magnitude of at least one connecting vector of the at least one of the data objects includes assigning a value to the connecting vectors of the plurality of connecting vectors according to a Boolean function.

In some embodiments, a first value is assigned to one of the connecting vectors of the plurality of connecting vectors if the strength of the one of the connecting vectors of the plurality of connecting vectors exceeds the strength threshold value, and a second value is assigned to one of the connecting vectors of the plurality of connecting vectors if the strength of the one of the connecting vectors of the plurality of connecting vectors does not exceed the strength threshold value.

In some embodiments, the content management server can be controlled by software code to output a message indicating a deficiency in the at least one of the data objects if the connecting vector associated with the data object is assigned the second value. In some embodiments, the content management server can be controlled by software code to identify connecting vectors assigned the second value. In some embodiments, content management server that can be controlled by software code to relatively rank the plurality of connecting vectors. In some embodiments, content management server that can be controlled by software code to relatively rank the plurality of connecting vectors according to the degree to which users successfully traverse the plurality of connecting vectors. In some embodiments, the strength threshold value identifies a minimum acceptable relative rank.

In some embodiments, content management server that can be controlled by software code to identify a set of the plurality of connecting vectors, which connecting vectors in the set of the plurality of connecting vectors have stabilized. In some embodiments, determining a deficiency in the content of the at least one of the data objects based on the magnitude of at least one connecting vector of the at least one of the data objects comprises selecting at least one of the connecting vectors from the set of the plurality of connecting vectors and identifying the at least one of the data objects that is connected by the connecting vector.

One aspect of the present disclosure relates to a method of generating a request for improvement of a data object in a neural network. The method includes identifying a plurality of data objects stored in at least one database. In some embodiments, each of the data objects includes an aggregation of content associated with an assessment, and in some embodiments, the plurality of data objects are included in a neural network. The method can include identifying a plurality of connecting vectors stored in at least one vector database. In some embodiments, each of the plurality of connecting vectors connects two of the plurality of data objects and identifies a prerequisite relationship between the connected two of the plurality of data objects. In some embodiments, each of the plurality of connecting vectors comprises a direction identifying the prerequisite relationship and a magnitude. In some embodiments, the magnitude of at least one of the plurality of connecting vector is the aggregate of binary indicators based on a user experience with the at least one of the plurality of connecting vectors generated via machine learning from iterated traversals of the connecting vector. The method can include determining a deficiency in the content of at least one of the data objects based on the magnitude of at least one connecting vector of the at least one of the data objects.

In some embodiments, determining a deficiency in the content of at least one of the data objects based on the magnitude of at least one connecting vector of the at least one of the data objects can include retrieving a strength threshold value, which strength threshold value indicates a minimum acceptable strength, and comparing the magnitude of at least some of the plurality of connecting vectors to the strength threshold value. In some embodiments, determining a deficiency in the content of at least one of the data objects based on the magnitude of at least one connecting vector of the at least one of the data objects includes assigning a value to the connecting vectors of the plurality of connecting vectors according to a Boolean function. In some embodiments, a first value can be assigned to one of the connecting vectors of the plurality of connecting vectors if the strength of the one of the connecting vectors of the plurality of connecting vectors exceeds the strength threshold value, and a second value can be assigned to one of the connecting vectors of the plurality of connecting vectors if the strength of the one of the connecting vectors of the plurality of connecting vectors does not exceed the strength threshold value.

In some embodiments, the method includes outputting a message indicating a deficiency in a data object if the connecting vector associated with the data object is assigned the second value. In some embodiments, the binary indicators are generated for successful traversal of the connecting vector and for failed traversals of the connecting vector. In some embodiments, the method includes identifying connecting vectors assigned the second value. In some embodiments, the method includes relatively ranking the plurality of connecting vectors. In some embodiments, the plurality of connecting vector are relatively ranked according to the degree to which students successfully traverse the plurality of connecting vectors. In some embodiments, the strength threshold value identifies a minimum acceptable relative rank.

In some embodiments, the method includes identifying a set of the plurality of connecting vectors. In some embodiments, the connecting vectors in the set of the plurality of connecting vectors have stabilized. In some embodiments, determining a deficiency in the content of the at least one of the data objects based on the magnitude of at least one connecting vector of the at least one of the data objects includes selecting at least one of the connecting vectors from the set of the plurality of connecting vectors and identifying the at least one of the data objects that is connected by the connecting vector.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

Figure 1:
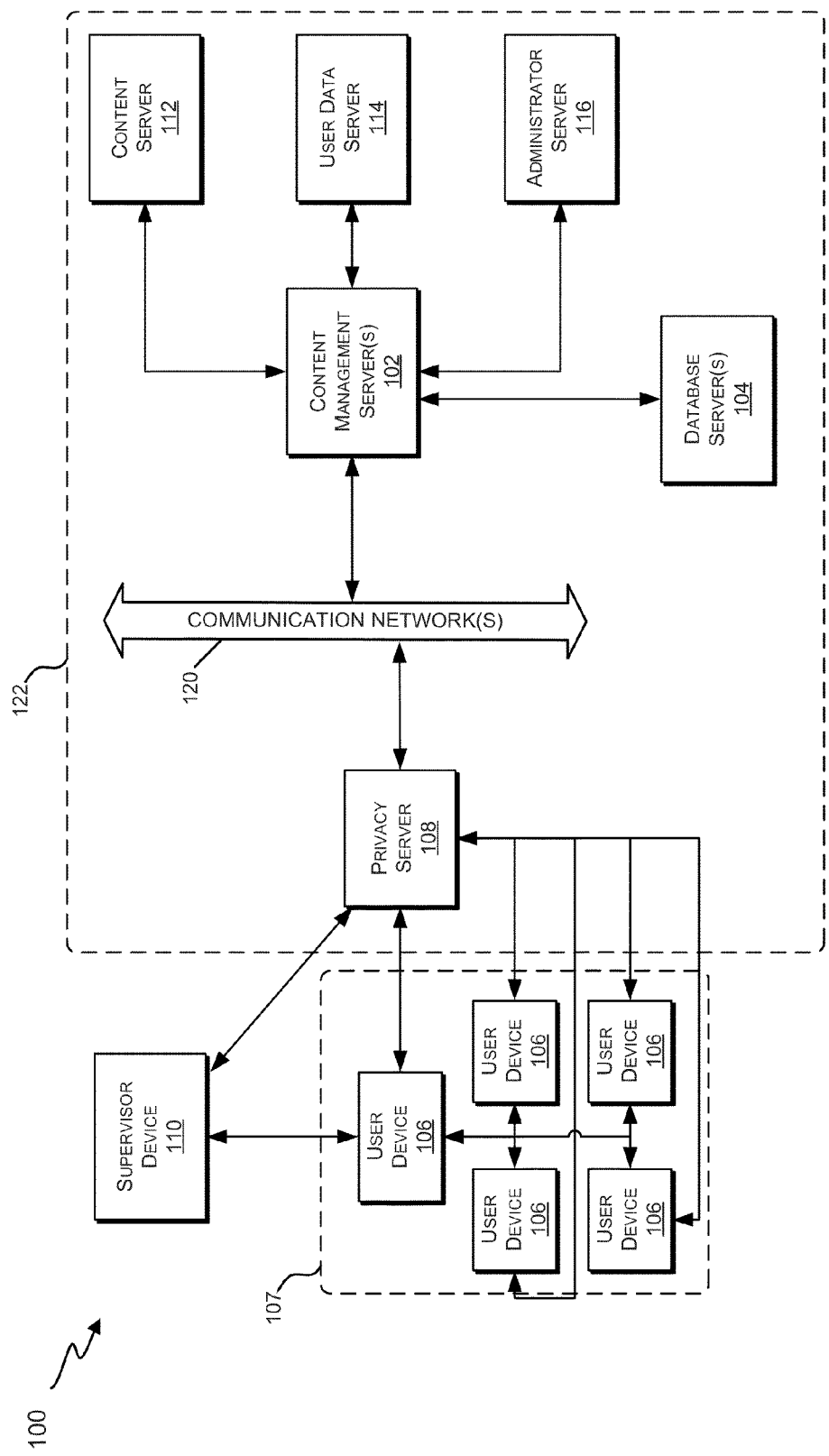
FIG. 1 is a block diagram showing illustrating an example of a neural network management system.

In the appended figures, similar components and/or features may have the same reference label. Where the reference label is used in the specification, the description is applicable to any one of the similar components having the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The ensuing description provides illustrative embodiment(s) only and is not intended to limit the scope, applicability or configuration of the disclosure. Rather, the ensuing description of the illustrative embodiment(s) will provide those skilled in the art with an enabling description for implementing a preferred exemplary embodiment. It is understood that various changes can be made in the function and arrangement of elements without departing from the spirit and scope as set forth in the appended claims.

In one embodiment the present disclosure relates to systems and methods for generating a knowledge network, also referred to herein as a neural network, that can be a multidimensional knowledge network, with machine learning and neural networking techniques. As used herein, a "neural network" refers to a dynamically interconnected group of nodes, akin to the vast network of neurons in a brain, wherein the strength of the connections between the nodes is determined based on the ongoing stimulation of the neural network. As used herein "neural networking" refers to any function performed on or with a neural network.

This knowledge network can include a plurality of data objects linked by connecting vectors. The magnitudes of these connecting vectors can be automatically modified as one or several users of the knowledge network transverse these connecting vectors. Thus, through data gathered via the transversal of these connecting vectors, the neural network that is the knowledge network can be modified and/or updated. Thus, the knowledge network created according to the embodiments disclosed herein is self-modifying and self-adapting based on the attributes of the users transversing the connecting vectors and their performance in transversing the connecting vectors.

The knowledge network, also referred to herein as an object network, can be, for example, a healthcare object network, a gaming object network and/or a learning object network. The multidimensional object network can be generated by identifying multiple levels and dimensions of connectivity between a plurality of objects in the object network, and can, in some embodiments, include the identification of multiple levels and dimensions of connectivity between a first object and other objects in the object network.

The objects in the object network can be connected according to their content. These connections can provide for a progression of content such as is contained and/or described in a plot, a syllabus, a story chart, or the like. These interconnections between objects can create multiple paths with which the object network can be traversed. These multiple paths can have different traits and/or attributes and can thus have different effects on one or several individuals traversing each of the paths. In some embodiments these different traits and/or attributes can include, for example, different skills and/or skillsets taught by traversing one of the paths, different learning and/or learning experiences received by traversing one of the paths, or the like.

In some embodiments, one or several of the objects of the object network can be defined by one or several dimensions that can describe the content of the one or several objects, the level of the one or several objects, or the like. These dimensions can be used to create the interconnections within the object network, and/or these dimensions can be used to link one or several objects across object networks. Specifically, a first object can be connected with one or several other objects, some or all of which other objects are in object networks other than the object network of the first object. Such connecting can result in the interlinking of a plurality of object networks based on these one or several dimensions of one or several objects.

The objects can include content that can include learning content and assessment content. The content can be organized into one or several content objects, which content objects, will be discussed at greater length below. The content can be selected to teach the skills and/or material for successfully completing the assessment. The assessment can include interactive features, such as, for example, an opponent, one or several questions, or the like, that can be used to evaluate the degree to which the user learned and/or mastered one or several skills and/or material.

The objects, and particularly, the content and/or the assessment of the objects can have one or several levels that describe the degree of difficulty associated with one or several aspects of the object. In some embodiments, one or several of the aspects of the content of the object can be the primary aspect evaluated in the assessment, and one or several of the aspects of the content can be non-primary aspects evaluated by the assessment and/or can be unevaluated by the assessment.

By way of example, in one embodiment the object contains written material used to teach a skill. The written material can be described by a first level, such as a lexile level, and the skill can be described by a second level. In this example, as the level of the written material is not primarily evaluated in the assessment, this level is described as a non-subject level or alternatively as a subject-independent level. Such non-subject levels can include, for example, a lexile level, a quantile level, or the like. In contrast, the second level is the primarily evaluated in the assessment, and is described as a subject level.

In some embodiments, the object can be linked with one or several objects either in or outside of the object network according to the one or several levels associated with the object. In some embodiments, for example, the object can be linked to one or several other objects according to one or several subject levels and/or according to one or several non-subject levels. These levels can be described by the one or several dimensions mentioned above.

In some embodiments, an object, a content object, topic of the content object, or the like can be evaluated and a skill level thereof can be identified. The identified skill level of an object, a content object, or the like, can be used to identify one or several objects, one or several content objects, and/or one or several topics of the one or several content objects having a skill level that is either lower or higher than the identified skill level.

In some embodiments, vectors can be established between the evaluated object, content object, topic, or the like and the identified objects, content objects, topics, or the like. In some embodiments, these vectors can indicate a prerequisite relationship between the evaluated and the identified one or several objects, the one or several content objects of the one or several objects, and/or the topics.

Information relating to the degree to which the user learned and/or mastered one or several skills and/or material can be stored in a database. This information can be aggregated from a large number of users and can be used to identify how a specific user can best move through the object network to achieve a desired goal, how objects in the object network can be linked, and/or to identify objects in the object network that can be improved, and how those identified objects in the object network can be improved.

The object network is created using a number of networked devices. These can include multiple servers at multiple locations, and a large number of user devices via which users access the object network. Particularly, the object network can be created from content having multiple authors and/or sources of control, and thus the creation of the object network can include the creation of a physical network of linked servers under different sources of control. In such embodiments, the physical connecting of these servers can roughly correspond with the connectivity of the object network. These servers can include one or several content servers that can contain the objects of the object network, one or several servers that can contain information relating to vectors connecting the object of the object network, and/or one or several servers containing user information.

In some embodiments, the interaction between large numbers of users and the networked devices hosting the object network can be transformed into massive amounts of data that can be stored in one or several database servers. This data can relate to one or several traits of the users, to one or several traits of the objects and/or the object network, or the like. This aggregated data can be used to select routes for individual users through the object network, which route will provide the greatest likelihood of achieving a desired result.

With reference now to FIG. 1, a block diagram is shown illustrating various components of a neural network content distribution system 100 which implements and supports certain embodiments and features described herein. The neural network content distribution system 100 can be, for example, used for the management of a knowledge network, which knowledge network can contain one or several data objects that can be capable of machine learning to modify and/or update the interconnections between the one or several data objects. The neural network content distribution system 100 can be an aggregation of interconnected hardware devices that can together store the objects, also referred to herein as data objects, gaming objects and/or learning objects, that form one or several object networks. The neural network content distribution system 100 can be used to generate one or several vectors, also referred to herein as one or several gaming vectors and/or learning vectors, which vectors connect the objects of the object network, the neural network content distribution system 100 can determine one or several paths through the object network and recommend these one or several paths to users, and the neural network content distribution system 100 can identify weak objects within the object network.

The neural network content distribution system 100 collects, receives, and stores data relating to the actions of one or several users within the object network, which object network can be a learning object network and/or a gamified learning object network. In some embodiments, the object network can include a plurality of data objects, such as learning objects, which data objects are linked in prerequisite relationships via a plurality of vectors, which can be, for example, learning vectors. The neural network content distribution system 100 utilizes this data to create, maintain, and update connecting vectors connecting data objects within the object network. In some embodiments, the connecting vectors can be updated based on the success and/or failure of a user in traversing the connecting vector, the context of the connecting vector, and/or the user context. In some embodiments, the connecting vector context, as referred to herein as the vector context or the gaming vector context, can be the aggregated information relating to the connecting vector. This can include identification of the prerequisite relationship between the data objects directly connected by the connecting vector, the magnitude of the connecting vector, the strength of the connecting vector, and/or any other desired parameter of the connecting vector. In some embodiments, the strength of the connecting vector context can vary based on the user context. Thus, in some embodiments, the strength and/or magnitude of the connecting vector can vary with respect to different user contexts. Thus, some user contexts may correspond to an increased strength and/or magnitude of the connecting vector whereas other user contexts may correspond to a decreased strength and/or magnitude of the connecting vector.

The neural network content distribution system 100 may include one or more content management servers 102. As discussed below in more detail, content management servers 102 may be any desired type of server including, for example, a rack server, a tower server, a miniature server, a blade server, a mini rack server, a mobile server, an ultradense server, a super server, or the like, and may include various hardware components, for example, a motherboard, a processing units, memory systems, hard drives, network interfaces, power supplies, etc. Content management server 102 may include one or more server farms, clusters, or any other appropriate arrangement and/or combination or computer servers. Content management server 102 may act according to stored instructions located in a memory subsystem of the server 102, and may run an operating system, including any commercially available server operating system and/or any other operating systems discussed herein.

The neural network content distribution system 100 may include one or more databases servers 104, also referred to herein as databases. The database servers 104 can access data that can be stored on a variety of hardware components. These hardware components can include, for example, components forming tier 0 storage, components forming tier 1 storage, components forming tier 2 storage, and/or any other tier of storage. In some embodiments, tier 0 storage refers to storage that is the fastest tier of storage in the database server 104, and particularly, the tier 0 storage is the fastest storage that is not RAM or cache memory. In some embodiments, the tier 0 memory can be embodied in solid state memory such as, for example, a solid-state drive (SSD) and/or flash memory.

In some embodiments, the tier 1 storage refers to storage that is one or several higher performing systems in the memory management system, and that is relatively slower than tier 0 memory, and relatively faster than other tiers of memory. The tier 1 memory can be one or several hard disks that can be, for example, high-performance hard disks. These hard disks can be one or both of physically or communicatingly connected such as, for example, by one or several fiber channels. In some embodiments, the one or several disks can be arranged into a disk storage system, and specifically can be arranged into an enterprise class disk storage system. The disk storage system can include any desired level of redundancy to protect data stored therein, and in one embodiment, the disk storage system can be made with grid architecture that creates parallelism for uniform allocation of system resources and balanced data distribution.

In some embodiments, the tier 2 storage refers to storage that includes one or several relatively lower performing systems in the memory management system, as compared to the tier 1 and tier 2 storages. Thus, tier 2 memory is relatively slower than tier 1 and tier 0 memories. Tier 2 memory can include one or several SATA-drives or one or several NL-SATA drives.

In some embodiments, the one or several hardware and/or software components of the database server 104 can be arranged into one or several storage area networks (SAN), which one or several storage area networks can be one or several dedicated networks that provide access to data storage, and particularly that provides access to consolidated, block level data storage. A SAN typically has its own network of storage devices that are generally not accessible through the local area network (LAN) by other devices. The SAN allows access to these devices in a manner such that these devices appear to be locally attached to the user device.

Databases 104 may comprise stored data relevant to the functions of the neural network content distribution system 100. Illustrative examples of databases 104 that may be maintained in certain embodiments of the neural network content distribution system 100 are described below in reference to FIG. 3. In some embodiments, multiple databases may reside on a single database server 104, either using the same storage components of server 104 or using different physical storage components to assure data security and integrity between databases. In other embodiments, each database may have a separate dedicated database server 104.

The neural network content distribution system 100 also may include one or more user devices 106 and/or supervisor devices 110. User devices 106 and supervisor devices 110 may display content received via the neural network content distribution system 100, and may support various types of user interactions with the content. In some embodiments, the user devices 106 and the supervisor devices 110 can be configured to access data in, edit data in, retrieve data from, and/or provide data to the neural network management system.

User devices 106 and supervisor devices 110 may include mobile devices such as smartphones, tablet computers, personal digital assistants, and wearable computing devices. Such mobile devices may run a variety of mobile operating systems, and may be enabled for Internet, e-mail, short message service (SMS), Bluetooth®, mobile radio-frequency identification (M-RFID), and/or other communication protocols. Other user devices 106 and supervisor devices 110 may be general purpose personal computers or special-purpose computing devices including, by way of example, personal computers, laptop computers, workstation computers, projection devices, and interactive room display systems. Additionally, user devices 106 and supervisor devices 110 may be any other electronic devices, such as thin-client computers, Internet-enabled gaming system, business or home appliances, and/or personal messaging devices, capable of communicating over network(s) 120. In some embodiments, the designated role of a device, including a user device 106 or a supervisor device 110 can vary based on the identity of the user using that device. Thus, in some embodiments, both user and supervisor devices 106, 110 can include the same hardware, but can be configured as one of a user device 106 or a supervisor device 110 at the time of log-in by a user to use that device.

In different contexts of neural network management systems 100, user devices 106 and supervisor devices 110 may correspond to different types of specialized devices, for example, student devices and teacher devices in an educational network, employee devices and presentation devices in a company network, different gaming devices in a gaming network, etc. In some embodiments, user devices 106 and supervisor devices 110 may operate in the same physical location 107, such as a classroom or conference room. In such cases, the devices may contain components that support direct communications with other nearby devices, such as a wireless transceivers and wireless communications interfaces, Ethernet sockets or other Local Area Network (LAN) interfaces, etc. In other implementations, the user devices 106 and supervisor devices 110 need not be used at the same location 107, but may be used in remote geographic locations in which each user device 106 and supervisor device 110 may use security features and/or specialized hardware (e.g., hardware-accelerated SSL and HTTPS, WS-Security, firewalls, etc.) to communicate with the content management server 102 and/or other remotely located user devices 106. Additionally, different user devices 106 and supervisor devices 110 may be assigned different designated roles, such as presenter devices, teacher devices, administrator devices, or the like, and in such cases the different devices may be provided with additional hardware and/or software components to provide content and support user capabilities not available to the other devices.

In some embodiments, the neural network content distribution system 100 can include a large number of devices 106, 110 such as, for example, 100, 500, 1,000, 2,000, 4,000, 6,000, 8,000, 10,000, 50,000, 100,000, 250,000, 1,000,000, 5,000,000, 10,000,000, 100,000,000, 500,000,000 and/or any other or intermediate number of devices 106, 110. In some embodiments, the large number of devices 106, 110 can enable the functioning of the neural network management systems 100. Specifically, the large number of devices 106, 110 can allow a large number of users to interact with the neural network management systems 100 to thereby generate the data volume to enable performing of the methods and processes discussed at length below. In some embodiments, this volume of data can be so large that it cannot be processed by human. Such a volume of data is referred to herein as a massive data volume. The details and function of the user devices 106 will be discussed at greater length in reference to FIG. 6 below.

The neural network content distribution system 100 also may include a privacy server 108 that maintains private user information at the privacy server 108 while using applications or services hosted on other servers. For example, the privacy server 108 may be used to maintain private data of a user within one jurisdiction even though the user is accessing an application hosted on a server (e.g., the content management server 102) located outside the jurisdiction. In such cases, the privacy server 108 may intercept communications between a user device 106 or supervisor device 110 and other devices that include private user information. The privacy server 108 may create a token or identifier that does not disclose the private information and may use the token or identifier when communicating with the other servers and systems, instead of using the user's private information.

As illustrated in FIG. 1, the content management server 102 may be in communication with one or more additional servers, also referred to herein as one or several data sources, such as a content server 112, a user data server 112, and/or an administrator server 116. The one or more additional servers can be the source of the one or several data objects, learning objects, content objects, assessment objects, or the like, and can be the source of some or all of the user information stored within the user profile database 140.

Each of these servers may include some or all of the same physical and logical components as the content management server(s) 102, and in some cases, the hardware and software components of these servers 112-116 may be incorporated into the content management server(s) 102, rather than being implemented as separate computer servers.

Content server 112 may include hardware and software components to generate, store, and maintain the content resources for distribution to user devices 106 and other devices in the system 100. For example, in neural network management systems 100 used for professional training and educational purposes, content server 112 may include databases of training materials, presentations, interactive programs and simulations, course models, course outlines, and various training interfaces that correspond to different materials and/or different types of user devices 106. In neural network management systems 100 used for media distribution, interactive gaming, and the like, a content server 112 may include media content files such as music, movies, television programming, games, and advertisements.

User data server 114 may include hardware and software components that store and process data for multiple users relating to each user's activities and usage of the neural network content distribution system 100. For example, the content management server 102 may record and track each user's system usage, including their user device 106, content resources accessed, and interactions with other user devices 106. This data may be stored and processed by the user data server 114, to support user tracking and analysis features. For instance, in the professional training and educational contexts, the user data server 114 may store and analyze each user's training materials viewed, presentations attended, courses completed, interactions, evaluation results, and the like. The user data server 114 may also include a repository for user-generated material, such as evaluations and tests completed by users, and documents and assignments prepared by users. In the context of media distribution and interactive gaming, the user data server 114 may store and process resource access data for multiple users (e.g., content titles accessed, access times, data usage amounts, gaming histories, user devices and device types, etc.).

Administrator server 116 may include hardware and software components to initiate various administrative functions at the content management server 102 and other components within the neural network content distribution system 100. For example, the administrator server 116 may monitor device status and performance for the various servers, databases, and/or user devices 106 in the neural network content distribution system 100. When necessary, the administrator server 116 may add or remove devices from the system 100, and perform device maintenance such as providing software updates to the devices in the system 100. Various administrative tools on the administrator server 116 may allow authorized users to set user access permissions to various content resources, monitor resource usage by users and devices 106, and perform analyses and generate reports on specific network users and/or devices (e.g., resource usage tracking reports, training evaluations, etc.).

The neural network content distribution system 100 may include one or more communication networks 120. Although only a single network 120 is identified in FIG. 1, the neural network content distribution system 100 may include any number of different communication networks between any of the computer servers and devices shown in FIG. 1 and/or other devices described herein. Communication networks 120 may enable communication between the various computing devices, servers, and other components of the neural network content distribution system 100. As discussed below, various implementations of neural network management systems 100 may employ different types of networks 120, for example, computer networks, telecommunications networks, wireless networks, and/or any combination of these and/or other networks.

In some embodiments, some of the components of the neural network content distribution system 100 can belong to the neural network management system 122. The neural network management system 122 can include, for example, the content management server 102, the database server 104, the privacy server 108, the content server 112, the user data server 114, the administrator server 116, and/or the communication network 120. The neural network management system 122 can be the source of content distributed by the neural network content distribution system 100, which content can include, for example, one or several documents and/or applications or programs. These documents and/or applications or programs are digital content. In some embodiments, these one or several documents and/or applications or programs can include, for example, one or several webpages, presentations, papers, videos, charts, graphs, books, written work, figures, images, graphics, recordings, applets, scripts, or the like.

Figure 2:
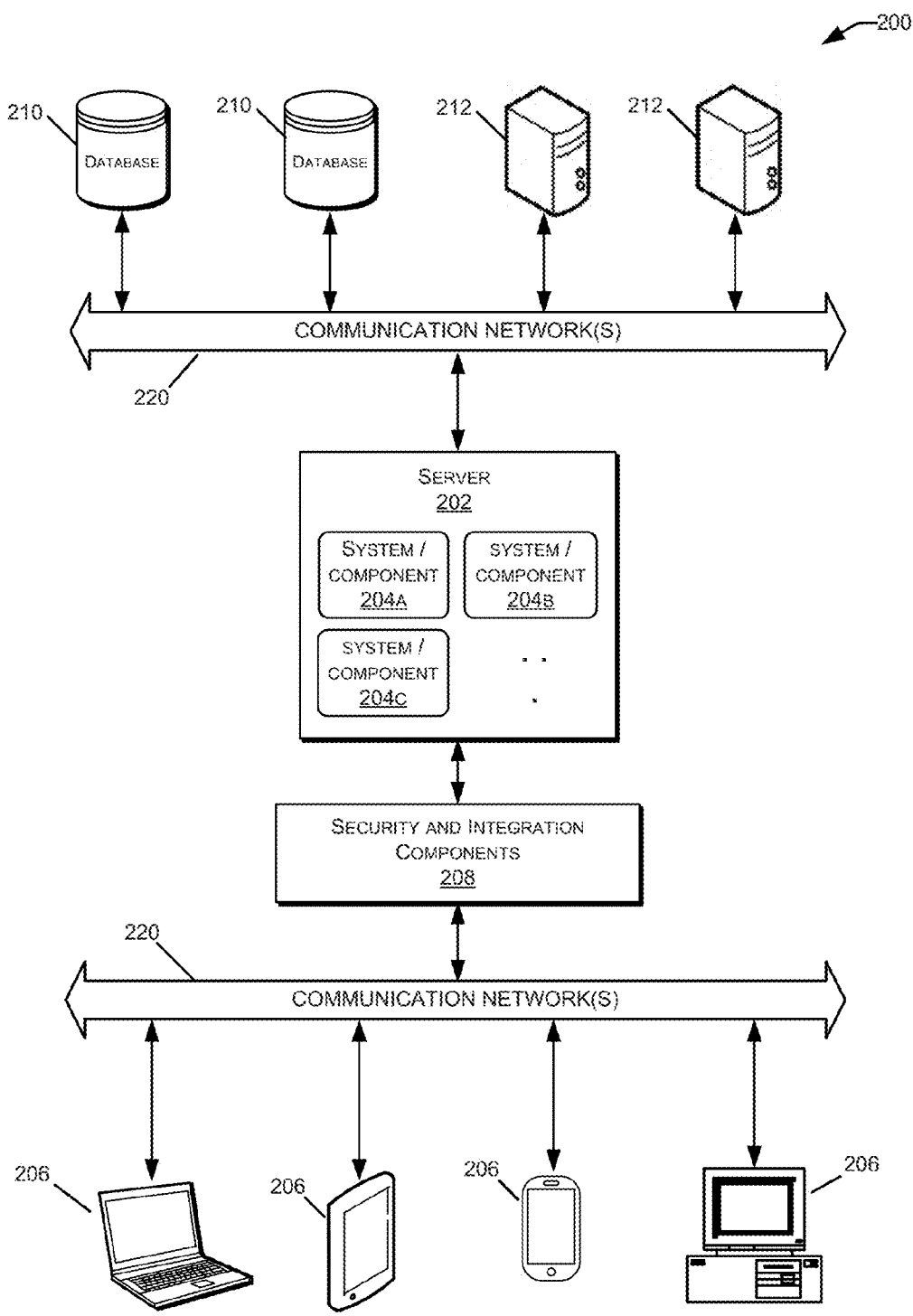
FIG. 2 is a block diagram illustrating a computer server and computing environment within a neural network management system.

With reference to FIG. 2, an illustrative distributed computing environment 200 is shown including a computer server 202, four client computing devices 206, and other components that may implement certain embodiments and features described herein. In some embodiments, the server 202 may correspond to the content management server 102 discussed above in FIG. 1, and the client computing devices 206 may correspond to the user devices 106. However, the computing environment 200 illustrated in FIG. 2 may correspond to any other combination of devices and servers configured to implement a client-server model or other distributed computing architecture.

Client devices 206 may be configured to receive and execute client applications over one or more networks 220. Such client applications may be web browser based applications and/or standalone software applications, such as mobile device applications. Server 202 may be communicatively coupled with the client devices 206 via one or more communication networks 220. Client devices 206 may receive client applications from server 202 or from other application providers (e.g., public or private application stores). Server 202 may be configured to run one or more server software applications or services, for example, web-based or cloud-based services, to support content distribution and interaction with client devices 206. Users operating client devices 206 may in turn utilize one or more client applications (e.g., virtual client applications) to interact with server 202 to utilize the services provided by these components.

Various different subsystems and/or components 204 may be implemented on server 202. Users operating the client devices 206 may initiate one or more client applications to use services provided by these subsystems and components. The subsystems and components within the server 202 and client devices 206 may be implemented in hardware, firmware, software, or combinations thereof. Various different system configurations are possible in different distributed computing systems 200 and neural network management systems 100. The embodiment shown in FIG. 2 is thus one example of a distributed computing system and is not intended to be limiting.

Although exemplary computing environment 200 is shown with four client computing devices 206, any number of client computing devices may be supported. Other devices, such as specialized sensor devices, etc., may interact with client devices 206 and/or server 202.

As shown in FIG. 2, various security and integration components 208 may be used to send and manage communications between the server 202 and user devices 206 over one or more communication networks 220. The security and integration components 208 may include separate servers, such as web servers and/or authentication servers, and/or specialized networking components, such as firewalls, routers, gateways, load balancers, and the like. In some cases, the security and integration components 208 may correspond to a set of dedicated hardware and/or software operating at the same physical location and under the control of same entities as server 202. For example, components 208 may include one or more dedicated web servers and network hardware in a datacenter or a cloud infrastructure. In other examples, the security and integration components 208 may correspond to separate hardware and software components which may be operated at a separate physical location and/or by a separate entity.

Security and integration components 208 may implement various security features for data transmission and storage, such as authenticating users and restricting access to unknown or unauthorized users. In various implementations, security and integration components 208 may provide, for example, a file-based integration scheme or a service-based integration scheme for transmitting data between the various devices in the neural network content distribution system 100. Security and integration components 208 also may use secure data transmission protocols and/or encryption for data transfers, for example, File Transfer Protocol (FTP), Secure File Transfer Protocol (SFTP), and/or Pretty Good Privacy (PGP) encryption.

In some embodiments, one or more web services may be implemented within the security and integration components 208 and/or elsewhere within the neural network content distribution system 100. Such web services, including cross-domain and/or cross-platform web services, may be developed for enterprise use in accordance with various web service standards, such as the Web Service Interoperability (WS-I) guidelines. For example, some web services may use the Secure Sockets Layer (SSL) or Transport Layer Security (TLS) protocol to provide secure connections between the server 202 and user devices 206. SSL or TLS may use HTTP or HTTPS to provide authentication and confidentiality. In other examples, web services may be implemented using the WS-Security standard, which provides for secure SOAP messages using XML encryption. In other examples, the security and integration components 208 may include specialized hardware for providing secure web services. For example, security and integration components 208 may include secure network appliances having built-in features such as hardware-accelerated SSL and HTTPS, WS-Security, and firewalls. Such specialized hardware may be installed and configured in front of any web servers, so that any external devices may communicate directly with the specialized hardware.

Communication network(s) 220 may be any type of network familiar to those skilled in the art that can support data communications using any of a variety of commercially-available protocols, including without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), and the like. Merely by way of example, network(s) 220 may be local area networks (LAN), such as one based on Ethernet, Token-Ring and/or the like. Network(s) 220 also may be wide-area networks, such as the Internet. Networks 220 may include telecommunication networks such as a public switched telephone networks (PSTNs), or virtual networks such as an intranet or an extranet Infrared and wireless networks (e.g., using the Institute of Electrical and Electronics (IEEE) 802.11 protocol suite or other wireless protocols) also may be included in networks 220.

Computing environment 200 also may include one or more databases 210 and/or back-end servers 212. In certain examples, the databases 210 may correspond to database server(s) 104, the local data server 109, and/or the customizer data server 128 discussed above in FIG. 1, and back-end servers 212 may correspond to the various back-end servers 112-116. Databases 210 and servers 212 may reside in the same datacenter or may operate at a remote location from server 202. In some cases, one or more databases 210 may reside on a non-transitory storage medium within the server 202. Other databases 210 and back-end servers 212 may be remote from server 202 and configured to communicate with server 202 via one or more networks 220. In certain embodiments, databases 210 and back-end servers 212 may reside in a storage-area network (SAN). In some embodiments, the computing environment can be replicated for each of the networks 105, 122, 104 discussed with respect to FIG. 1 above.

Figure 3:
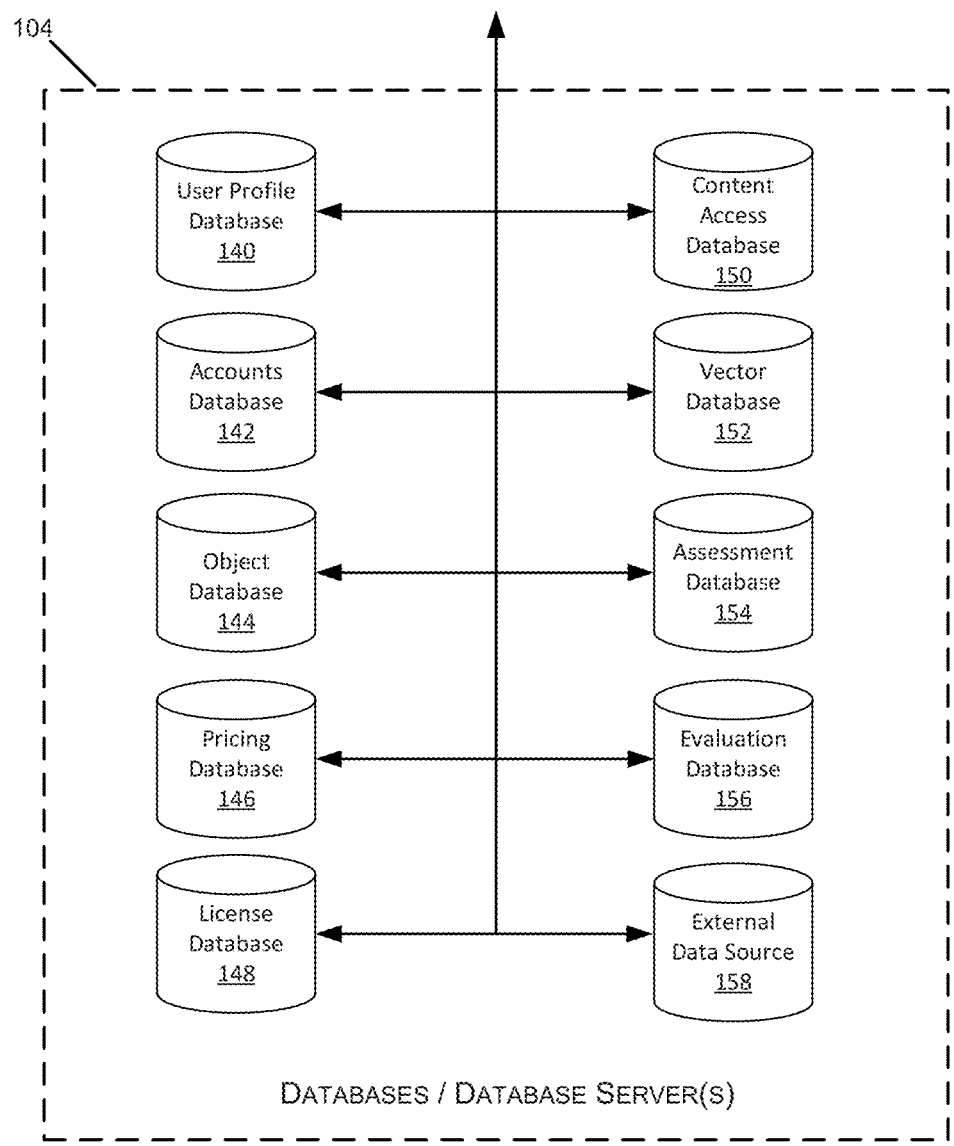
FIG. 3 is a block diagram illustrating an embodiment of one or more database servers within a neural network management system.

With reference to FIG. 3, an illustrative set of databases and/or database servers is shown, corresponding to the databases servers 104 of the neural network content distribution system 100 discussed above in FIG. 1. One or more individual databases 140-158 may reside in storage on a single computer server 104 (or a single server farm or cluster) under the control of a single entity, or may reside on separate servers operated by different entities and/or at remote locations. In some embodiments, databases 140-158 may be accessed by the content management server 102 and/or other devices and servers within the system 100 (e.g., user devices 106, supervisor devices 110, administrator servers 116, etc.). Access to one or more of the databases 140-158 may be limited or denied based on the processes, user credentials, and/or devices attempting to interact with the database.

The paragraphs below describe examples of specific databases that may be implemented within some embodiments of a neural network content distribution system 100. It should be understood that the below descriptions of databases 140-158, including their functionality and types of data stored therein, are illustrative and non-limiting. Database server architecture, design, and the execution of specific databases 140-158 may depend on the context, size, and functional requirements of a neural network content distribution system 100. For example, in content distribution systems 100 used for professional training and educational purposes, separate databases may be implemented in database server(s) 104 to store trainee and/or student data, trainer and/or professor data, training module data and content descriptions, training results, evaluation data, and the like. In contrast, in content distribution systems 100 used for media distribution from content providers to subscribers, separate databases may be implemented in database server(s) 104 to store listing of available content titles and descriptions, content title usage statistics, subscriber profiles, account data, payment data, network usage statistics, etc.

A user profile database 140 may include information relating to the end users within the neural network content distribution system 100. Generally speaking the user profile database 140 can be a database having restrictions on access, which restrictions can relate to whether one or several users or categories of users are enabled to perform one or several actions on the database or on data stored in the database. In some embodiments, the user profile database 140 can include any information for which access is restricted. This information may include user characteristics such as the user names, access credentials (e.g., logins and passwords), user preferences, and information relating to any previous user interactions within the neural network content distribution system 100 (e.g., requested content, posted content, content modules completed, training scores or evaluations, other associated users, etc.). In some embodiments, this information can relate to one or several individual end users such as, for example, one or several gamers, healthcare providers, students, teachers, administrators, or the like, and in some embodiments, this information can relate to one or several institutional end users such as, for example, one or several healthcare centers, healthcare facilities, healthcare networks, schools, groups of schools such as one or several school districts, one or several colleges, one or several universities, one or several training providers, or the like.

In some embodiments in which the one or several end users are individuals, and specifically are students, the user profile database 140 can further include information relating to these students' academic and/or educational history. This information can identify one or several courses of study that the student has initiated, completed, and/or partially completed, as well as grades received in those courses of study. In some embodiments, the student's academic and/or educational history can further include information identifying student performance on one or several tests, quizzes, and/or assignments. In some embodiments, this information can be stored in a tier of memory that is not the fastest memory in the neural network content distribution system 100.

The user profile database 140 can include information relating to one or several student learning preferences. In some embodiments, for example, the student may have one or several preferred learning styles, one or several most effective learning styles, and/or the like. In some embodiments, the students learning style can be any learning style describing how the student best learns or how the student prefers to learn. In one embodiment, these learning styles can include, for example, identification of the student as an auditory learner, as a visual learner, and/or as a tactile learner. In some embodiments, the data identifying one or several student learning styles can include data identifying a learning style based on the student's educational history such as, for example, identifying a student as an auditory learner when the student has received significantly higher grades and/or scores on assignments and/or in courses favorable to auditory learners. In some embodiments, this information can be stored in a tier of memory that is not the fastest memory in the neural network content distribution system 100.

The user profile database 140 can further include information relating to one or several teachers and/or instructors who are responsible for organizing, presenting, and/or managing the presentation of information to the student. In some embodiments, user profile database 140 can include information identifying courses and/or subjects that have been taught by the teacher, data identifying courses and/or subjects currently taught by the teacher, and/or data identifying courses and/or subjects that will be taught by the teacher. In some embodiments, the user profile database 140 can further include information indicating past evaluations and/or evaluation reports received by the teacher. In some embodiments, the user profile database 140 can further include information relating to improvement suggestions received by the teacher, training received by the teacher, continuing education received by the teacher, and/or the like. In some embodiments, this information can be stored in a tier of memory that is not the fastest memory in the neural network content distribution system 100.

In embodiments in which the user is a gamer, user profile database 140 can include information relating to one or several users that can be any individual that accesses one or several objects via the object network, and can include, for example, a student, a trainee, a learner, or the like. In some embodiments, the information contained in the user profile database 140 can include, for example, user contexts for one or several gamers, students, or the like. In some embodiments, a user context can contain information relating to past gaming and/or learning completed by the associated user, objectives of the user, which objectives can be the learning goals of the user including, for example, the achievement of a desired or specified position within the object network, and/or the capability including, for example, the capability and/or gaming capability of the user, which can be, for example, a learning style. In some embodiments, the information contained within the user profile database 140 can be updated based on the results of interactions between the user and the object network. In some embodiments, and based on continual updates to the user context, information contained within the user profile database 140 can be biased for temporal significance in that a biasing function can be applied to information contained within the user profile database 140 to place greater weight on recently collected data. In some embodiments, the temporal biasing function can advantageously allow recently collected data to more significantly affect the user context than older and potentially stale data relating to the user.

An accounts database 142 may generate and store account data for different users in various roles within the neural network content distribution system 100. For example, accounts may be created in an accounts database 142 for individual end users, supervisors, administrator users, and entities such as companies or educational institutions. Account data may include account types, current account status, account characteristics, and any parameters, limits, restrictions associated with the accounts.

An object database 144 may include information describing the individual content items (or content resources) available via the neural network content distribution system 100. In some embodiments, the object database 144 may include metadata, properties, and other characteristics associated with the content resources stored in the content server 112. In some embodiments, this data can include the one or several items that can include one or several documents and/or one or several applications or programs. In some embodiments, the one or several items can include, for example, one or several webpages, presentations, papers, videos, charts, graphs, books, written work, figures, images, graphics, recordings, or any other document, or any desired software or application or component thereof including, for example, a graphical user interface (GUI), all or portions of a Learning Management System (LMS), all or portions of a Content Management System (CMS), all or portions of a Student Information Systems (SIS), or the like.

In some embodiments, the data in the object database 144 may identify one or more aspects or content attributes of the associated content resources, for example, subject matter, access level, or skill level of the content resources, license attributes of the content resources (e.g., any limitations and/or restrictions on the licensable use and/or distribution of the content resource), price attributes of the content resources (e.g., a price and/or price structure for determining a payment amount for use or distribution of the content resource), rating attributes for the content resources (e.g., data indicating the evaluation or effectiveness of the content resource), and the like. In some embodiments, the object database 144 may be configured to allow updating of content metadata or properties, and to allow the addition and/or removal of information relating to the content resources. In some embodiments, the object database 144 can be organized such that content is associated with one or several courses and/or programs in which the content is used and/or provided. In some embodiments, the object database 144 can further include one or several teaching materials used in the course, a syllabus, one or several practice problems, one or several tests, one or several quizzes, one or several assignments, or the like. All or portions of the object database 144 can be stored in a tier of memory that is not the fastest memory in the neural network content distribution system 100.

In some embodiments, the object database 144 can include data relating to one or several data objects which data objects can be, for example, the nodes of the knowledge network. In some embodiments, a data object can be an aggregation of content, including healthcare related content, gaming content, learning content, or the like, that can be, for example, associated with a verification and/or an assessment such as, for example, an opponent, a test, quiz, one or several practice problems or questions, homework, or the like. The data objects can, in some embodiments, be one or several learning objects, including any subcomponents of one or several learning objects such as, for example, one or several content objects containing material such as, for example, instructional material. In some embodiments, this instructional material can comprise learning material for presentation to a user accessing the data of one of the content object. In some embodiments, the data objects can also include one or several assessment objects which can be a sub-category of content objects, and that can include features that can be used to assess the learning and/or mastery of the subject matter of one or several content objects by the user accessing the data of the one of the data objects. In some embodiments, the data object can include an initial content object and/or assessment object, one or several intermediate content objects and/or assessment objects, and one or several terminal content objects and/or assessment objects. In one embodiment, the terminal assessment object can assess the user's mastery of the content contained in some or all of the content objects within the data object. In some embodiments, an intermediate assessment object can correspond to an intermediate opponent, and a terminal assessment object can, for example, correspond to an opponent faced before, for example, passing a level and/or stage in a game, a quiz and/or test to be passed before, for example, completing a data object, or the like.

The object database 144 can include information to allow customization of the user learning experience. In one embodiment, for example, the object database 144 can include threshold data that can be used in connection with user results to determine if a user is meeting expectations, exceeding expectations, far exceeding expectations, failing to meet expectations, or providing completely unsatisfactory results. In some embodiments, the object database 144 can include thresholds that can be used to trigger the providing of data objects to the user, which user can be, for example, a healthcare provider, a student, a gamer, or the like. In some embodiments, these data objects are not included in the selected network path, also referred to herein as a gaming path, or a learning path. In one embodiment, the object database 144 can include one or several enhancement thresholds, and in some embodiments, the object database 144 can include one or several remediation thresholds. In some embodiments, these data objects can be one or several enhancement objects for a user who is exceeding and/or far exceeding expectations, and in some embodiments the data objects can be one or several remedial objects for a user who is not meeting expectations.

A pricing database 146 may include pricing information and/or pricing structures for determining payment amounts for providing access to the neural network content distribution system 100 and/or the individual content resources within the system 100. In some cases, pricing may be determined based on a user's access to the neural network content distribution system 100, for example, a time-based subscription fee, or pricing based on network usage and. In other cases, pricing may be tied to specific content resources. Certain content resources may have associated pricing information, whereas other pricing determinations may be based on the resources accessed, the profiles and/or accounts of the users and the desired level of access (e.g., duration of access, network speed, etc.). Additionally, the pricing database 146 may include information relating to compilation pricing for groups of content resources, such as group prices and/or price structures for groupings of resources.

A license database 148 may include information relating to licenses and/or licensing of the content resources within the neural network content distribution system 100. For example, the license database 148 may identify licenses and licensing terms for individual content resources and/or compilations of content resources in the content server 112, the rights holders for the content resources, and/or common or large-scale right holder information such as contact information for rights holders of content not included in the content server 112.

A content access database 150 may include access rights and security information for the neural network content distribution system 100 and specific content resources. For example, the content access database 150 may include login information (e.g., user identifiers, logins, passwords, etc.) that can be verified during user login attempts to the system 100. The content access database 150 also may be used to store assigned roles and/or levels of access to users. For example, a user's access level may correspond to the sets of content resources and/or the client or server applications that the user is permitted to access. Certain users may be permitted or denied access to certain applications and resources based on their subscription level, training program, course/grade level, etc. Certain users may have supervisory access over one or more end users, allowing the supervisor to access all or portions of the end user's content, activities, evaluations, etc. Additionally, certain users may have administrative access over some users and/or some applications in the content management system 100, allowing such users to add and remove user accounts, modify user access permissions, perform maintenance updates on software and servers, etc.

A vector database 152 can include information relating to one or several connecting vectors. In some embodiments, and as discussed above, the object network can contain a plurality of objects. These objects can be connected via a plurality of vectors, also referred to herein as connecting vectors, gaming vectors, and/or as connecting vectors. A connecting vector can connect a first data object to a second data object and can indicate a prerequisite relationship between the first and second data objects, which prerequisite relationship can indicate the temporal order in which the first and second data objects should be completed and/or attempted. In some embodiments, the first data object, which is a prerequisite to the second data object within the set defined by the first and second data objects connected within a prerequisite relationship by the connecting vector, can be identified as the incident data object ($LO_I$), and the second data object can be identified as the terminal data object ($LO_T$).

In some embodiments, the vector database 152 can include information relating to a variety of parameters of the connecting vector. In some embodiments, this can include, for example, the strength of the connecting vector, which strength can indicate the effectiveness of the connecting vector and/or the degree to which users successfully traverse the connecting vector and complete the terminal data object, the magnitude of the connecting vector, which magnitude can provide an indicator of the rate at which one or several users have traversed and/or are expected to traverse the connecting vector, a connecting vector context including, for example, information identifying the strength and/or magnitude of the connecting vector for one or several user contexts, or the like.

An assessment database 154 can include information identifying the connection and/or connections between data objects within the object network. In some embodiments, the assessment database 154 can include information relating to multidimensional linking between one or several data objects. In some embodiments, one or several of the multiple dimensions of the object network can relate to the subject matter of the object network and/or to skills that are relevant to the completion and/or comprehension of the subject matter of the object network. In some embodiments, one or several of the multiple dimensions of the object network and/or data object can relate to subject independent skills and/or knowledge, which are skills and/or knowledge, the development of which, are not the purpose of the data object. Such skills and/or knowledge may include, for example, reading (lexile) skills and math (quantile) skills, history knowledge, science knowledge, geography knowledge, or the like. Thus, in a game intended to teach geography, reading skills acquired through the learning of geography would be subject independent, and geography skills and/or knowledge are subject dependent skills and/or knowledge. Additionally, in some embodiments, information contained within the assessment database 154 can be used in placing the data objects within the object network and/or in connecting new data objects with other objects within the object network.

An evaluation database 156 can include information used in evaluating the effectiveness of one or several objects, one or several sequences of objects, also referred to herein as a learning sequence and/or a gaming sequence, one or several content objects, one or several assessment objects, and/or the like. In some embodiments, for example, this information can include one or several effectiveness thresholds which can define the boundary between satisfactory results associated with one or several of the above and unsatisfactory results associated with one or several of the above.

In addition to the illustrative databases described above, database server(s) 104 may include one or more external data aggregators 310. External data aggregators 310 may include third-party data sources accessible to the content management system 100, but not maintained by the content management system 100. External data aggregators 310 may include any electronic information source relating to the users, content resources, or applications of the neural network content distribution system 100. For example, external data aggregators 310 may be third-party databases containing demographic data, education related data, consumer sales data, health related data, and the like. Illustrative external data aggregators 310 may include, for example, social networking web servers, public records databases, learning management systems, educational institution servers, business servers, consumer sales databases, medical record databases, etc. Data retrieved from various external data aggregators 310 may be used to verify and update user account information, suggest user content, and perform user and content evaluations.

Figure 4:
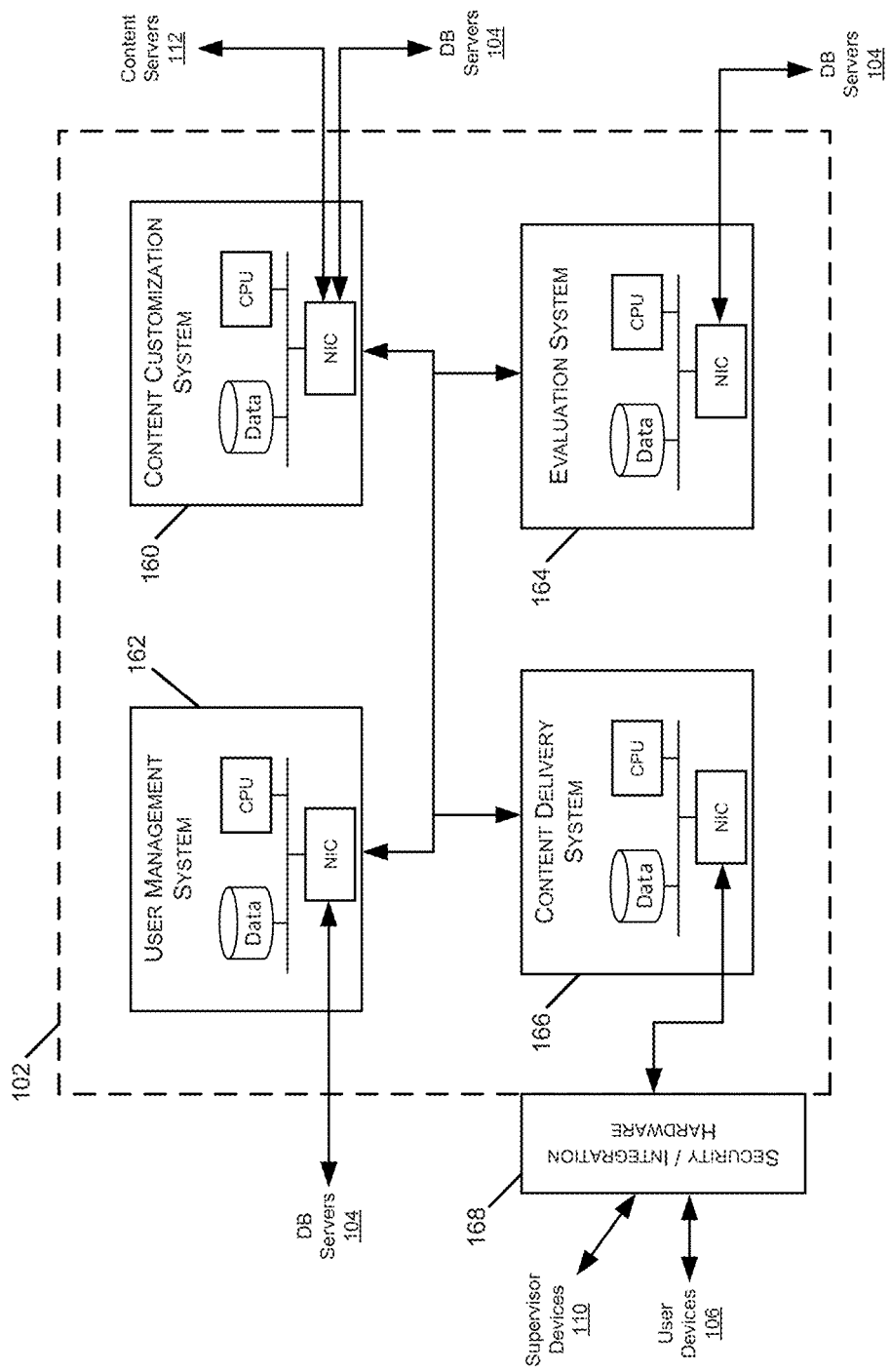
FIG. 4 is a block diagram illustrating an embodiment of one or more content management servers within a neural network management system.

With reference now to FIG. 4, a block diagram is shown illustrating an embodiment of one or more content management servers 102, also referred to herein as one or more processors 102, within a neural network content distribution system 100. As discussed above, content management server(s) 102 may include various server hardware and software components that manage the content resources within the neural network content distribution system 100 and provide interactive and adaptive content to users on various user devices 106. For example, content management server(s) 102 may provide instructions to and receive information from the other devices within the neural network content distribution system 100, in order to manage and transmit content resources, user data, and server or client applications executing within the system 100.

A content management server 102 may include a content customization system 402. The content customization system 402 may be implemented using dedicated hardware within the neural network content distribution system 100 (e.g., a content customization server 402), or using designated hardware and software resources within a shared content management server 102. In some embodiments, the content customization system 402 may adjust the selection and adaptive capabilities of content resources to match the needs and desires of the users receiving the content. For example, the content customization system 402 may query various databases and servers 104 to retrieve user information, such as user preferences and characteristics (e.g., from a user profile database 140), user access restrictions to content recourses (e.g., from a content access database 150), and the like. Based on the retrieved information from databases 104 and other data sources, the content customization system 402 may modify content resources for individual users.

A content management server 102 also may include a user management system 404. The user management system 404 may be implemented using dedicated hardware within the neural network content distribution system 100 (e.g., a user management server 404), or using designated hardware and software resources within a shared content management server 102. In some embodiments, the user management system 404 may monitor the progress of users through various types of content resources and groups, such as media compilations, courses or curriculums in training or educational contexts, interactive gaming environments, and the like. For example, the user management system 404 may query one or more databases and servers 104 to retrieve user data such as associated content compilations or programs, content completion status, user goals, results, and the like.

A content management server 102 also may include an evaluation system 406. The evaluation system 406 may be implemented using dedicated hardware within the neural network content distribution system 100 (e.g., an evaluation server 406), or using designated hardware and software resources within a shared content management server 102. The evaluation system 406 may be configured to receive and analyze information from user devices 106 via, for example, the end-user server 107. For example, various ratings of content resources submitted by users may be compiled and analyzed, and then stored in a database (e.g., an object database 144 and/or evaluation database 308) associated with the content. In some embodiments, the evaluation server 406 may analyze the information to determine the effectiveness or appropriateness of content resources with, for example, a subject matter, an age group, a skill level, or the like. In some embodiments, the evaluation system 406 may provide updates to the content customization system 402 or the user management system 404, with the attributes of one or more content resources or groups of resources within the system 100. The evaluation system 406 also may receive and analyze user evaluation data from user devices 106, supervisor devices 110, and administrator servers 116, etc. For instance, evaluation system 406 may receive, aggregate, and analyze user evaluation data for different types of users (e.g., end users, supervisors, administrators, etc.) in different contexts (e.g., media consumer ratings, trainee or student comprehension levels, teacher effectiveness levels, gamer skill levels, etc.).

A content management server 102 also may include a content delivery system 408. The content delivery system 408 may be implemented using dedicated hardware within the neural network content distribution system 100 (e.g., a content delivery server 408), or using designated hardware and software resources within a shared content management server 102. The content delivery system 408 may receive content resources from the content customization system 402 and/or from the user management system 404, and provide the resources to user devices 106. The content delivery system 408 may determine the appropriate presentation format for the content resources based on the user characteristics and preferences, and/or the device capabilities of user devices 106. If needed, the content delivery system 408 may convert the content resources to the appropriate presentation format and/or compress the content before transmission. In some embodiments, the content delivery system 408 may also determine the appropriate transmission media and communication protocols for transmission of the content resources.

In some embodiments, the content delivery system 408 may include specialized security and integration hardware 410, along with corresponding software components to implement the appropriate security features content transmission and storage, to provide the supported network and client access models, and to support the performance and scalability requirements of the system 100. The security and integration layer 410 may include some or all of the security and integration components 208 discussed above in FIG. 2, and may control the transmission of content resources and other data, as well as the receipt of requests and content interactions, to and from the user devices 106, supervisor devices 110, administrative servers 116, and other devices in the system 100.

Figure 5:
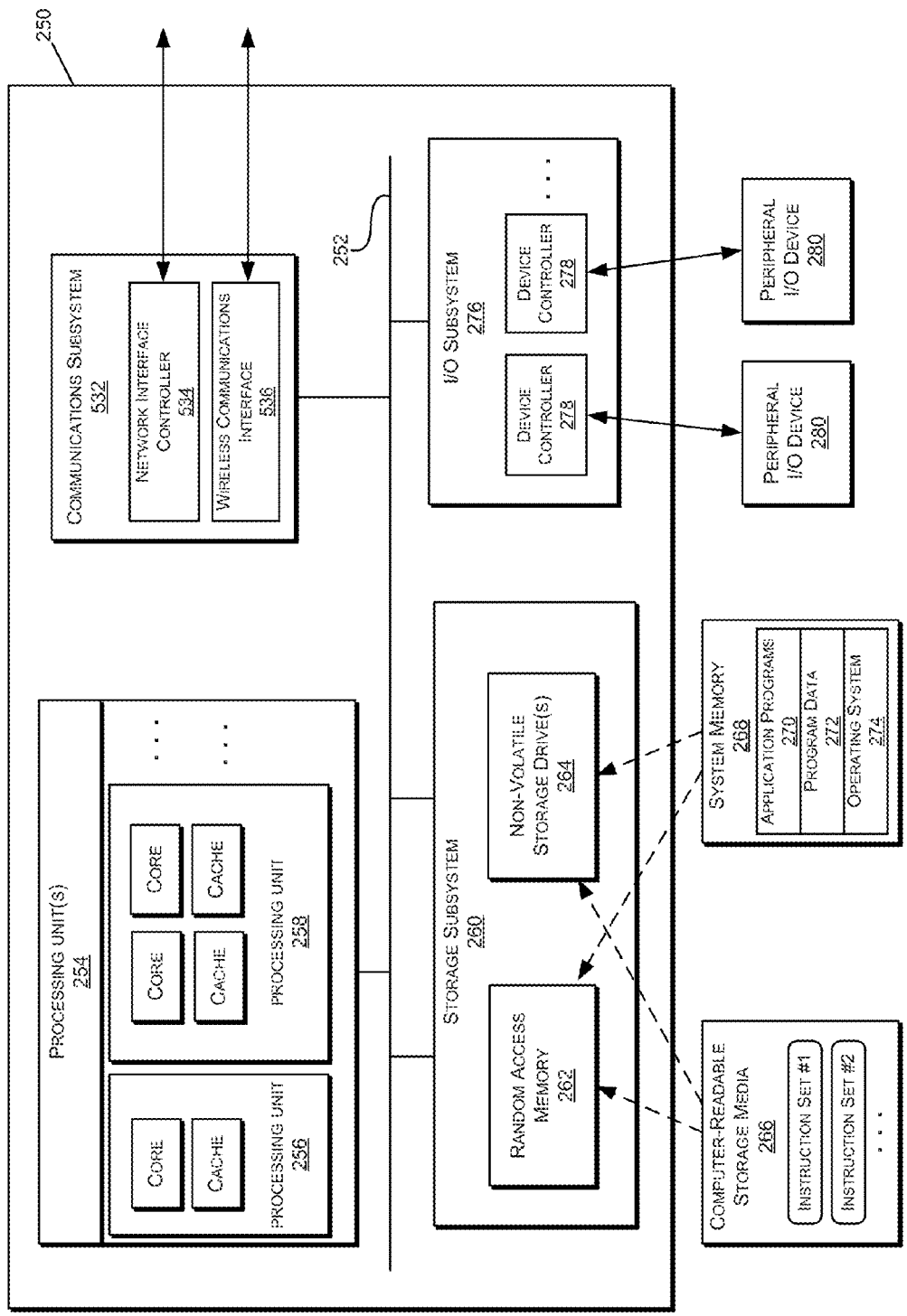
FIG. 5 is a block diagram illustrating the physical and logical components of a special-purpose computer device within a neural network management system.

With reference now to FIG. 5, a block diagram of an illustrative computer system is shown. The system 500 may correspond to any of the computing devices or servers of the neural network content distribution system 100 described above, or any other computing devices described herein. In this example, computer system 500 includes processing units 504 that communicate with a number of peripheral subsystems via a bus subsystem 502. These peripheral subsystems include, for example, a storage subsystem 510, an I/O subsystem 526, and a communications subsystem 532.

Bus subsystem 502 provides a mechanism for letting the various components and subsystems of computer system 500 communicate with each other as intended. Although bus subsystem 502 is shown schematically as a single bus, alternative embodiments of the bus subsystem may utilize multiple buses. Bus subsystem 502 may be any of several types of bus structures including a memory bus or memory controller, a peripheral bus, and a local bus using any of a variety of bus architectures. Such architectures may include, for example, an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 504, which may be implemented as one or more integrated circuits (e.g., a conventional microprocessor or microcontroller), controls the operation of computer system 500. One or more processors, including single core and/or multicore processors, may be included in processing unit 504. As shown in the figure, processing unit 504 may be implemented as one or more independent processing units 506 and/or 508 with single or multicore processors and processor caches included in each processing unit. In other embodiments, processing unit 504 may also be implemented as a quad-core processing unit or larger multicore designs (e.g., hexa-core processors, octo-core processors, ten-core processors, or greater.

Processing unit 504 may execute a variety of software processes embodied in program code, and may maintain multiple concurrently executing programs or processes. At any given time, some or all of the program code to be executed can be resident in processor(s) 504 and/or in storage subsystem 510. In some embodiments, computer system 500 may include one or more specialized processors, such as digital signal processors (DSPs), outboard processors, graphics processors, application-specific processors, and/or the like.

I/O subsystem 526 may include device controllers 528 for one or more user interface input devices and/or user interface output devices 530. User interface input and output devices 530 may be integral with the computer system 500 (e.g., integrated audio/video systems, and/or touchscreen displays), or may be separate peripheral devices which are attachable/detachable from the computer system 500.

Input devices 530 may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. Input devices 530 may also include three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additional input devices 530 may include, for example, motion sensing and/or gesture recognition devices that enable users to control and interact with an input device through a natural user interface using gestures and spoken commands, eye gesture recognition devices that detect eye activity from users and transform the eye gestures as input into an input device, voice recognition sensing devices that enable users to interact with voice recognition systems through voice commands, medical imaging input devices, MIDI keyboards, digital musical instruments, and the like.

Output devices 530 may include one or more display subsystems, indicator lights, or non-visual displays such as audio output devices, etc. Display subsystems may include, for example, cathode ray tube (CRT) displays, flat-panel devices, such as those using a liquid crystal display (LCD) or plasma display, projection devices, touch screens, and the like. In general, use of the term "output device" is intended to include all possible types of devices and mechanisms for outputting information from computer system 500 to a user or other computer. For example, output devices 530 may include, without limitation, a variety of display devices that visually convey text, graphics and audio/video information such as monitors, printers, speakers, headphones, automotive navigation systems, plotters, voice output devices, and modems.

Computer system 500 may comprise one or more storage subsystems 510, comprising hardware and software components used for storing data and program instructions, such as system memory 518 and computer-readable storage media 516. The system memory 518 and/or computer-readable storage media 516 may store program instructions that are loadable and executable on processing units 504, as well as data generated during the execution of these programs.

Depending on the configuration and type of computer system 500, system memory 318 may be stored in volatile memory (such as random access memory (RAM) 512) and/or in non-volatile storage drives 514 (such as read-only memory (ROM), flash memory, etc.) The RAM 512 may contain data and/or program modules that are immediately accessible to and/or presently being operated and executed by processing units 504. In some implementations, system memory 518 may include multiple different types of memory, such as static random access memory (SRAM) or dynamic random access memory (DRAM). In some implementations, a basic input/output system (BIOS), containing the basic routines that help to transfer information between elements within computer system 500, such as during start-up, may typically be stored in the non-volatile storage drives 514. By way of example, and not limitation, system memory 518 may include application programs 520, such as client applications, Web browsers, mid-tier applications, server applications, etc., program data 522, and an operating system 524.

Storage subsystem 510 also may provide one or more tangible computer-readable storage media 516 for storing the basic programming and data constructs that provide the functionality of some embodiments. Software (programs, code modules, instructions) that when executed by a processor provide the functionality described herein may be stored in storage subsystem 510. These software modules or instructions may be executed by processing units 504. Storage subsystem 510 may also provide a repository for storing data used in accordance with the present invention.

Storage subsystem 300 may also include a computer-readable storage media reader that can further be connected to computer-readable storage media 516. Together and, optionally, in combination with system memory 518, computer-readable storage media 516 may comprehensively represent remote, local, fixed, and/or removable storage devices plus storage media for temporarily and/or more permanently containing, storing, transmitting, and retrieving computer-readable information.

Computer-readable storage media 516 containing program code, or portions of program code, may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 500.

By way of example, computer-readable storage media 516 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 516 may include, but is not limited to, Zip® drives, flash memory cards, universal serial bus (USB) flash drives, secure digital (SD) cards, DVD disks, digital video tape, and the like. Computer-readable storage media 516 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Communications subsystem 532 may provide a communication interface from computer system 500 and external computing devices via one or more communication networks, including local area networks (LANs), wide area networks (WANs) (e.g., the Internet), and various wireless telecommunications networks. As illustrated in FIG. 5, the communications subsystem 532 may include, for example, one or more network interface controllers (NICs) 534, such as Ethernet cards, Asynchronous Transfer Mode NICs, Token Ring NICs, and the like, as well as one or more wireless communications interfaces 536, such as wireless network interface controllers (WNICs), wireless network adapters, and the like. Additionally and/or alternatively, the communications subsystem 532 may include one or more modems (telephone, satellite, cable, ISDN), synchronous or asynchronous digital subscriber line (DSL) units, FireWire® interfaces, USB® interfaces, and the like. Communications subsystem 536 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

The various physical components of the communications subsystem 532 may be detachable components coupled to the computer system 500 via a computer network, a FireWire® bus, or the like, and/or may be physically integrated onto a motherboard of the computer system 500. Communications subsystem 532 also may be implemented in whole or in part by software.

In some embodiments, communications subsystem 532 may also receive input communication in the form of structured and/or unstructured data feeds, event streams, event updates, and the like, on behalf of one or more users who may use or access computer system 500. For example, communications subsystem 532 may be configured to receive data feeds in real-time from users of social networks and/or other communication services, web feeds such as Rich Site Summary (RSS) feeds, and/or real-time updates from one or more third party information sources (e.g., data aggregators 310). Additionally, communications subsystem 532 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 532 may output such structured and/or unstructured data feeds, event streams, event updates, and the like to one or more databases 104 that may be in communication with one or more streaming data source computers coupled to computer system 500.

Due to the ever-changing nature of computers and networks, the description of computer system 500 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

Figure 6:
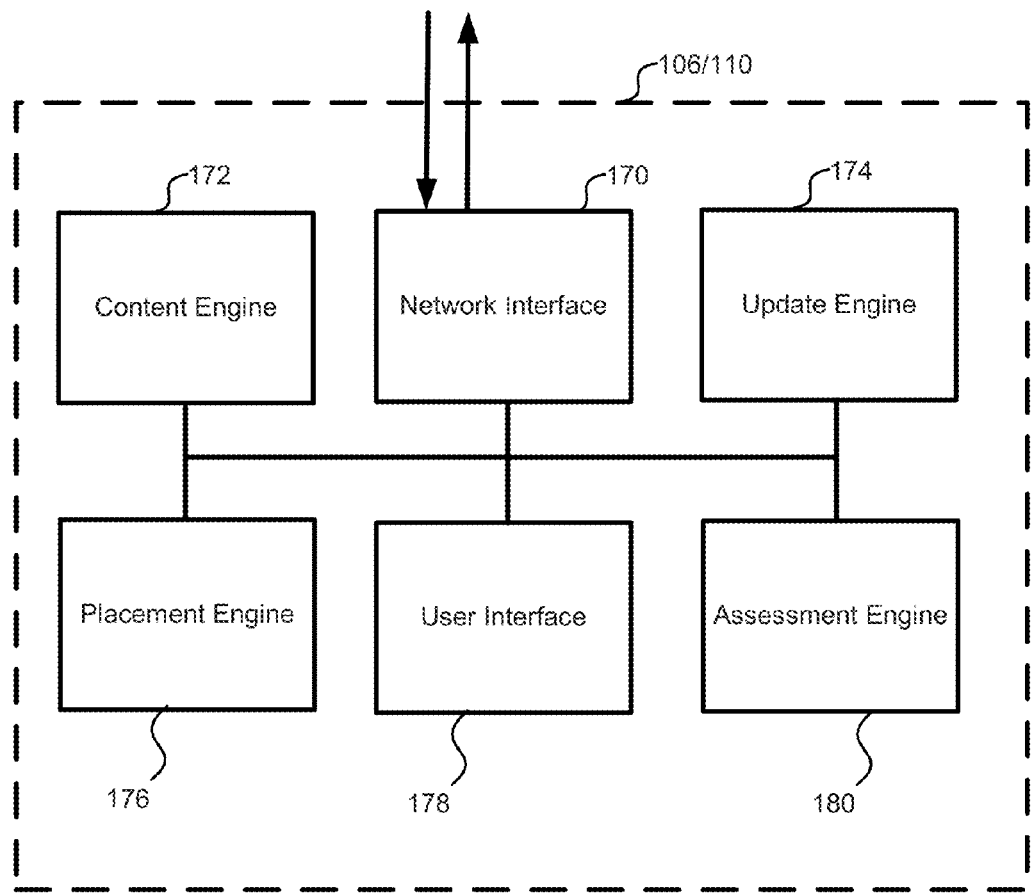
FIG. 6 is a schematic illustration of one embodiment of a user device for use with the neural network management system.

With reference now to FIG. 6, a block diagram of one embodiment of a user device 106 is shown. As discussed above, the user device 106 can be configured to provide information to and/or receive information from other components of the neural network management system 100. The providing of data and/or information, as described herein, can correspond to the outputting of one or several electric signals containing data, and the receiving of data and/or information, as described herein, can correspond to the receiving of an input of one or several electric signals containing data.

The user device can access the neural network management system 100 through any desired means or technology, including, for example, a webpage, a web portal, or via communication network 120. As depicted in FIG. 6, the user device 106 can include a network interface 170. The network interface 170 allows the user device 106 to access the other components of the neural network content distribution system 100, and specifically allows the user device 106 to access the communications network 120 of the neural network content distribution system 100. The network interface 170 can include features configured to send and receive information, including, for example, an antenna, a modem, a transmitter, receiver, or any other feature that can send and receive information. The network interface 170 can communicate via telephone, cable, fiber-optic, or any other wired communication network. In some embodiments, the network interface 170 can communicate via cellular networks, WLAN networks, or any other wireless network.

The user device 106 can include a content engine 172. The content engine 172 can receive one or several data objects which can be, for example, one or several gaming objects, learning objects, and/or content objects from the object database 144, and can communicate them to the user via the user interface of the user device 106. Thus, the content engine 172 can receive one or several inputs from the other components of the neural network content distribution system 100 via, for example, the network interface 170, and can provide one or several outputs to the gamer/user.

The user device 106 can include an update engine 174. In some embodiments, the update engine 174 can be configured to receive information relating to the traversal of one or several connecting vectors, which can include one or several connecting vectors, and update the connecting vectors based on the user experience associated with the terminal data object of the one or several connecting vectors. In some embodiments, the update engine 174 can be configured to update the connecting vector according to the user context and/or the context of the connecting vector. In some embodiments, this can include updating the connecting vector according to one or several learning styles. In some embodiments, the update engine 174 can receive information from, and/or provide information to the vector database 152.

The user device 106 can include a placement engine 176. The placement engine 176 can be configured to place one or several data objects within the object network. Specifically, in some embodiments, the placement engine 176 can be configured to identify prerequisite relationships for a new data object. In some embodiments, these prerequisite relationships can be within the subject matter of the data object, and in some embodiments, these prerequisite relationships can be outside of the subject matter of the data object. In some embodiments, the placement engine 176 can receive information from, and/or send information to the assessment database 154.

The user device 106 can include a user interface 178 that communicates information to, and receives inputs from a user. In some embodiments, the user interface 178 can each include one or several sensors configured to sense a physical result of one or several user actions, and to convert this sensed result into an electric signal. In some embodiments, the one or several sensors can be configured to sense pressure and/or pressures exceeding a threshold value, and can include, for example, a keyboard, a touchscreen, a mouse, or the like. In some embodiments, the one or several sensors can be configured to sense sound and/or pressure waves, and can include, for example, one or several microphones. Thus, in some embodiments, the user interface 178 can include features configured to receive an input from a user and to convert the input into an electrical signal. The user interface 178 can further include one or several features configured to convert an electrical signal into a human usable output. These features can include, for example, one or several visual displays such as one or several screens, monitors, lights, projectors, or the like, one or several tactile displays, one or several audible outputs such as, for example, one or several speakers, or the like.

The user device 106 can include an assessment engine 180. The assessment engine can be configured to assess the effectiveness of one or several items within the object network including, for example, one or several data objects, one or several sequences, and/or one or several content objects. In some embodiments, the assessment engine 180 can assess the contents of the object network in connection with information stored within the evaluation database 156. In some embodiments, the assessment engine 180 can send information to, and/or receive information from the evaluation database 156.

Figure 7:
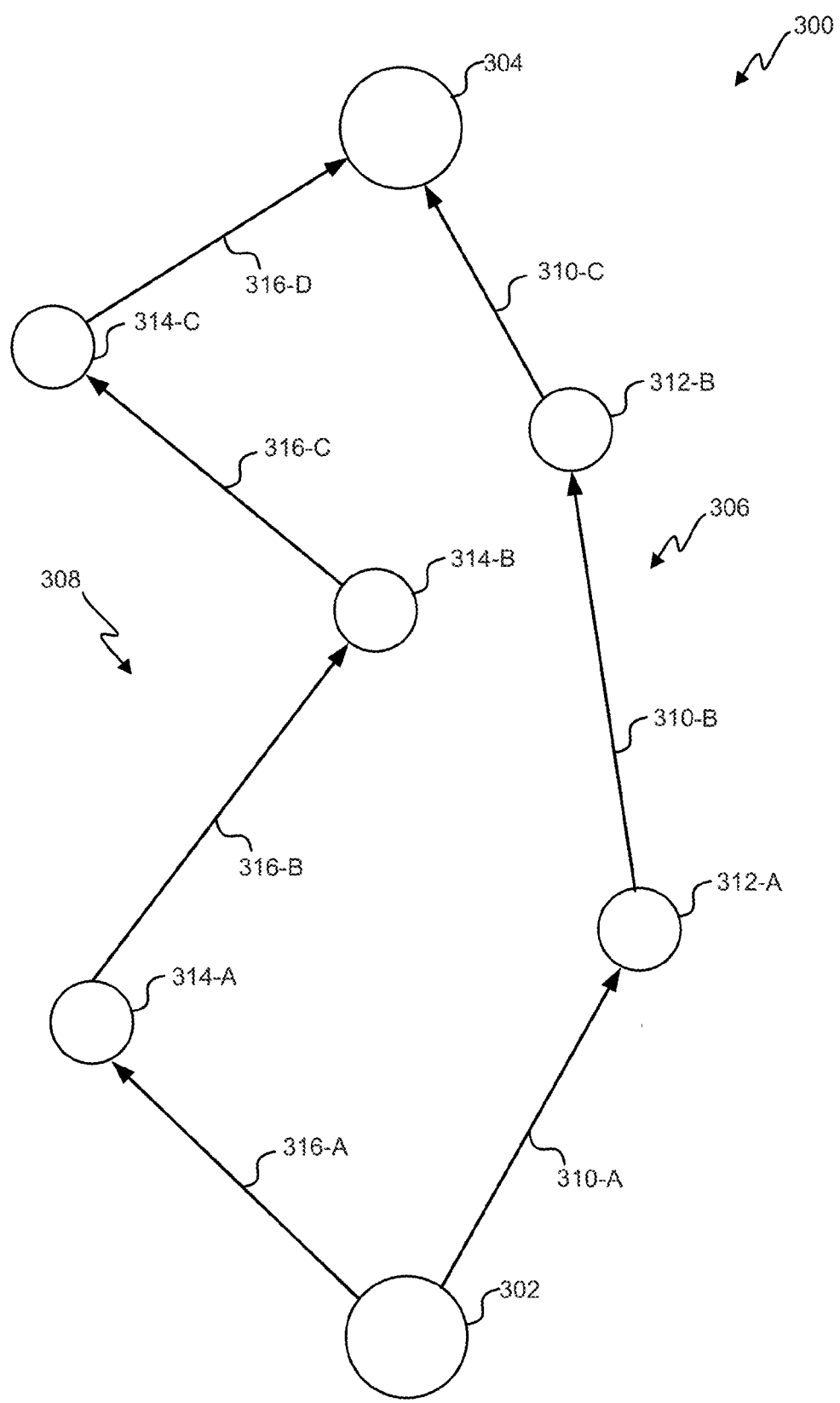
FIG. 7 is a schematic illustration of one embodiment of a neural network containing two indicated sequences.

With reference now to FIG. 7, a schematic illustration of one embodiment of the object network 300 is shown. Some aspects of object networks and methods of managing the same are disclosed in U.S. application Ser. No. 14/089,432, filed Nov. 25, 2013; Ser. No. 14/137,890, filed Dec. 20, 2013; Ser. No. 14/154,050, filed Jan. 13, 2014; and Ser. No. 14/524,948, filed on Oct. 27, 2014, the entirety of each of which is hereby incorporated by reference herein. Additionally, aspects can be further found in U.S. application Ser. No. 14/614,279, filed Feb. 4, 2015; Ser. No. 14/724,620, filed May 28, 2015; and Ser. No. 14/144,437, filed Dec. 30, 2013, the entirety of each of which is hereby incorporated by reference herein.

In some embodiments, the object network 300 can comprise a plurality of data objects connected via a plurality of connecting vectors. In the embodiment depicted in FIG. 7, the object network 300 includes a starting data object 302 and a destination data object 304. As seen in FIG. 7, the starting data object 302 and the destination data object 304 are connected by a first sequence 306 and a second sequence 308. The first sequence 306 comprises data objects 312-A and 312-B which are connected with each other and with both of the starting object 302 and the destination object 304 via connecting vectors 310-A, 310-B, and 310-C, also referred to herein as learning vectors. Similarly, the second sequence 308 comprises data objects 314-A, 314-B, and 314 C, which are connected with each other and with both of the starting data object 302 and the destination data object 304 via connecting vectors 316-A, 316-B, 316-C, and 316-D. As seen in FIG. 7, the magnitude of the connecting vectors 310-A, 310-B, 310-C, 316-A, 316-B, 316-C, 316-D varies between objects, and some of the connecting vectors 310-A, 310-B, 310-C, 316-A, 316-B, 316-C, 316-D have a greater magnitude than others of the connecting vectors 310-A, 310-B, 310-C, 316-A, 316-B, 316-C, 316-D. Similarly, some of the connecting vectors 310-A, 310-B, 310-C, 316-A, 316-B, 316-C, 316-D have a lesser magnitude than others of the connecting vectors 310-A, 310-B, 310-C, 316-A, 316-B, 316-C, 316-D. As further seen, the aggregate magnitude of the first sequence 306, which aggregate magnitude is the sum of the magnitudes of the connecting vectors 310-A, 310-B, 310-C in the first sequence 306, is less than the aggregate magnitude of the second sequence 308, which aggregate magnitude is the sum of the magnitudes of the connecting vectors 316-A, 316-B, 316-C, 316-D in the second sequence 308. In some embodiments, the magnitude of the connecting vectors 310-A, 310-B, 310-C, 316-A, 316-B, 316-C, 316-D and/or the magnitude of the sequence 306, 308 can correspond to the length of time required to complete a connecting vector 310-A, 310-B, 310-C, 316-A, 316-B, 316-C, 316-D and/or a sequence 306, 308, by the effectiveness and teaching mastery of the subject matter of the same.

The present disclosure relates to systems and methods for generating an object network that can be, for example, a multidimensional object network. The object network can connect a plurality of data objects based on, for example, the content and/or subject of the data objects. The multidimensional object network can be generated by identifying multiple levels and dimensions of connectivity between a first data object and other data objects in the object network. Similar to connection of subject matter within a syllabus, a data object can be connected to other data objects in the object network based on a progression of subject matter within a subject. In such an embodiment, one subject topic is a prerequisite to one or several other subject topics. In addition to this connectivity of a data object within an object network, additional dimensions of connectivity can be generated within an object network to create a multidimensional object network.

The connectivity within an object network can be limited to one or several topics, subjects, courses of study, or the like, and in some embodiments, this connectivity can extend beyond one or several topics, subjects, courses of study, or the like. In one embodiment, for example, one or several data objects, one or several content objects of the one or several data objects and/or the topics of the one or several data objects or of the one or several content objects associated with the one or several data objects can be evaluated to identify a skill level of the same. The skill level can be a subject independent skill level such as, for example, a lexile and/or quantile skill level, or alternatively, the skill level can be a subject dependent skill level. The identified skill level can be used to find one or several data objects, one or several content objects of the one or several data objects, and/or topics of the one or several data objects or of the one or several content objects associated with the one or several data objects having a skill level that is either lower or higher than the skill level of the evaluated one or several data objects, one or several content objects of the one or several data objects, and/or the topics of the one or several data objects or of the one or several content objects associated with the one or several data objects.

In one particular embodiment, a multidimensional object network can include a first object network containing data objects relating to a first subject matter such as, for example, math such as algebra, geometry, trigonometry, calculus, or the like; science such as chemistry, biology, physics, or the like, language arts, history, or the like. In some embodiments, the multidimensional object network can include a second object network containing data objects relating to a second subject matter such as, for example, math such as algebra, geometry, trigonometry, calculus, or the like; science such as chemistry, biology, physics, or the like, language arts, history, or the like, which second subject matter is different from the first subject matter. In some embodiments, a multidimensional object network can link the first and second object networks, and any other object networks, via one or several connecting vectors extending from one or several data objects in the first object network to one or several data objects in the second object network. In some embodiments, these connecting vectors can establish prerequisite relationships between the connecting data objects Connecting vectors can be established between the evaluated one or several data objects, the one or several content objects of the one or several data objects, and/or the topics of the one or several data objects or of the one or several content objects associated with the one or several data objects and the identified one or several data objects, one or several content objects of the one or several data object and/or the topics of the one or several data objects or of the one or several content objects associated with the one or several data objects. In some embodiments, these connecting vectors can indicate the prerequisite relationship between the evaluated and the identified one or several data objects, the one or several content objects of the one or several data objects, and/or the topics of the one or several data objects or of the one or several content objects associated with the one or several data objects.

Figure 8:
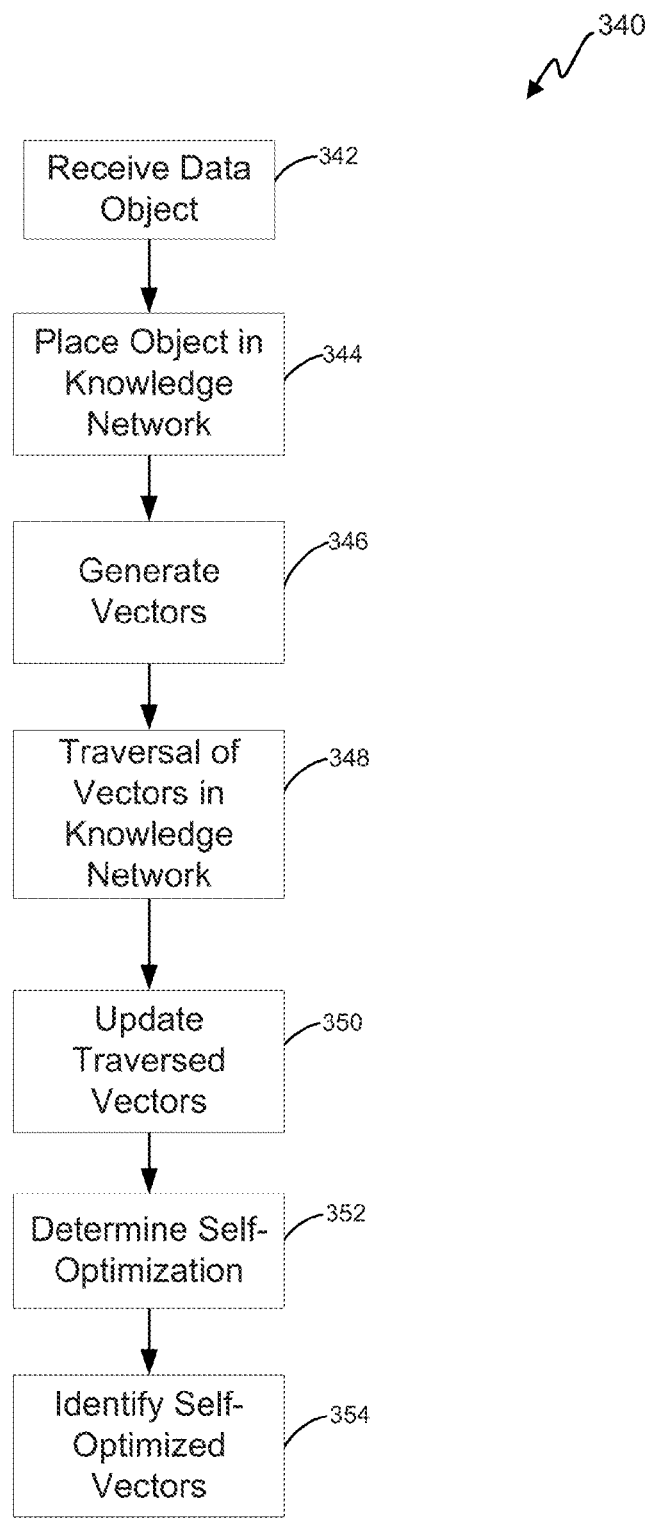
FIG. 8 is a flowchart illustrating one embodiment of a process for use of the neural network.

With reference now to FIG. 8, a flowchart illustrating one embodiment of a process 340 for use of the knowledge network is shown. The process 340 can be performed to create the knowledge network, to add a data object to the knowledge network, the generate one or several connecting vectors between data objects in the knowledge network, to modify one or several connecting vectors in the knowledge network, or the like. The steps of process 340 can be performed once, or several times. In some embodiments, for example, some or all of the steps of process 340 can be repeated multiple times as one or several users interact with and/or use the knowledge network. As the volume of the use of the knowledge network increases, the data underlying the knowledge network can increase and the performance of the knowledge network can improve. The process 340 can be performed by the neural network content distribution system 100 and/or one or several components thereof.

The process 340 begins at block 342, wherein a data object is received. In some embodiments, this data object can be the first data object for creating a knowledge network, or can be a data object to be added to one or several existing knowledge networks. The data object can be received from any of the components of the neural network content distribution system 100, and can, in some embodiments, be received from the content server 112 of the neural network content distribution system 100.

After the data object has been received, the process 340 proceeds to block 344, wherein the data object is placed within the knowledge network. In some embodiments, the placement of the data object within the knowledge network can include the steps discussed at greater length below with respect to the processes of FIGS. 10, 11, and 12. In some embodiments, this can include determining a relative ranking of the data object with respect to other data objects already in one or several knowledge networks. After the data object has been placed in the knowledge network, the process 340 proceeds to block 346, wherein one or several connecting vectors are generated to connect the data object to one or several other data objects already in one or several knowledge networks. In some embodiments, these one or several connecting vectors can be generated based on the relative ranking of the data object with respect to other data objects already in one or several knowledge networks.

After one or several connecting vectors have been generated, the process 340 proceeds to block 348, wherein one or several connecting vectors of the knowledge network are traversed by, for example, one or several users of the content of the knowledge network. In some embodiments, the traversal of the one or several connecting vectors of the knowledge network can include, for example, placing a user within the knowledge network, identifying a path for the user through all or portions of the knowledge network, identifying one or several connecting vectors for traversal, and providing content of the data objects to the users corresponding to the identified one or several connecting vectors for traversal. This steps is discussed at greater length below in the processes depicted in FIGS. 13, 17, 20, and 21.

After the one or several connecting vectors have been traversed, the process 340 proceeds to block 350, wherein the one or several traversed vectors are updated. This can include updating data identifying one or several of the traversed connecting vectors including, for example, one or several components of the magnitude of the traversed connecting vector. In some embodiments, this can further include collecting, generating, and/or updating information relating to the user who traversed the connecting vector and/or relating to the data object. This step is discussed at greater length below in the processes depicted in FIGS. 14-16, 18, 19, 22, and 23. In some embodiments, steps 348 and 350 can be performed repeatedly as multiple users traverse multiple connecting vectors within the knowledge network. In some embodiments, these traversals of the connecting vectors can create massive data volume that can preclude a human for performing some or all of the processes described herein. Further, in some embodiments, this massive data volume can allow the accurate and desired operation of the knowledge network in identifying one or several paths for users through all or portions of the knowledge network.

After the traversed vectors have been updated, the process 340 proceeds to block 352, wherein self-optimization is determined. In some embodiments, this can include determining whether some or all of the connecting vectors, and/or contexts including user contexts and/or connecting vector contexts, have stabilized. In some embodiments, this can include determining if some or all of the magnitudes of the connecting vectors have stabilized. This stabilization can be indicative of the proper functioning of the knowledge network in identifying a context and/or a connecting vector.

Figure 9A:
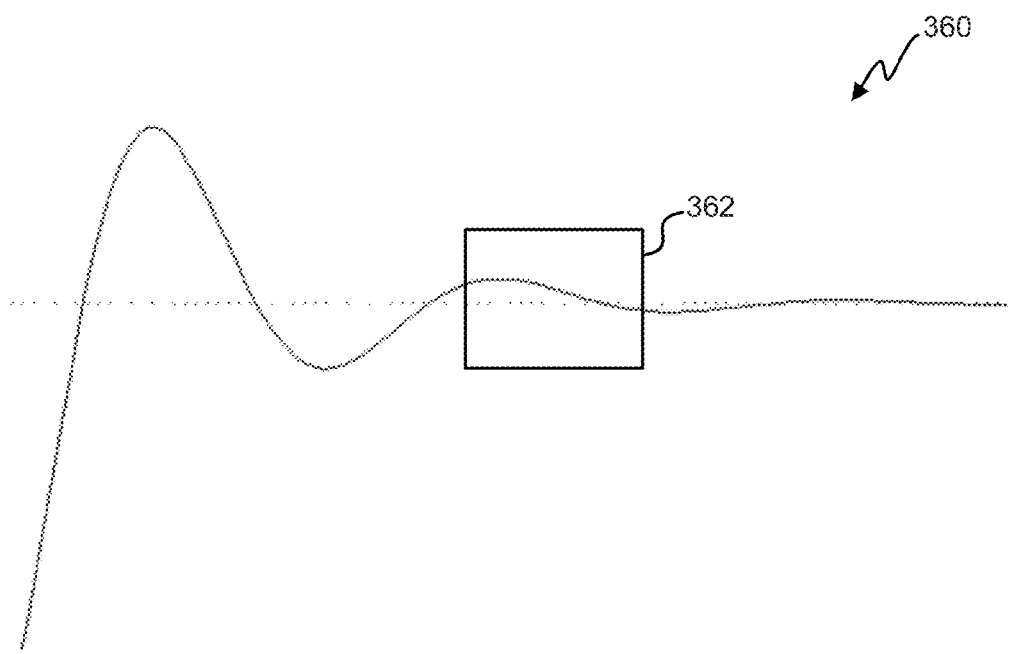
FIG. 9A is graphical depiction of the magnitude of a connecting vector with respect to time and/or with respect to the number of users traversing that connecting vector.
Figure 9B:
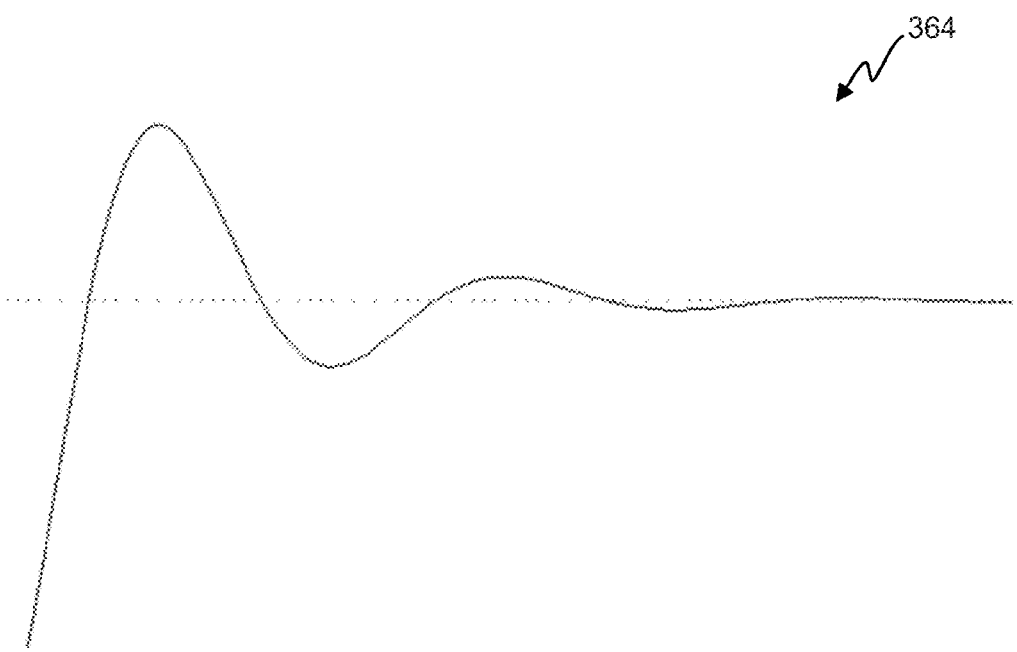
FIG. 9B is a graphical depiction of the magnitude of a connecting vector with respect to time and/or with respect to the number of users traversing that connecting vector and being constrained to the shifting window.

This stabilization is graphically depicted in FIGS. 9A and 9B. FIG. 9A is graphical depiction 360 of the magnitude of a connecting vector with respect to time and/or with respect to the number of users traversing that connecting vector. As seen in FIG. 9A, in embodiments in which the magnitude of the connecting vector stabilizes, the graphical depiction 360 of that magnitude can be similar to the graphical depiction of the movement of a damped system with respect to time in that the oscillation in the system and the variation of the magnitude decay over time and/or as the number of users traversing the connecting vector increases. While FIG. 9A is a graphical depiction 360 of a connecting vector, the contexts of the knowledge network can, in some embodiments, exhibit similar behavior when the knowledge network is functioning properly.

In some embodiments, this stabilization can occur due to the matching of users to the data objects such that a desired outcome is achieved for the student traversing the connecting vector. In some embodiments, stabilization can be defined as achieved when the oscillations have decayed to be less than 30%, 25%, 20%, 15%, 10%, 5%, 1%, and/or any other or intermediate percent of the maximum oscillation. In some embodiments, stabilization can be further defined as achieved when the oscillations have decayed to less than a threshold value within a specified time frame and/or with a specified number of samples. This second constraint can be applied via the use of a temporal bias and/or shifting window 362. In some embodiments, the shifting window 362 can define the bounds of a time frame and/or sample size relevant to the determination of stabilization. further constraint on stabilization FIG. 9B is a graphical depiction 364 of the magnitude of a connecting vector with respect to time and/or with respect to the number of users traversing that connecting vector and being constrained to the shifting window 362. As seen in FIG. 9B, the magnitude of the connecting vector stabilizes as the oscillations at the right hand edge of the graphical depiction 364 have decayed to be less than 30%, 25%, 20%, 15%, 10%, 5%, 1%, and/or any other or intermediate percent of the maximum oscillation in FIG. 9B.

Returning again to block 352 of FIG. 8, if self-optimization is not determined such as, for example, if the magnitude of the connecting vector or of one or several of the contexts has not stabilized, then remedial action can be taken. In some embodiments in which a magnitude of a connecting vector and/or a context of a connecting vector has not stabilized, then the data object associated with the connecting vector can be evaluated. In some embodiments, the result of this evaluation can be a determination to remove the data object from the knowledge network, to revise all or portions of the content of the data object, or the like. Alternatively, if self-optimization is determined, then the process 340 can be repeated as more user transverse one or several connecting vectors.

Figure 10:
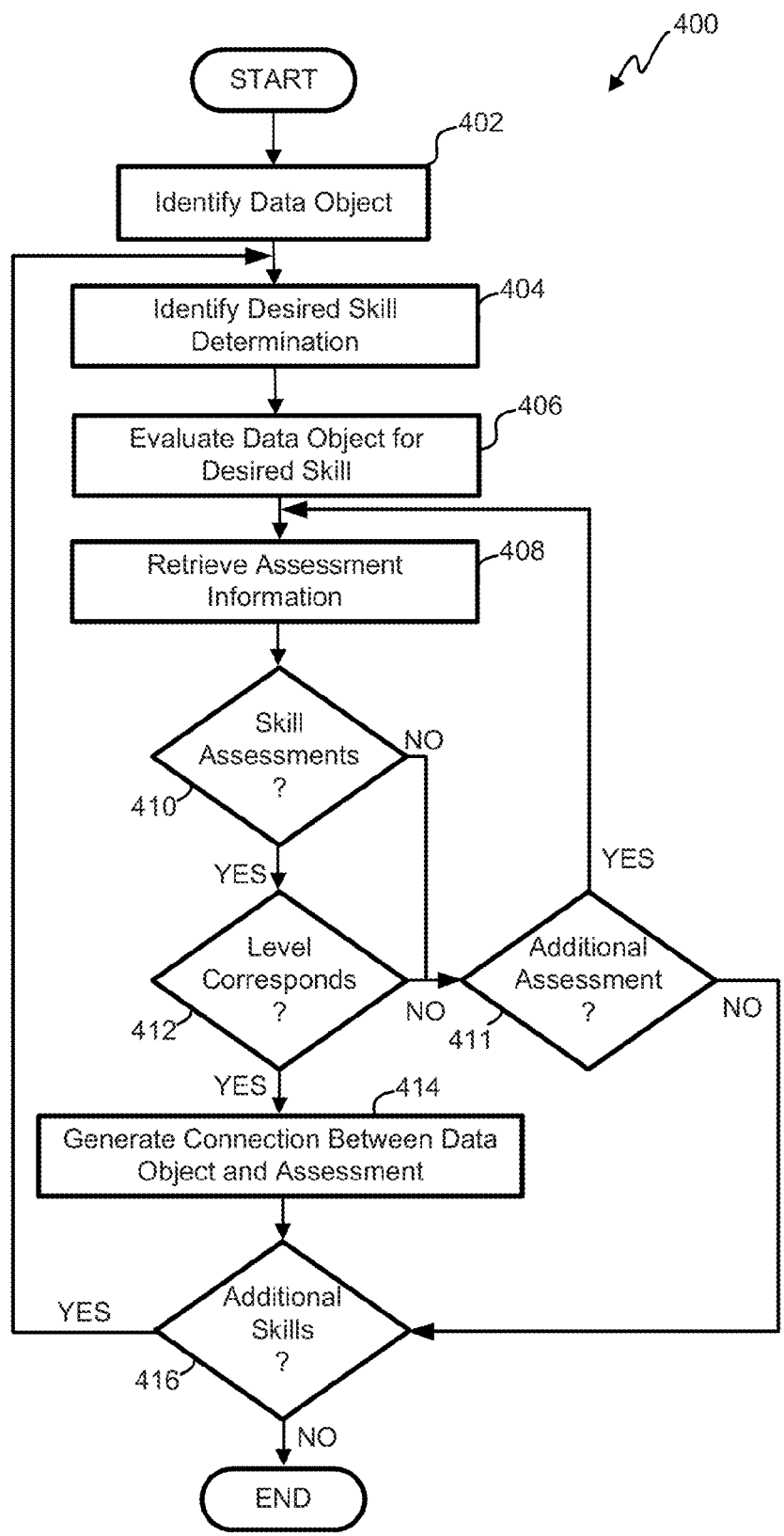
FIG. 10 is a flowchart illustrating one embodiment of a process for associating a content object with an assessment.

With reference now to FIG. 10, a flowchart illustrating one embodiment of a process 400 for associating content, such as contained by a content object, with an assessment is shown. In some embodiments, the process 400 can be performed when a new data object is added to the object network, or with data objects already contained within the object network. The process 400 can be performed by the neural network content distribution system 100 and/or one or several components thereof. The process 400 begins at block 402 wherein a data object and/or content object in the data object is identified. In some embodiments, the identified data object can be a data object that is being added to the object network, a data object that has been recently added to the object network, and/or a data object that is already within the object network. In some embodiments, the data object can be identified by retrieving information from one of the database servers 104 such as the object database 144. In one such embodiment, the object database 144 can contain information indicating whether the process 400 has been performed on any, some, or all of the data objects in the object network. This information can be analyzed to identify a subset of the data objects for which process 400 has not been performed. From the subset, one or several of the data objects can be selected, and after completion of process 400, the information indicating whether the process 400 has been performed on the one or several selected data objects can be updated.

In some embodiments, and as part of block 402, portions of the content of one or several of the data objects can be selected. In one such embodiment, for example, one or several content objects within the one or several data objects can be selected for evaluation. In this embodiment, the one or several content objects can be selected via similar process to that used in selecting the data objects, and specifically by identifying a subset of the content objects for which process 400 has not been completed and selecting one or several of the content objects from the identified subset of the content objects.

After the data object has been identified, the process 400 proceeds to block 404 wherein a desired skill determination is identified. In some embodiments, for example, one or several analyses can be performed on a data object to evaluate the data object for one or several skill levels. In some embodiments, the skill level can relate to the subject matter of the data object, and in some embodiments, the skill level can be a non-subject skill level that does not relate to the subject of the data object. In some embodiments, skill levels can include a quantile skill level, a lexile skill level, or the like. In some embodiments, one of the database servers 104, such as the object database 144 can include information indicating analyses that have been performed on the identified data object. In some embodiments, this information can include information indicating whether a skill level has been identified for the data object. In such an embodiment, the process 400 can include retrieving this information from the one of the databases 104 and identifying a subset of analyses that have not been performed on the identified data object and/or skill levels that have not been identified for the identified data object. In one embodiment, one or several desired skill determinations can be selected from the subset of analyses that have not been performed on the identified data object and/or skill levels that have not been identified for the identified data object. In such an embodiment, this information can be updated upon the completion of process 400.

After the desired skill determination has been identified, the process 400 proceeds to block 406 wherein the data object is evaluated for the desired skill level. In some embodiments, this evaluation can be performed by the processor 102 and/or other component of the neural network content distribution system 100. In some embodiments, for example, this evaluation of the data object can include retrieving data associated with the data object and/or content object and identifying the skill level of the content of the data object and/or of the content object from the retrieved data. In some embodiments, this evaluation can include an evaluation of the content of the data object and/or of the content object for skill level indicators. These skill level indicators can be any feature that indicates a skill level and can include, for example, word usage, vocabulary, mathematical and/or scientific symbols, sentence structure, used grammatical rules, and/or the like. In some embodiments, the existence of one or several of these skill level indicators can correspond to a skill level and in some embodiments, the existence of certain skill level indicators can correspond to a first skill level and the existence of second and/or first and second skill level indicators can correspond to a second skill level. In some embodiments, the data object and/or content object is evaluated for the desired skill by identifying one or several skill level indicators within the content of the data object and/or of the content object and correlating the identified skill level indicators to a skill level.

After the data object has been evaluated for the desired skill, the process 400 proceeds block 408 wherein assessment information is retrieved. In some embodiments, the assessment information can be associated with an assessment and can identify attributes of the assessment. In some embodiments, the assessment information can be stored within one of the databases 104 such as, for example, the assessment database 154. In one embodiment, for example, the assessment information can identify a skill evaluated by the assessment and a skill level of the assessment.

After the assessment information has been retrieved, the process 400 proceeds to decision state 410 wherein it is determined if the skill evaluated by the assessment corresponds to the desired skill. In some embodiments, this determination can be made by the processor 102 by retrieving information indicating the desired skill and extracting information identifying the skill evaluated by the assessment from the assessment information. The information indicating the desired skill can be compared to the information identifying the skill evaluated by the assessment to determine if both the desired skill and the skill evaluated by the assessment are the same.

If it is determined that the assessment evaluates a different skill than the desired skill, then the process 400 proceeds to decision state 411 and determines if there are additional assessments. In some embodiments, this can include querying one the databases 104, such as the assessment database 154 for information regarding assessments. In some embodiments, this information can identify whether some or all of the assessments have been evaluated for correspondence to the content currently the subject of process 400. If it is determined that there are additional assessments, then the process 400 returns to block 408 wherein assessment information for additional assessments is retrieved.

Returning again to decision state 410, if it is determined that the assessment evaluates the same skill as the desired skill, then the process 400 proceeds to decision state 412 wherein it is determined if the skill level of the assessment matches the skill level of the content of the data object and/or of the content object. In some embodiments, this can include a comparison of the determined skill level of content of the content object and/or of the data object and the skill level identified within the assessment information. In some embodiments, this comparison can be performed by the processor 102.

If it is determined that the skill level evaluated by the assessment does not match the skill level of the content of the data object and/or of the content object a different skill than the desired skill, then the process 400 proceeds to decision state 411 and determines if there are additional assessments. In some embodiments, this can include querying one the databases 104, such as the assessment database 154 for information regarding assessments. In some embodiments, this information can identify whether some or all of the assessments have been evaluated for correspondence to the content currently the subject of process 400. If it is determined that there are additional assessments, then the process 400 returns to block 408 wherein assessment information for additional assessments is retrieved.

Returning again to decision state 412, if it is determined that the skill levels of the assessment and of content correspond, then the process 400 proceeds block 414 wherein a connection between the content and the assessment is generated. In some embodiments, this connection can be stored in one of the databases of one or more of the databases 104 such as, for example, the object database 144 and/or the assessment database 154. In such an embodiments, the server 102 can output an indicator of the connection between the content and the assessment, which output can be received by the recipient database server 104, and can be used to update the desired database.

In some embodiments, and as part of block 414, connections between evaluated content in the data object and/or the content objects can be connected with other content contained within other data objects and/or other content objects within the object network. The details of the generation of connections throughout the object network will be discussed at greater length below.

After the connection between the content and the assessment has been generated, or returning again to decision state 411 if it is determined that there are no additional assessments, then the process 400 proceeds to decision state 416 wherein it is determined whether to perform additional skill level evaluations on the content of the data object and/or the content object. In some embodiment, this determination can be made by identifying whether the content has been evaluated for all of a desired set of skills. If the content has not been evaluated for all of the desired set of skills, then the process 400 returns to decision state 404. If the content has been evaluated for all of the desired set of skills, then the process 400 terminates or continues with other steps.

Figure 11:
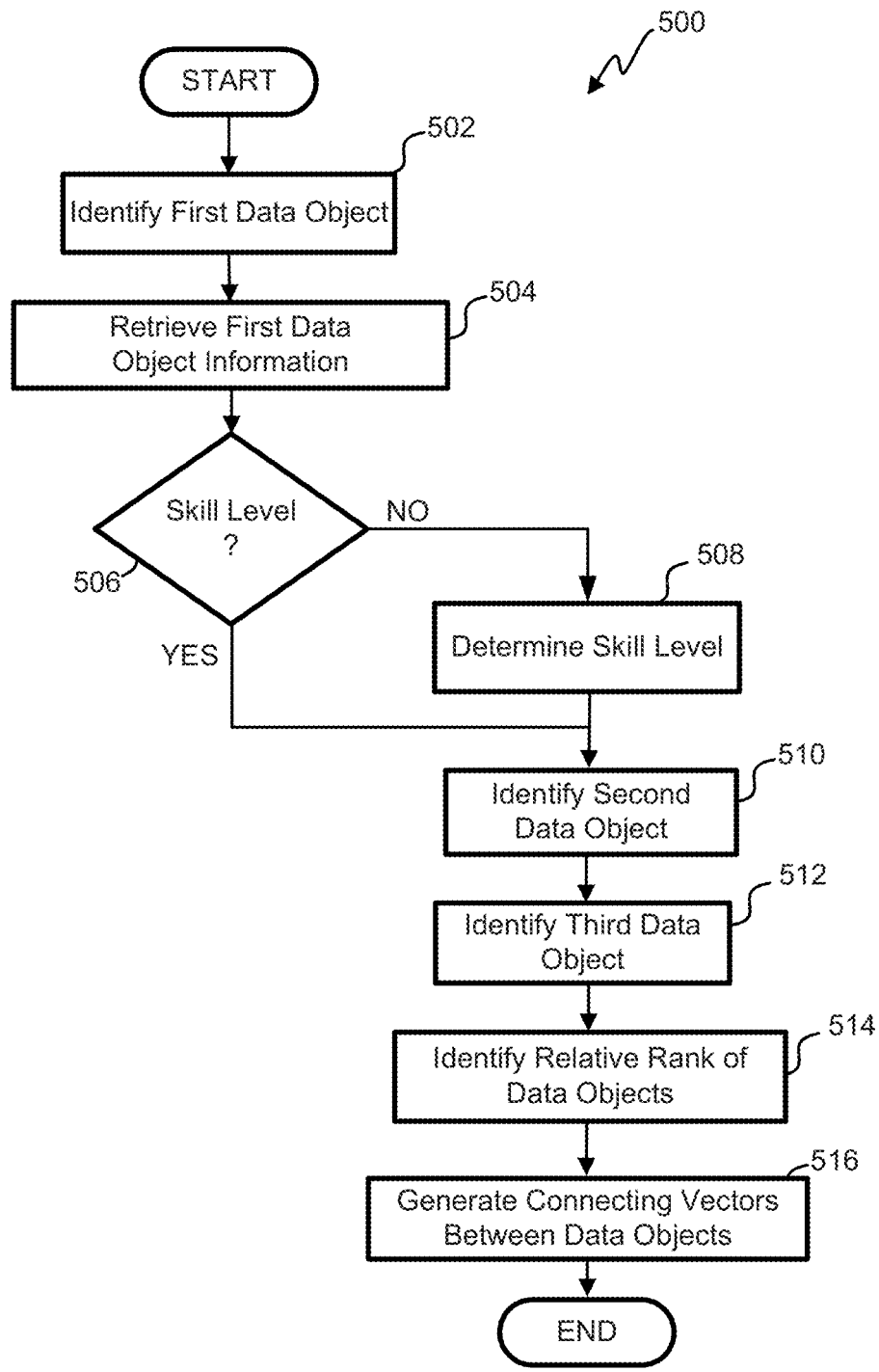
FIG. 11 is a flowchart illustrating one embodiment of a process for placing a data object within an object network.

With reference now to FIG. 11, a flowchart illustrating one embodiment of a process 500 for placing content such as contained within a data object or a content object within an object network is shown. In some embodiments, this placement can be such that both the data object and the object network share a common subject and/or subject matter. As the process 500 relates to content in both data objects and in content objects, which content can be gaming content, content, or the like, the following references to data objects broadly encompass content contained within data objects and/or content objects including gaming and/or content. In some embodiments, the process 500 can be performed when a new data object is added to the object network. The process 500 can be performed by the neural network content distribution system 100 and/or one or several components thereof. The process 500 begins at block 502 wherein a first data object is identified. In some embodiments, the first data object can be the data object that is being added to the object network. The first data object can be stored within one of the databases 104 including, for example, the object database 144, and can be identified by accessing information from the same.

After the first data object has been identified, the process 500 proceeds to block 504 wherein first data object information is retrieved. In some embodiments, the first gaming and/or data object information can include metadata providing information relating to the content of the first data object such as, for example, metadata identifying aspects of the content objects composing the first data object. In some embodiments, the first data object information can be associated with the data object in one of the databases 104 such as, for example, the object database 144.

After the first data object information has been retrieved, the process 500 proceeds to decision state 506 wherein it is determined if a subject dependent skill level, also referred to herein as a subject skill level, is associated with the first data object. In some embodiments, the subject skill level is dependent on the subject matter of the data object. In one exemplary embodiment, for example, the object network can be directed at history, and thus, the subject skill level of the data object can be the level of difficulty associated with the history related content of the data object. In some embodiments, the subject dependent skill level can be identified in the metadata associated with the data object retrieved in block 504. Alternatively, in some embodiments, a subject independent skill level can be determined for the data object. In such an embodiment, the metadata associated with the data object can comprise one or several values identifying the subject dependent skill level of the data object such as, for example, a value identifying the lexile level associated with the gaming and/or learning object and/or the quantile level associated with the gaming and/or learning object.

If it is determined that the first data object is not associated with a subject dependent skill level, then the process proceeds to block 508 wherein the subject dependent skill level is determined. Alternatively, in some embodiments, the subject independent skill level can be determined in block 508. In some embodiments, this determination can be made by the processor 102 and/or other component of the neural network content distribution system 100. In one embodiment, for example, substantive analysis of the content of the data object can be performed to determine the skill level, including, for example, the subject independent skill level of the data object and/or the subject dependent skill level of the data object. In one embodiment, for example, this analysis can comprise content analysis, lexile analysis, and/or quantile analysis. In some embodiments, the determination of the skill level of the data object can include storing a value associated with the data object and indicative of the skill level of the data object in one of the databases 104 such as, for example, the object database 144.

After the skill level has been determined or, returning to decision state 506 if it is determined that the data object is associated with the skill level, the process 500 proceeds to block 510 wherein a second data object is identified. In some embodiments, the second data object comprises one of the data objects stored within one of the databases 104 such as the object database 144, and the second data object can be associated with metadata including a value indicative of the skill level of the second data object. In some embodiments, the skill level of the second data object can be one increment higher and/or one decrement lower than the skill level of the first data object. In some embodiments, the second data object can be identified by the processor 102 or by another component of the neural network content distribution system 100.

After the second data object has been identified, the process 500 proceeds to block 512 wherein a third data object is identified. In some embodiments, the third data object comprises one of the data objects stored within one of the databases 104 such as the object database 144, and the third data object can be associated with metadata including a value indicative of the skill level of the third data object. In some embodiments, the skill level of the third data object can be one increment higher and/or one decrement lower than the skill level of the first data object. In some embodiments, the third data object can be identified by the processor 102, or by another component of the neural network content distribution system 100.

After the third data object has been identified, the process proceeds to block 514 wherein the relative rank of the data objects is identified. In some embodiments, this can include retrieving values identifying the skill level of the data objects from one of the databases 104 such as the object database 144, and comparing those values identifying the skill level of the data objects. In some embodiments, this relative ranking of the data objects can be performed by the processor 102 and/or by another component of the neural network content distribution system 100.

After the relative rank of the data objects has been identified, the process 500 proceeds to block 516 wherein connecting vectors between the three data objects are generated. In some embodiments, the connecting vectors between the three data objects are generated to reflect the incrementing skill level, starting with the data object having the lowest skill level. In some embodiments, for example, the data object having the lowest skill level can be connected by a connecting vector to the data object having a higher skill level, and that data object can be connected via a connecting vector to the data object having the highest skill level. In some embodiments, connecting vectors connecting the data objects can identify a prerequisite relationship so as to enable identification of which data object is a skill level that is prerequisite to the next data object. Advantageously, the generation of such connecting vectors allows placement of a new data object within the object network.

In some embodiments, the generation of the connecting vectors can further include storing data relating to the generated connecting vectors and/or storing the generated connecting vectors in one of the databases 104. In some embodiments, this can include, for example, outputting the connecting vector and/or data relating to the connecting vector to the recipient one of the databases 104, and, after receiving the connecting vector and/or the data relating to the connecting vector, storing the same in the recipient one of the databases 104.

Figure 12:
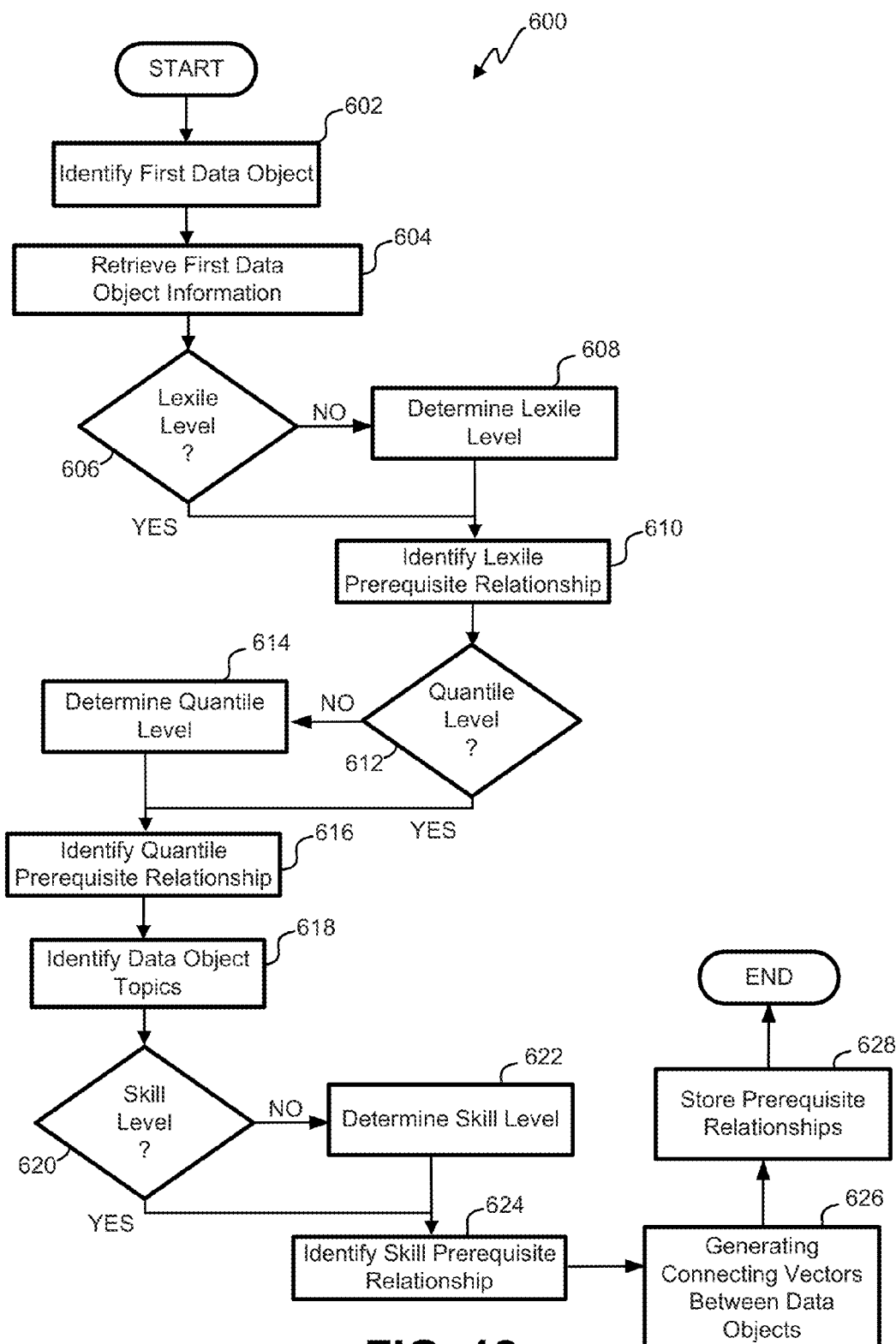
FIG. 12 is a flowchart illustrating one embodiment of a process for generating a multidimensional object network.

With reference now to FIG. 12, a flowchart illustrating one embodiment of a process 600 for generating a multidimensional object network is shown. In some embodiments, the process 600 can be performed as an alternative to process 500 shown in FIG. 11, and in some embodiments, the steps of process 600 and process 500 can be intermixed. The process 600 specifically relates to a process for generating a multidimensional knowledge network that can connect content contained within one or several data objects and/or content objects. As the process 600 relates to content contained in both learning objects and/or content objects, including, for example, gaming and/or learning content, the following references to data objects broadly encompass content objects.

In some embodiments, the process 600 can be performed as an alternative to process 500 shown in FIG. 11, and in some embodiments, the steps of process 600 and process 500 can be intermixed. In some embodiments, process 600 can be performed as part of adding a data object to the object network. The process 600 can be performed by the neural network content distribution system 100 and/or one or several components thereof. The process 600 begins at block 602 wherein a first data object is identified. In some embodiments, the first data object can be the data object that is being added to the object network. In some embodiments, the first data object can be identified with information stored within one of the databases 104 including, for example, the object database 144.

After the first data object has been identified, the process 600 proceeds to block 604 wherein first data object information is retrieved. In some embodiments, the first data object information can include metadata providing information relating to the content of the first data object such as, for example, metadata identifying aspects of the content objects composing the first data object. In some embodiments, the first data object information can be associated with the data object in one of the databases 104 such as, for example, the object database 144.

After the first data object information has been retrieved, the process 600 proceeds to decision state 606 wherein it is determined if a lexile level is associated with the first data object. In some embodiments, the lexile level is independent of the subject matter of the data object and relates instead to the generic lexile level of the data object. In some embodiments, the lexile level can be identified in the metadata associated with the data object retrieved in block 604. In such an embodiment, the metadata associated with the data object can comprise one or several values identifying the lexile level of the data object.

If it is determined that the first data object is not associated with a lexile level, then the process proceeds to block 608 wherein the lexile level is determined. In some embodiments, this determination can be made by the processor 102 and/or other components of the neural network content distribution system 100. In one embodiment, for example, substantive analysis of the content of the data object can be performed to determine the lexile level of the data object. In one embodiment, for example, this analysis can be lexile analysis. In some embodiments, the determination of lexile level of the data object can include storing a value associated with the data object and indicative of the lexile level of the data object in one of the databases 104 such as, for example, the object database 144.

After the lexile level has been determined or, returning to decision state 606 if it is determined that the data object is associated with a lexile level, the process 600 proceeds to block 610 wherein the lexile prerequisite relationship is identified. In some embodiments, the identification of the lexile prerequisite relationship can include identifying one or several data objects having a lexile level that is one decrement less than the lexile level of the first data object and identify one or several data objects having a lexile level that is one increment greater than the lexile level of the first data object. In some embodiments, this identification can be made based on metadata stored within one of the databases 104 and specifically the object database 144. In one particular embodiment, metadata including values identifying lexile levels of one or several data objects is retrieved from the object database 144, and the values identifying the lexile level of the one or several data objects are compared to identify prerequisite relationships between the first data object and one or several other data objects. In some embodiments, this identification can be performed by the processor 102 and/or another component of the neural network content distribution system 100.

After the lexile prerequisite relationship has been identified, the process 600 proceeds to decision state 612 wherein it is determined if a quantile level is associated with the first data object. In some embodiments, the quantile level is independent of the subject matter of the data object and relates instead to the generic quantile level of the data object. In some embodiments, the quantile level can be identified in the metadata associated with the data object retrieved in block 604. In such an embodiment, the metadata associated with the data object can comprise one or several values identifying the quantile level of the data object.

If it is determined that the first data object is not associated with a quantile level, then the process 600 proceeds to block 614 wherein the quantile level is determined. In some embodiments, this determination can be made by the processor 102 and/or other components of the neural network content distribution system 100. In one embodiment, for example, substantive analysis of the content of the data object can be performed to determine the quantile level of the data object. In one embodiment, for example, this analysis can be quantile analysis. In some embodiments, the determination of the quantile level of the data object can include storing a value associated with the data object and indicative of the quantile level of the data object in one of the databases 104 such as, for example, the object database 144.

After the quantile level has been determined or, returning to decision state 612 if it is determined that the data object is associated with a quantile level, the process 600 proceeds to block 616 wherein the quantile prerequisite relationship is identified. In some embodiments, the identification of the quantile prerequisite relationships can include identifying one or several data objects having a quantile level that is one decrement less than the quantile level of the first data object and identify one or several data objects having a quantile level that is one increment greater than the quantile level of the first data object. In some embodiments, this identification can be made based on metadata stored within one of the databases 104 and specifically in the object database 144. In one particular embodiment, metadata including values identifying quantile levels of one or several data objects is retrieved from the object database 144, and the values identifying the quantile level of the one or several data objects are compared to identify prerequisite relationships between the first data object and one or several other data objects. In some embodiments, this identification can be performed by the processor 102 and/or another component of the neural network content distribution system 100.

After the quantile prerequisite relationship has been identified, the process 600 proceeds to block 618 wherein data object topics are identified. In some embodiments, and as discussed above, the data object can include a plurality of content objects and an assessment associated with the content objects. In such an embodiment, each of the content objects can represent a different topic within the data object and/or some or all of the content objects can represent a plurality of topics. In such an embodiment, the process 600 can identify some or all of the plurality of topics associated with the data object. This identification can be done by the processor's 102 analysis of metadata associated with the data object that can be retrieved from one of the databases 104 such as the object database 144.

After the data object topics have been identified, the process 600 proceeds to decision state 620 wherein it is determined if a skill level is associated with some or all of the topics of the first data object. In some embodiments, a skill level can be one or both of the quantile level and the lexile level, and in some embodiments, the skill level can include other subject related and/or subject independent skill metrics. In some embodiments, the skill level can be identified in the metadata associated with the data object retrieved in block 618. In such an embodiment, the metadata associated with the data object can comprise one or several values identifying the skill level of some or all of the topics of the data object.

If it is determined that the evaluated topic of the first data object is not associated with a skill level, then the process 600 proceeds to block 622 wherein the skill level is determined. In some embodiments, this determination can be made by the processor 102 and/or other components of the neural network content distribution system 100. In one embodiment, for example, substantive analysis of the evaluated topic of the data object can be performed to determine the skill level of the evaluated topic of the data object. In one embodiment, for example, this analysis can be quantile analysis, lexile analysis, or analysis associated with any other subject related and/or subject independent skill level. In some embodiments, the determination of the skill level of the evaluated topic of the data object can include storing a value associated with the evaluated topic of the data object and indicative of the skill level of the evaluated topic of the data object in one of the databases 104 such as, for example, the object database 144.

After the skill level of the evaluated topic has been determined or, returning to decision state 620 if it is determined that some of the of the topics of the data object are associated with a known skill level, the process 600 proceeds to block 624 wherein the skill prerequisite relationship is identified. In some embodiments, the identification of the skill prerequisite relationships can include identifying one or several data objects and/or topics of data objects having a skill level that is one decrement less than the skill level of the one or several evaluated topics of the first data object and/or identify one or several data objects and/or topics of data objects having a skill level that is one increment greater than the skill level of the one or several evaluated topics of the first data object. In some embodiments, this identification can be made based on metadata stored within one of the databases 104 and specifically the object database 144. In one particular embodiment, metadata including values identifying skill levels of one or several data objects and/or of one or several topics associated with data objects is retrieved from the object database 144, and the values identifying the skill level of the one or several data objects and/or of the one or several topics associated with the data objects are compared to identify prerequisite relationships between the one or several topics of the first data object and one or several other data objects and/or one or several topics of one or several other data objects. In some embodiments, this identification can be performed by the processor 102 and/or other component of the neural network content distribution system 100.

After the skill prerequisite relationship has been identified, the process 600 proceeds to block 626 wherein connecting vectors between the identified data objects and/or the identified topics of data objects are generated. In some embodiments, the connecting vectors are generated to reflect the identified prerequisite relationships and to indicate the relationship of the identified skill levels of the data objects and/or the topics associated with the data objects. Advantageously, the generating of such connecting vectors allows placement of a new data object within the object network and the movement of a user, such as a gamer or a student, between data objects to remediate and/or supplement a user learning experience. After the connecting vectors have been generated, the process 600 proceeds to block 628, wherein the prerequisite relationships and the generated connecting vectors are stored. In some embodiments, these prerequisite relationships and generated connecting vectors can be associated with the data objects and/or the data object topics to which they relate, and can be stored in one of the databases 104 such as, for example, the object database 144. This can include, for example, providing the prerequisite relationships and the generated connecting vectors to one of the databases 104, and storing the prerequisite relationships and the generated connecting vectors in one of the databases of the recipient database server 104 such as, for example, in the object database 144.

The present disclosure relates to systems and methods for optimizing connecting vectors. The optimization of the connecting vectors can include the compilation of the user generated data, and the analysis of that data to determine the effectiveness of the data object associated with the connecting vector. This effectiveness can be characterized by a binary value indicating whether the user successfully traversed the connecting vector and successfully completed material associated with the data object. If the user successfully traversed the connecting vector and completed material associated with the data object, then a binary value indicative of the successful completion of the data object would be associated with the user outcome and would be applied to the connecting vector. This binary value would increase the strength of the connecting vector to thereby indicate the success of the user in traversing the connecting vector. If the user did not successfully traverse the connecting vector and complete material associated with the data object, then a binary value indicative of the failure of the user to successfully complete the data object would be associated with the user outcome and would be applied to the connecting vector. This binary value would decrease the strength of the connecting vector to thereby indicate the failure of the user in traversing the connecting vector.

Additionally, the present disclosure relates to systems and methods for optimizing connecting vectors with respect to one or several user contexts including, for example, a user learning style. In some embodiments, the optimization of the connecting vectors with respect to one or several user contexts can include the compilation of user generated data, and the analysis of that data to determine the effectiveness of the data object associated with the connecting vector for one or several user contexts. This effectiveness can be characterized by a binary value indicating whether the user successfully traversed the connecting vector and completed material associated with the data object. If the user successfully traversed the connecting vector, the user contexts can be compared to a context of the connecting vector. The user context can include information relating to a user's learning type and/or gaming style as well as other information relating to past performance by the user. The context of the connecting vector can include information relating to rates of success of users having different user contexts including, for example, different learning styles. If the user context matches the connecting vector context, then the vector can be strengthened, and if the user context does not match the connecting vector context, then the user information can be updated based on the effectiveness of the connecting vector. Similarly, if the user fails to successfully traverse the connecting vector, the user context can be compared to the context of the connecting vector. If the user context matches the connecting vector context, then the vector can be weakened, and if the user context does not match the connecting vector context, then the user information can be updated based on the ineffectiveness of the connecting vector.

Figure 13:
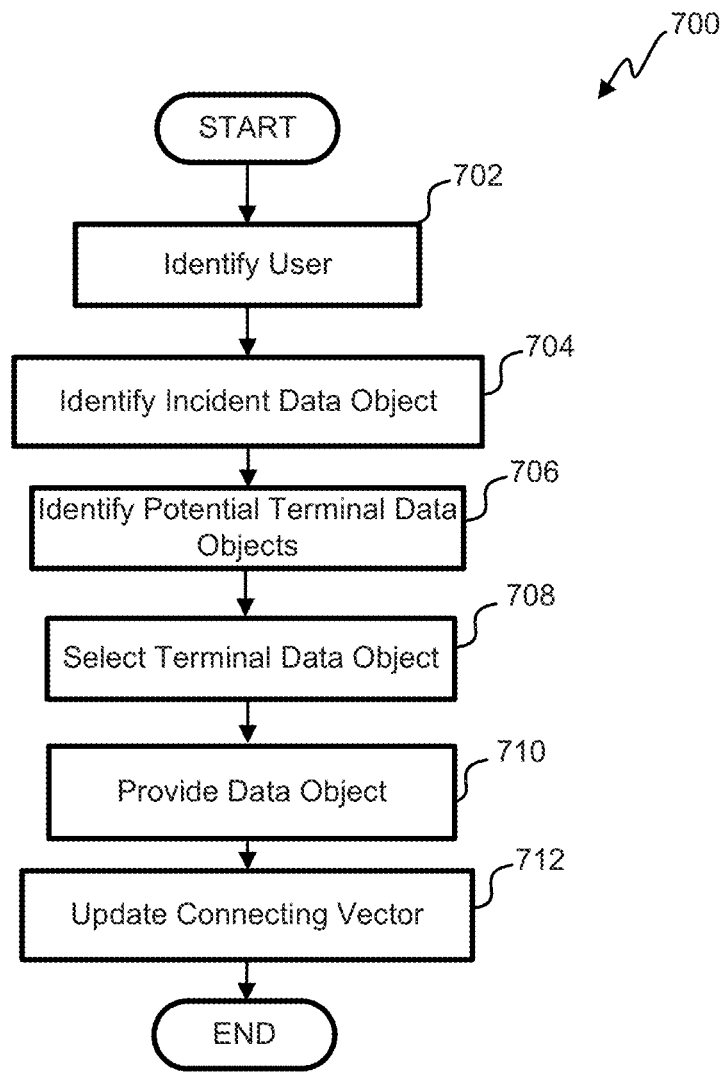
FIG. 13 is a flowchart illustrating one embodiment of a process for selecting a terminal data object and updating a connecting vector.

With reference now to FIG. 13, a flowchart illustrating one embodiment of a process 700 for selecting a terminal data object and updating a connecting vector is shown. The process 700 begins at block 702 wherein a user is identified. In some embodiments, the user is identified based on inputs received from the user device 106 and/or based on information stored within the user profile database 140. After the user has been identified, the process 700 proceeds to block 704 wherein the incident data object is identified. In some embodiments, after the user has been identified, information relating to the user's progress in the object network 300 can be retrieved from the user profile database 140. This information can include, for example, the user context. This information can identify data objects that the user has completed and can be used to thereby identify the incident data object. In some embodiments, for example, the user context can include one or several values associated with one or several of the data objects, which values can indicate whether the user has completed the one or several of the data objects. In one embodiment, for example, these values can be extracted from the user context and the processor 102 can identify the incident data object as the data object from which no connecting vector has been traversed.

After the data object has been identified, the process 700 proceeds block 706 wherein potential terminal data objects are identified. In some embodiments, for example, the potential terminal data objects are data objects connected to the incident data object via a single connecting vector. In one embodiment, for example, after the processor 102 has identified the incident data object, the processor 102 can retrieve information relating to connecting vectors from the incident data object. The processor 102 can then identify the data objects at which the identified connecting vectors terminate. These identified data objects are the potential terminal data objects. In some embodiments, a value can be associated with the potential terminal data objects, which value can identify the potential terminal data objects.

After the potential terminal data objects have been identified, the process 700 proceeds to block 708 wherein a terminal data object is selected, for example, from one of the identified potential terminal data objects. In some embodiments, for example, the selection can be made by the processor 102 based on information relating to the terminal data objects and/or the connecting vector leading to the terminal data object. In some embodiments, for example, the combination of the user context as well as the connecting vector context can be used by the processor 102 in selecting the terminal data object.

After the terminal data object has been selected, the process 700 proceeds to block 710 wherein the data object is provided. In some embodiments, for example, the data object can be provided to the user including, for example, the user, via the user device 106, and specifically via the network interface 170, the content engine 232, and/or the user interface 238. In some embodiments, providing data object to the user can further include receiving answers which can be, for example, the inputs provided by the user in response to the assessment and/or answer data which answer data can be, for example, data generated based on the answers such as an indication of correct or incorrect answers, a score, an evaluation, or the like.

After the data object has been provided, the process 700 proceeds to block 712 wherein the connecting vector is updated. In some embodiments, for example, the connecting vector can be updated, by the processor 102 and/or the user device 106, according to the received answers and/or answer data. In some embodiments, the connecting vector can be updated to reflect an aspect of the user performance in traversing the connecting vector and/or in completing the terminal data object of the connecting vector.

This can include, for example, generating an update value and providing the update value to one or several of the databases 104 that contain the one or several databases including the connecting vector. This update value can be received by the recipient database server 104, and can be used to update the appropriate connecting vector.

The following flowcharts illustrate embodiments of processes for updating a connecting vector and/or for generating data used in updating the connecting vector. These processes can be performed as part of process 700 depicted in FIG. 13 or separate from the process 700 depicted in FIG. 13.

Figure 14:
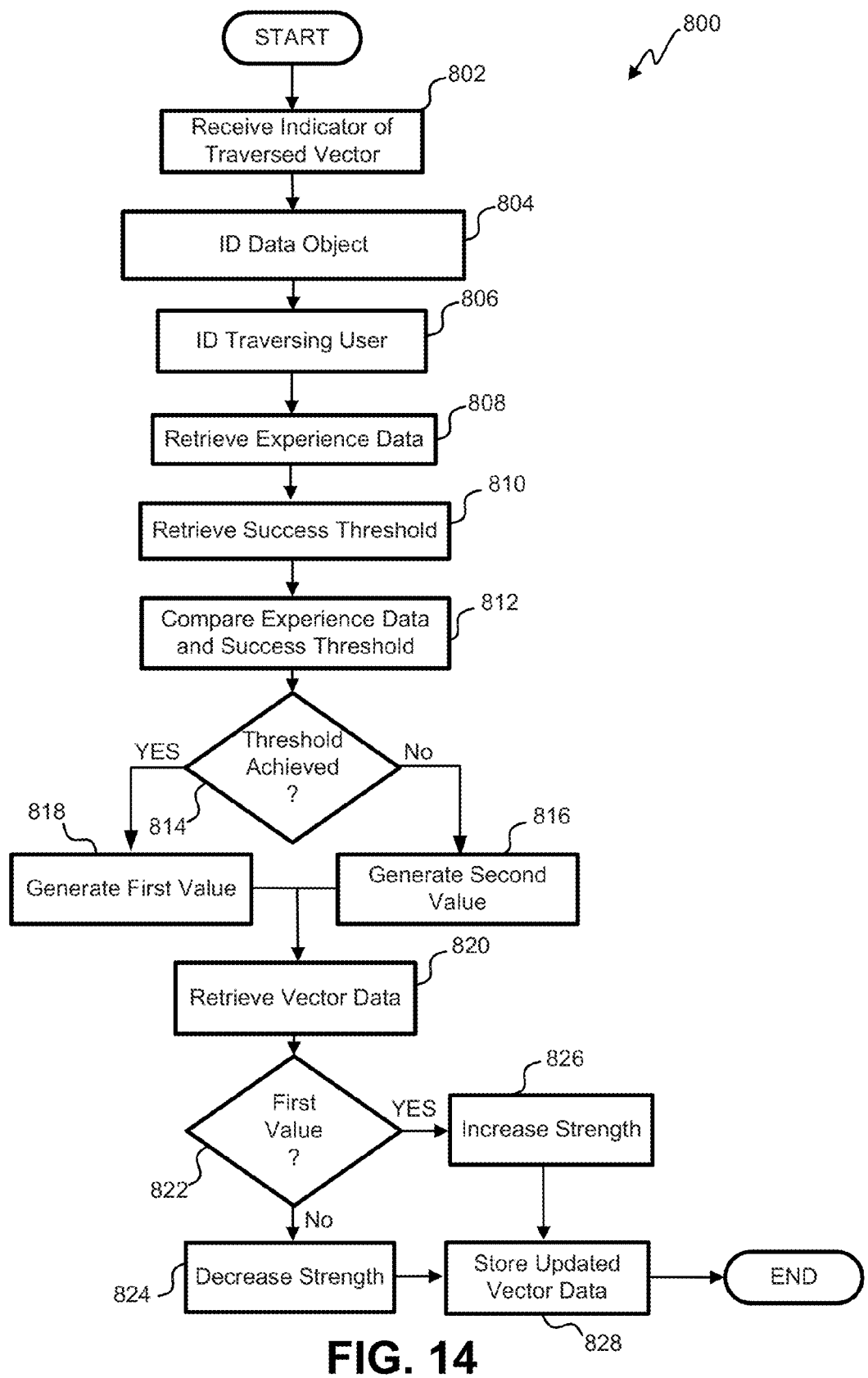
FIG. 14 is a flowchart illustrating one embodiment of a process for updating a connecting vector based on a user outcome.

With reference now to FIG. 14, a flowchart illustrating one embodiment of a process 800 for updating a connecting vector based on a user outcome is shown. In some embodiments, the process 800 can be performed by the neural network content distribution system 100 and/or by a component thereof. The process 800 begins at block 802 wherein an indicator of the traversed vector is received. In some embodiments, the indicator of the traversed vector can indicate the incident data object to the traversed connecting vector, the terminal data object to the connecting vector, and information relating to the traversal of the connecting vector. In some embodiments, this information can be received from, for example, the user device 106, the data source 108, and/or one of the databases 104.

After the indicator of the traversed vector has been received, the process 800 proceeds to block 804 wherein the terminal data object of the connecting vector is identified. In some embodiments, this step can include evaluation of the indicator of the traversed vector for information identifying the terminal data object of the connecting vector. This can be performed by, for example, the processor 102, the user device 106, and/or a component of either of these.

After the terminal data object of the connecting vector has been identified, the process 800 proceeds to block 806 wherein the user that traversed the connecting vector is identified. Similar to block 804, in some embodiments, this step can include evaluation of the indicator of the traversed connecting vector for information identifying the traversing user. In some embodiments, this information can be a username, user identification number, an encrypted identifier, or any other data or information that identifies the user. The identification of the user can be, for example, performed by the processor 102, the user device 106, or any component of either of the processor 102 and the user device 106.

After the traversing user has been identified, the process 800 proceeds to block 808 wherein experience data is retrieved. In some embodiments, the experience data can identify the user experience with the connecting vector and the terminal data object associated with the connecting vector. Specifically, the experience data can identify the success and/or degree of success of the user in traversing the connecting vector, the speed with which the user traversed the connecting vector, or the like. In some embodiments, this data can be extracted from the indicator of the traversed vector received in block 802, and in some embodiments, this information can be received from one of the databases 104, the user device 106, and/or the data source 108.

After the experience data has been retrieved, the process 800 proceeds to block 810 wherein a success threshold is retrieved. In some embodiments, the success threshold can be a threshold that identifies the boundary between user performance corresponding to the successful completion of a data object and/or traversal of a connecting vector. The success threshold can be retrieved from one of the databases 104 such as for example, the evaluation database 156.

After the success threshold has been retrieved, the process 800 proceeds to block 812 wherein the experience data is compared with the success threshold. In some embodiments, this comparison can include determining if the experience data exceeds the success threshold such as if the value representing the experience data is larger than the value representing the success threshold. In some embodiments, this comparison can be performed by the processor 100 and/or by any other component of the neural network content distribution system 100.

After the experience data has been compared with the success threshold, then the process 800 proceeds to decision state 814 wherein it is determined if the success threshold has been achieved. In some embodiments, for example, this can include receiving results of the comparison performed in block 812 determining, based on the results of the comparison performed in block 812, if the success threshold has been achieved. This determination can be performed by the processor 102 and/or by one of the user devices 106. If the success threshold has been achieved, then the process 800 proceeds to block 818 wherein a first value is generated and/or associated with the indicator of the traversed vector, the identification of the traversing user, the identification of the data object, the experience data, and/or the like. In some embodiments, the first value can be generated according to a Boolean function by, for example, the processor 102 and/or the user device 106. Returning again to decision state 814 if it is determined that the threshold value has not been achieved, then the process 800 proceeds to block 816 wherein a second value is generated and/or associated with the indicator of the traversed vector, the identification of the traversing user, the identification of the data object, the experience data, and/or the like. In some embodiments, for example, the second value can be generated according to a Boolean function by, for example, the processor 102 and/or the user device 106.

After the first or second value has been generated, the process 800 proceeds to block 820 wherein the vector data is retrieved. In some embodiments, vector data can include information identifying the vector strength and/or the magnitude of the vector. In some embodiments, for example, the vector data can be retrieved from the vector database 152. In such an embodiment, for example, the first value, which can be, for example, the first value after the vector data has been retrieved, the process 800 proceeds to decision state 822 wherein it is determined if the first value is generated. In some embodiments, this can include determining if the first value was associated with the indicator of the traversed vector, with the identification of the traversing user, with the identification of the data object, with the experience data, and/or the like.

If it is determined that the first value was generated, then the process proceeds to block 826 wherein the strength of the vector is increased. In some embodiments, for example, the strength of the vector can be increased by positively incrementing a value associated with the vector strength. Returning again to decision state 822, if it is determined that the first value was not generated, the process proceeds to block 824 wherein the strength of the vector is decreased. In some embodiments, for example, the strength of the vector can be decreased by decrementing a value associated with the vector strength. After the strength of the vector has been updated according to one of blocks 824, 826, the process 800 proceeds to block 828 wherein the updated vector data is stored. In some embodiments, the updated vector data can be stored within one of the databases 104 such as, for example, the vector database 152. This storage can include outputting the updated vector data to the desired one of the databases 104, and storing the updated vector data therein.

Figure 15:
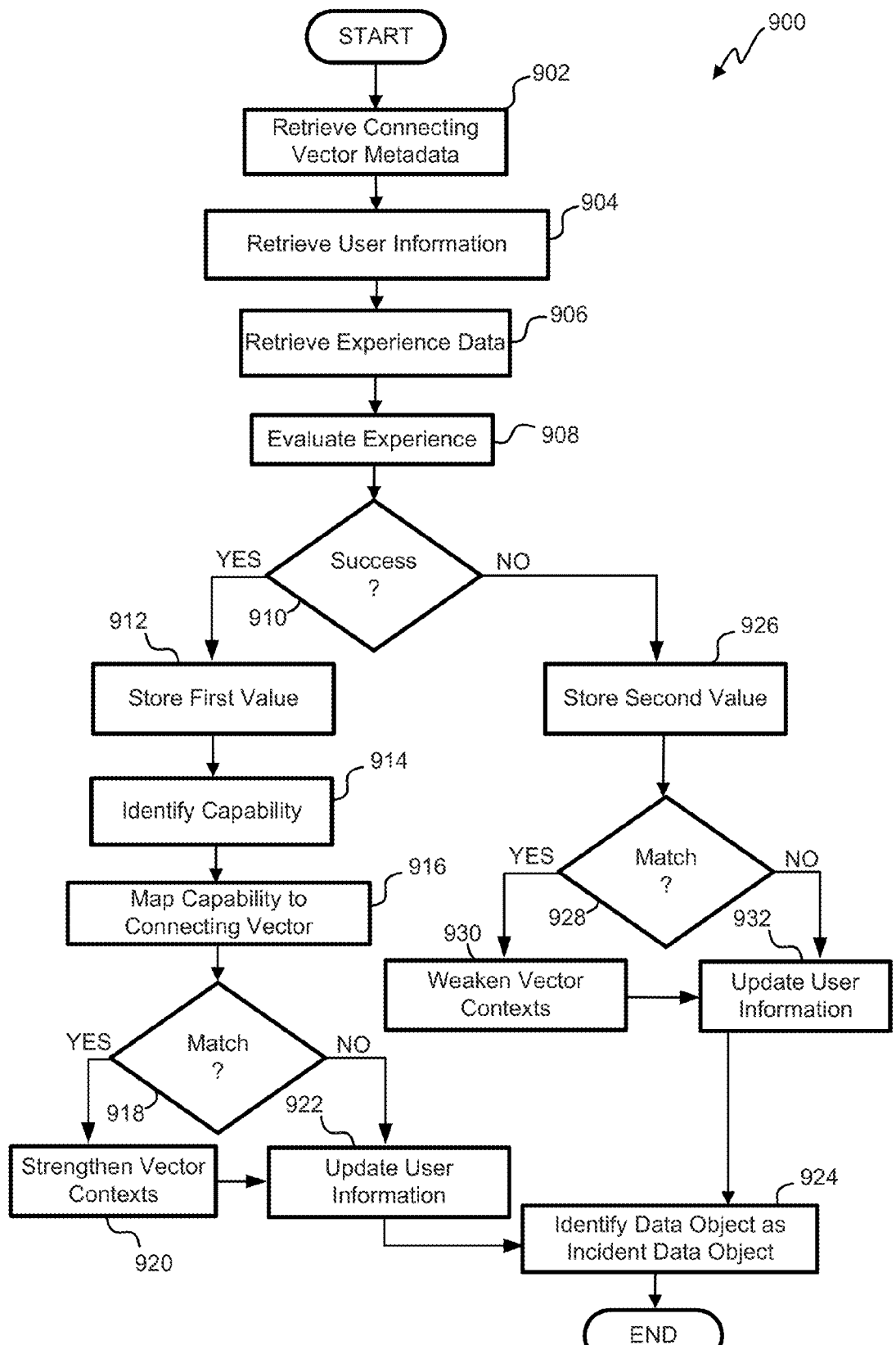
FIG. 15 is a flowchart illustrating one embodiment of a process for updating a connecting vector based on the user outcome and the connecting vector context.

With reference now to FIG. 15, a flowchart illustrating one embodiment of a process 900 for updating a connecting vector based on the user outcome in the connecting vector context is shown. The process 900 can be performed by the neural network content distribution system 100, by a component of the neural network content distribution system 100, by the user device 106, and/or by a component thereof. The process 900 begins at block 902 wherein connecting vector metadata is received. In some embodiments, the connecting vector metadata can be received from the vector database 152, and can include information identifying the strength, magnitude, direction, or other aspects of the vector. In some embodiments, the vector metadata can include information identifying a connecting vector context. The connecting vector context can comprise aggregated data relating to users who have traversed the connecting vector. In some embodiments, this information can include correlations between all or portions of the user context and outcomes of traversing the connecting vector. In some embodiments this information can include correlations between the learning style of the user and the expected level of success in traversing the connecting vector.

After the connecting vector metadata has been received, the process 900 proceeds to block 904 wherein user information is retrieved. In some embodiments, the user information can comprise user context information, which user context can identify a user's learning style, the user's current data objectives, and/or the user's learning performance history which can be, for example, biased for temporal significance. In some embodiments, the user context can be received from the user profile database 140.

After the user information has been retrieved, the process 900 proceeds to block 906 wherein experience data is retrieved. In some embodiments, the experience data can identify the user experience in traversing the connecting vector. Specifically, the experience data can identify the success and/or degree of success of the user in traversing the connecting vector, the speed with which the user traversed the connecting vector, or the like. In some embodiments, the experience data can be retrieved from the user device 106 and/or the data source 108.

After the experience data has been retrieved, the process 900 proceeds block 908 wherein the user experience is evaluated. In some embodiments, the evaluation of the user experience can be performed by the processor 102 and/or by the user device 106. In some embodiments, this evaluation can include determining whether the user successfully traversed the connecting vector and successfully completed material associated with the data object. After the user's experience with the connecting vector has been evaluated, the process 900 proceeds to decision state 910 wherein it is determined if the user successfully traversed the connecting vector. In some embodiments, this determination can be made by the processor 102 or the user device 106. In some embodiments, the determination of the user success can include associating a value, according to a Boolean function, with the user. In such an embodiment, a first value can be associated with the user if the user successfully traversed the connecting vector, and a second value can be associated with the user if the user did not successfully traverse the connecting vector.

If it is determined that the user successfully traversed the connecting vector, then the process 900 proceeds to block 912 wherein the first value is stored. In some embodiments, the first value can be stored in one of the databases 104 including, for example, the user profile database 140. After the first value has been stored, the process 900 proceeds to block 914 wherein the capability of the user, including for example, the capability and/or the gaming capability, is identified. In some embodiments, the identification of the capability the user can include retrieving information from the user context identifying the user's learning style and/or the user's historic learning experiences. In some embodiments, this information can identify how a user learns, best modes for the user to learn, subject matter abilities or difficulties, or the like. In some embodiments, this identification can be performed by the processor 102, by the user device 106, or by a component of either of these.

After the capability of the user is identified, the process 900 proceeds to block 916 wherein the capability of the user is mapped to the connecting vector, and specifically is mapped to the connecting vector metadata including the connecting vector context. In some embodiments, this step can include determining whether aspects of the user context, and specifically the user learning style correspond with information generated by users that have previously traversed the connecting vector. In one embodiment, for example, this can include determining whether previously traversing users had the same learning style and/or same or similar learning context as the current traversing user. In some embodiments, this mapping can be performed by the processor 102 and/or by the user device 106.

After the capability of the user has been mapped to the connecting vector, the process 900 proceeds to decision state 918 wherein it is determined if the user capability, and particularly, if the user learning style corresponds to the learning styles of users who successfully traversed the connecting vector. This determination can be made, in some embodiments, by the processor 102 and/or by the user device 106. If it is determined that there is a match, then the process 900 proceeds to block 920 wherein the vector contexts are strengthened. In some embodiments, this can include strengthening the connecting vector as discussed to block 426 above, or strengthening the vector with respect to the specific and/or matching learning context between the user capability and the connecting vector. In some embodiments, for example, the strength of the vector context can be increased by positively incrementing a value associated with the vector strength.

After the vector contexts have been strengthened, or, returning again to decision state 918, if it is determined that there is not a match, then the process 900 proceeds to block 922 wherein user information is updated. In some embodiments, for example, this can include updating the user context to reflect the success of the user in traversing the connecting vector. In some embodiments, for example, this can further include updating the user context to either strengthen the identification of the user learning style identified within the user context, or to weaken the identification of the user learning style identified with the user context. In some embodiments, for example, in which the user capability matches capabilities of users who successfully traversed the connecting vector, the identification of the user learning style within the user context can be strengthened by, for example, positively incrementing a value associated with the learning style. In some embodiments, for example, in which the user capability does not match the capabilities of users who successfully traverse the connecting vector, the identification of the user learning style within the user context can be weakened by, for example, decrementing a value associated with the learning style. In one embodiment, for example, a new learning style can be identified, which learning style can be the learning style shared by users who successfully traversed the connecting vector.

After the user information has been updated, the process 900 proceeds to block 924 wherein the completed data object is identified as an incident data object and the new terminal data object and the associated connecting vector is identified. In some embodiments, this identification can be performed by the processor 102 or the user device 106 and can be based on information contained within one or more of the databases 104.

Returning again to decision state 910, if it is determined that the user did not successfully traverse the connecting vector, then the process 900 proceeds to block 926 wherein the second value is stored. In some embodiments, the second value can be stored in one of the databases 104 including, for example, the user profile database 140.

After the second value has been stored, the process 900 proceeds to decision state 928 wherein it is determined if the capability of the user that currently traversed the connecting vector, and particularly, if that user's learning style corresponds to the learning styles of users who previously did not successfully traverse the connecting vector. In some embodiments, this can include identifying the capability of the user as discussed in block 914 and/or mapping the capability of the user to the connecting vector, and particularly to the context of the connecting vector as discussed in block 916. This determination can be made, in some embodiments, by the processor 102 and/or by the user device 106. If it is determined that there is a match, then the process 900 proceeds to block 930 wherein the vector context are weakened. In some embodiments, this can include weakening the connecting vector as discussed to block 424 above, or weakening the vector with respect to the specific and matching learning contexts between the user capability and the connecting vector. In some embodiments, for example, the strength of the vector context can be decreased by decrementing a value associated with the vector strength.

After the vector contexts have been weakened, or, returning again to decision state 928, if it is determined that there is not a match, then the process 900 proceeds to block 932 wherein user information is updated. In some embodiments, for example, this can include updating the user context to reflect the failure of the user in traversing the connecting vector. In some embodiments, for example, this can further include updating the user context to either strengthen the identification of the user learning style identified within the user context, or to weaken the identification of the user learning style identified with the user context. In some embodiments, for example, in which the user capability matches capabilities of users who did not successfully traverse the connecting vector, the identification of the user learning style within the user context can be strengthened by, for example, positively incrementing a value associated with the learning style. In some embodiments, for example, in which the user capability does not match the capabilities of users who did not successfully traverse the connecting vector, the identification of the user learning style within the user context can be weakened by, for example, decrementing a value associated with the learning style. In one embodiment, for example, a new learning style can be identified, which learning style can be the learning style shared by users who did not successfully traverse the connecting vector.

After the user information has been updated, the process 900 proceeds to block 924 wherein the completed data object is identified as an incident data object and the new terminal data object and the associated connecting vector is identified. In some embodiments, this identification can be performed by the processor 102 or the user device 106 and can be based on information contained within one or more of the databases 104. This identification can include, in some embodiments, outputting an indicator of the identified data object to the user such as, for example, via a screen, monitor, display, or the like.

Figure 16:
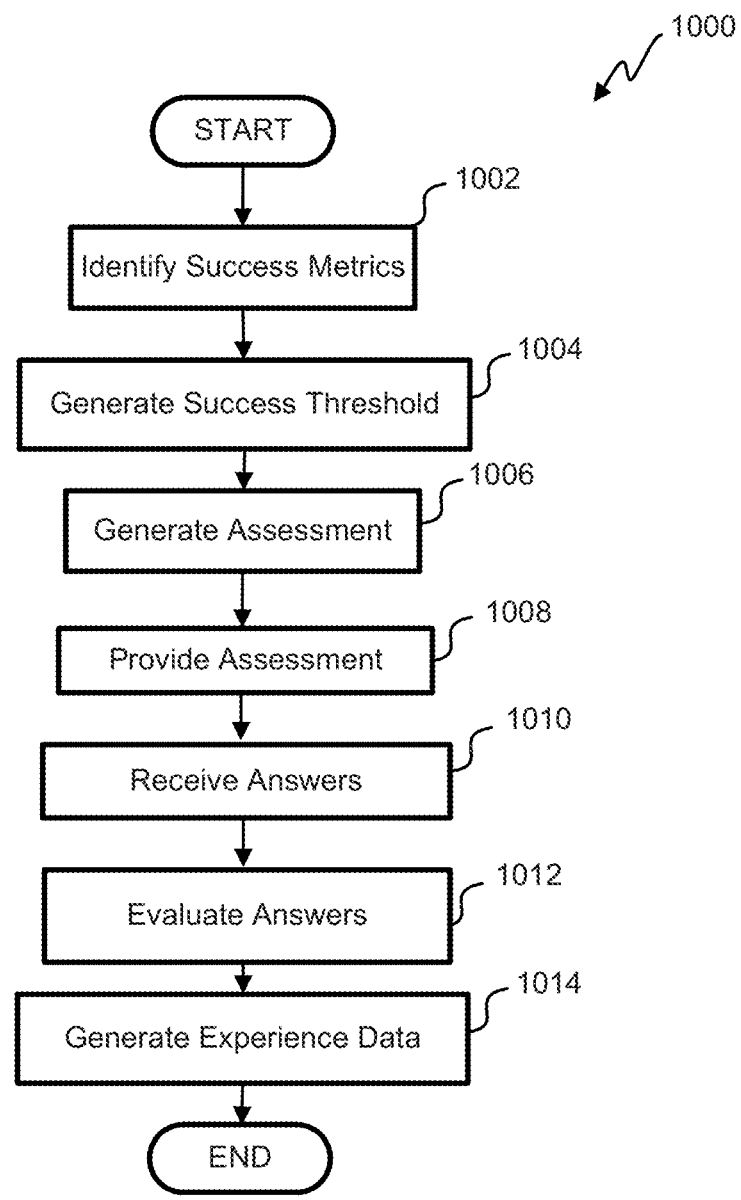
FIG. 16 is a flowchart illustrating one embodiment of a process for generating experience data.

With reference now to FIG. 16, a flowchart illustrating one embodiment of a process 1000 for generating experience data is shown. In some embodiments, the experience data characterizes user activity in traversing the connecting vector. In some embodiments, the experience data characterizes the degree of user success in traversing the connecting vector and in some embodiments, for example, the experience data can be a binary indicator of the success or failure of the user in traversing the connecting vector. Thus, in embodiments in which mere success or failure may be indicated, and not a degree of success or failure. Alternatively, in some embodiments, the degree of success or failure may be indicated. The process 1000 can be performed by the neural network content distribution system 100 and/or a component thereof including, for example, the processor 102 and/or the user device 106.

The process 1000 begins at block 1002 wherein a success metric is identified. The success metric can identify a desired outcome resulting from the completion of the data object and can relate to any aspect of the data object. In some embodiments, the success metric can identify parameters of the comprehensive successful traversal of the connecting vector and/or the comprehensive successful completion of the data object. In some embodiments, the comprehensive successful traversal of the connecting vector and/or the comprehensive successful completion of the data object can be based on the user mastery of all of the content of the data object.

In some embodiments, the success metric can comprise a plurality of parameters that each identify the successful traversal of the connecting vector and/or the successful completion of the data object with respect to a subset of the content of the data object. In some embodiments, this subset of the content of the data object can include, for example, quantile content of the terminal data object, lexile content of the terminal data object, the topic of the terminal data object, the quantile, lexile, or topic of any or all of the content objects of the data object, or the like. In some embodiments, the success metric can be retrieved from one of the databases 104 and/or can be in good into the neural network content distribution system 100 via one of the user devices 106 and/or one of the other data sources 108.

After the success metric has been identified, the process 1000 proceeds to block 1004 wherein the success threshold is generated. In some embodiments, the success threshold can be a value defining a successful traversal of the connecting vector and defining an unsuccessful traversal of the connecting vector. The success threshold can be generated based on the success metric, and in some embodiments in which a plurality of success metrics have been identified, the success threshold can comprise a plurality of thresholds associated with the connecting vector. In one such embodiment, each of the thresholds of the success threshold can be associated with one or several of the success metrics and thus, in one embodiment, for example, one of the thresholds of the success threshold can be associated with the quantile performance of the user in traversing the connecting vector, one of the thresholds of the success threshold can be associated with the lexile performance of the user in traversing the connecting vector, one of the thresholds of the success threshold can be associated with the user level of mastery of the subject matter of the data object, one of the thresholds of the success threshold can be associated with user mastery of subject matter associated with one or several of the content objects of the data object, one of the thresholds of the success threshold can be associated with a user attribute such as, for example, user education history, user learning style and/or learning tendency, or the like. In some embodiments, each of the thresholds of the success threshold can be used to identify the successful traversal of the connecting vector with respect to one or more of the success metrics. Thus, in one embodiment, for example, a user may successfully traverse the connecting vector with respect to the quantile performance of the user and a user may simultaneously fail to successfully traverse the connecting vector with respect to the lexile performance of the user. In one such embodiment, the threshold associated with quantile performance may indicate the user's successful traversal of the connecting vector and the threshold associated with lexile performance may indicate the user's failure to successfully traverse the connecting vector. In some embodiments, the success threshold can be stored in one of the databases 104 such as, for example, the evaluation database 156.

After the success threshold has been generated, the process 1000 proceeds to block 1006 wherein an assessment is generated. In some embodiments, for example, the assessment can be generated based on the content objects of the data object and can be configured to provide data corresponding to the success metrics and/or the generated success threshold to allow the determination of whether the user successfully traversed the connecting vector and successfully completed the terminal data object of the connecting vector. In some embodiments, the assessment can be generated based on the quantile level, the lexile level, or the subject matter of the data object and/or of the content objects of the data object. The assessment can be generated by the processor 102, the user device 106 and/or one of the data sources 108.

After the assessment has been generated, the process 1000 proceeds to block 1008 wherein the assessment is provided. In some embodiments, the assessment can be provided to the user via, for example, the user device 106 and specifically via the user interface 238. After the assessment has been provided, the process 1000 proceeds to block 1010 wherein answers and/or answer data is received. In some embodiments, the answers and/or the answer data can be received from the user via, for example, the user device 106 and/or the user interface 238 of the user device. After the answers and/or answer data has been received, the process 1000 proceeds to block 1012 wherein the answers are evaluated. In some embodiments, the answers and/or the answer data can be evaluated by comparing the answers and/or the answer data to a correction key and/or an evaluation metric. This comparison can be performed by the processor 102, the user device 106, or a component of either of these.

After the answers have been evaluated, the process 1000 proceeds to block 1014 wherein experience data is generated. In some embodiments, the experience data can be generated based on the results of the evaluation of the answers, and the experience data can reflect the degree to which the user demonstrated mastery of the subject matter of the data object and/or the one or several content objects of the data object. In some embodiments, the experience data can include information corresponding to some or all of the plurality of success metrics and/or some or all of the plurality of thresholds in the success threshold. The experience data can be generated by the processor 102, the user device 106, or a component of either of these. In some embodiments, the generation of the experience data can further include the updating of one of the databases of one of the databases 104 via, for example, the outputting of experience data to the desired one of the databases 104.

The present disclosure relates to systems and methods for recommending a network path. The recommending of a network path can include, for example, identifying a user's location within an object network that can be made of a plurality of data objects that are interconnected by a plurality of connecting vectors. The data objects can each be an aggregation of content that can be, and some embodiments, associated with an assessment. The connecting vectors can each connect two of the data objects and thereby define a prerequisite relationship wherein the prerequisite data object is referred to as the incidental data object and the other data object is referred to as the terminal data object. Systems and methods for recommending a network path can further include identifying a user target data object and multiple paths made up of unique combinations of data objects and connecting vectors to reach the target data object from the user's current position within the object network.

User information can be retrieved. This information can include user context which can identify a user's past performance and/or performance history and/or one or more learning styles of the user. In some embodiments, information relating to the data objects in the various network paths can be retrieved. This information can identify the speed with which previous users traversed the connecting vectors in the network paths, the degree of success had by previous users in traversing the connecting vectors of the network path, and one or both of the speed with which previous users traversed the connecting vectors in the network path and the/or the degree of success had by previous users in traversing the connecting vectors in the network paths adjusted for the user context of the current user. After the user context and the connecting vector context are retrieved, the magnitudes of the different network paths are calculated. These magnitudes can indicate the expected speed with which the user will traverse the network path. In some embodiments, the strengths of the different network paths are calculated, which strength indicate the expected degree of success a user will have in traversing the connecting vector. The network paths are relatively ranked based on one or both of the magnitudes and strengths of the network paths. In one embodiment, one of the network paths is selected based on one or both of the magnitudes and strengths of the network paths, and the selected network path is provided to the user.

Figure 17:
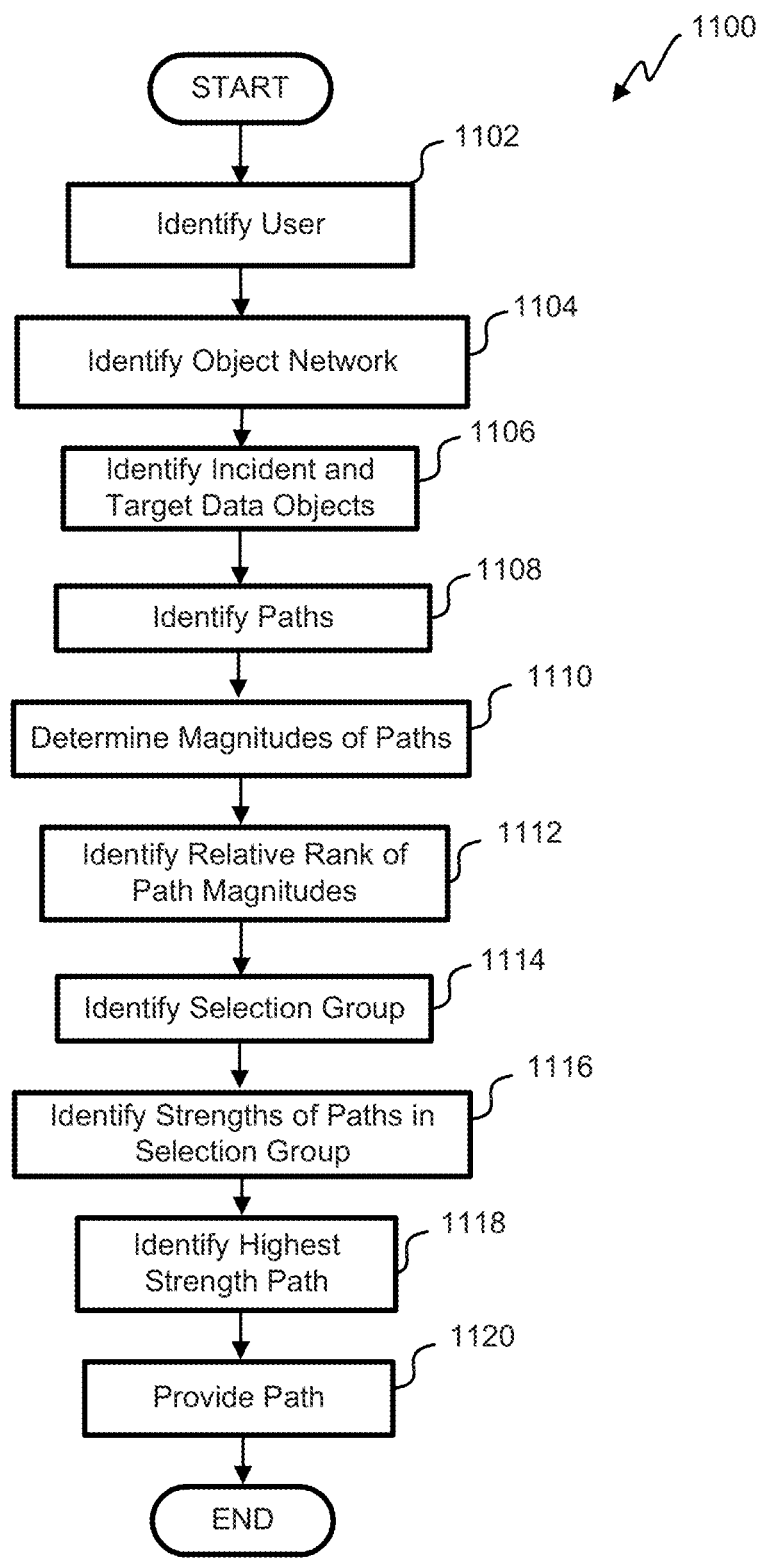
FIG. 17 is a flowchart illustrating one embodiment of a process for network path assignment.

With reference now to FIG. 17, a flowchart illustrating one embodiment of a process 1100 for path, also referred to herein as a gaming path and/or a learning path, assignment is shown. In some embodiments, the process 1100 can be used in connection with the object network to evaluate one or several paths. In some embodiments, this evaluation of the paths can facilitate in providing a path to the user. In some embodiments, the process 1100 can be performed by the neural network content distribution system 100 or a component thereof including, for example, the processor 102 and/or the user device 106.

The process 1100 begins at block 1102 wherein the user is identified. In some embodiments, for example, the user can be identified based on user interactions with the neural network content distribution system 100. These interactions can include, for example, the user accessing the neural network content distribution system 100 including, for example, the user logging onto the neural network content distribution system 100. In some embodiments, the identification of the user can further include the retrieval of user information including, for example, the user context from the user profile database 140.

After the user has been identified, the process 1100 proceeds to block 1104 wherein the object network is identified. In some embodiments, for example, the neural network content distribution system 100 can include information relating to a plurality of object networks, and in some embodiments, the user can be involved with and/or complete data objects in a plurality of object networks. In some embodiments, the identification of the object network can include, for example, retrieving information from the user profile database 140 to identify object networks in which the user is involved, or in which the user has completed data objects. In some embodiments, the identification of the object network can include retrieving information relating to some or all of the object networks contained in the databases 104 including, for example, object database 144. In some embodiments, the object networks can be provided to the user in connection with a prompt for the user to select one of the object networks, and the object network can be selected based on the user input received by the neural network content distribution system 100.

In some embodiments, the neural network content distribution system 100 can identify one or several object networks in which the user is involved and/or in which the user has completed data objects and can retrieve user context information from the user profile database 140. In some embodiments, the neural network content distribution system 100 can extract information identifying one or several user goals from the user context information and can use this goal information in selecting an object network. In one embodiment, for example, the neural network content distribution system 100 can identify the object network corresponding to the goal requiring the greatest amount of time to complete; corresponding to a highest priority, corresponding to a user's learning weakness, or the like.

After the object network has been identified, the process 1100 proceeds to block 1106 wherein incident and target data objects are identified. In some embodiments, the incident data object can identify the current location of the user within the object network, and can correspond to, for example, the data object most recently completed by the user, or a data object designated as the incident data object by a user such as, for example, the user, the teacher, or the like. In some embodiments, the incident data object can be identified with information retrieved from the user profile database 140 including, for example, the user context. In some embodiments, the user context can include information indicating the user's position within the object network. In some embodiments, the processor 102 and/or the user device 106 can analyze information retrieved from the user profile database 140 to identify the incident data object.

In some embodiments, the target data object can identify a data object, the completion of which is identified as a goal of the user's interaction with the object network. In some embodiments, the target data object can be identified by a user including, for example, the user, the teacher, or the like. In some embodiments, the target data object can be separated from the incident data object by one or more connecting vectors. In some embodiments, the target data object can be identified with information retrieved from the user profile database 140. The information retrieved from the user profile database 140 can include the user context, which user context can include information identifying the target data object. In some embodiments, the processor 102 and/or the user device 106 can analyze information retrieved from the user profile database 140 to identify the target data object.

After the incident target data object have been identified, the process 1100 proceeds to block 1108 wherein paths are identified. In some embodiments, the path can be one or several connecting vectors that connect the incident data object to the target data object. In some embodiments in which the path comprises a plurality of connecting vectors, the path can further include one or several data objects that, in connection with the connecting vectors, connect the incident data object and the target data object. In some embodiments, one or several paths can be identified by the evaluation of prerequisite relationships between one or both of the incident data object and the target data object. This evaluation can be performed by the processor 102 and/or the user device 106.

After one or several paths have been identified, the process 1100 proceeds to block 1110 wherein the magnitudes of the paths are determined. In some embodiments, this determination can include the identification of all of the connecting vectors within one of the paths, the retrieval of information relating to the connecting vectors within one of the paths from the vector database 152, the determination of the magnitude of the connecting vectors within one of the paths, and the summation of the magnitudes of the connecting vectors within the one of the paths. In some embodiments, this determination can further include associating a value indicative of the completion of the calculation of the magnitude of the path with the path for which the magnitude was calculated, determining if a magnitude has been determined for all of the paths, and if the magnitude has not been determined for all the paths, calculating a magnitude for the others of the paths. In some embodiments, this step can be performed by the processor 102 and/or by the user device 106.

After the magnitudes of the paths have been determined, the process 1100 proceeds to block 1112 wherein the relative rank of the path magnitudes is identified. In some embodiments, this can include comparing the magnitudes of the paths, and associating the paths with a value indicative of the size and/or relative size of the magnitudes of the paths. In some embodiments, the aggregate of these values can allow the ranking of the paths from largest to smallest magnitude. In some embodiments, this step can be performed by the processor 102 and/or by the user device 106.

In some embodiments, for example, the identification of the relative rank of the path magnitudes can include storing a value indicative of and/or representing the magnitude of each of the paths. The identification of the relative rank of the path magnitudes can further include the comparison of the values indicative of and/or representing the magnitude of each of the paths. In some embodiments, a first value associated with the first path can be compared to a second value associated with the second path and any other values associated with any other additional paths to determine which of the first, second, or other values represents a relatively larger and/or smaller magnitude and/or largest or smallest magnitude. In some embodiments, a binary value can be associated with some or all of the compared paths. In one embodiment, for example, a first binary value can be associated with the one of the values indicative of magnitudes of paths that represents a comparatively smaller magnitude and a second binary value can be associated with the one of the values indicative of the magnitudes of paths that represents the comparatively larger magnitude. In some embodiments, the magnitudes of the paths and/or the values representing the magnitudes of the paths can all be relatively ranked.

After the relative ranking of the magnitudes of the paths and/or of the values representing the magnitudes of the paths has been completed, one or several values indicating the relative ranking of the magnitudes of the paths and/or of the values representing the magnitudes of the paths can be stored. In some embodiments, these can be stored within one of the databases 104.

After the relative rank of the path magnitudes has been identified, the process 1100 proceeds to block 1114 wherein a selection group is identified. In some embodiments, the selection group can comprise a subset of the identified paths that meet a selection condition. In some embodiments, the selection group can comprise the subset of the identified paths from which the provided path is selected. The selection condition can be any condition that can be used to identify one or several paths. In some embodiments, the selection condition can correspond to an absolute aspect of a path such as, for example, an attribute of the path, the existence of which determines the inclusion of the paths within the selection group, and in some embodiments, the selection condition can correspond to a relative aspect of the path such as, for example, an attribute of the path relative to the identified paths, the existence of which determines the inclusion of the path within the selection group. In one embodiment, an absolute aspect can include, a maximum or a minimum number of data objects and/or connecting vectors within the path, a maximum or minimum magnitude of the path or of connecting vectors within the path. In some embodiments, a relative aspect can include selecting, for example, 2 paths, 3 paths, 4 paths, 5 paths, 10 paths, 20 paths, or any other or intermediate number of paths having the largest or smallest magnitudes. In some embodiments, the selection group can be identified by the neural network content distribution system 100 or component thereof including the processor 102 and/or the user device 106.

In some embodiments, steps 1116 and 1118 can be skipped. In such embodiments, the process 1100 proceeds to block 1120 and the path having the largest or smallest magnitude is provided to the user. In some embodiments, the path can be provided to the user by the user device 106, and specifically by the user interface 238 of the user device 106.

In embodiments in which steps 1116 and 1118 are not skipped, the process 1100 proceeds to block 1116 wherein the strength of the paths in the selection group is identified. In some embodiments, the strength of one of the paths can comprise a value corresponding to the strength of the connecting vectors within the one of the paths. In some embodiments, the strength of the one of the paths can be the average of the strength of the connecting vectors within the one of the paths.

The strength of the paths can be determined by the retrieval of strength information for the connecting vectors of the one of the paths from the vector database 152. In some embodiments, the strength information can be the generic strength of the connecting vectors in the one of the paths, and in some embodiments, the strength information can be strength of aspects of the connecting vector context that correspond to aspects of the user context. After the strength information has been retrieved from the vector database 152, the processor 102 and/or the user device 106 can generate the value indicative of the strength of the path. In some embodiments, this process can be repeated until the strength of all of the paths within the selection group has been identified.

After the strengths of the paths in the selection group have been identified, the process 1100 proceeds to block 1118 wherein the path having the highest strength is identified. In some embodiments, for example, this identification can be achieved via the comparison of the strengths of the paths in the selection group. This comparison can be performed by the processor 102 and/or the user device 106.

In some embodiments, the identification of the path having the highest strength can comprise generating a value from a combination of the path strength and path magnitude. In some embodiments, this value can be optimized to reflect a combination of likelihood of success in traversing the connecting vector and expected speed of the traversal of the connecting vector. In some embodiments, the path corresponding to the value indicating the best combination of the likelihood of success in traversing the connecting vector and expected speed of traversal of the connecting vector can be selected. This comparison can be performed by the processor 102 and/or the user device 106.

After the path having the highest strength has been identified, the process 1100 proceeds to block 1120 wherein the path having the highest strength is provided. In some embodiments, the path can be provided to the user by the user device 106, and specifically by the user interface 238 of the user device 106. The providing of this path can include outputting this path to the user device 106, and specifically to the user interface 238 of the user device 106.

Figure 18:
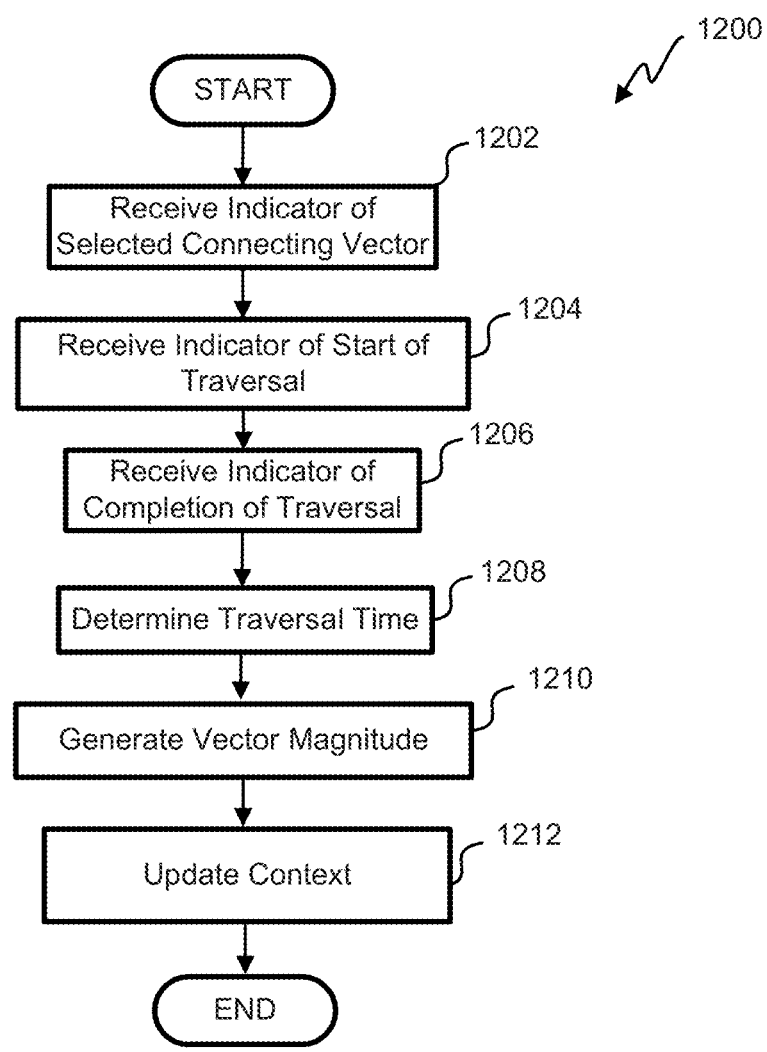
FIG. 18 is a flowchart illustrating one embodiment of a process for generating a magnitude of a connecting vector.

With reference now to FIG. 18, flowchart illustrating one embodiment of a process 1200 for generating a magnitude of a connecting vector is shown. In some embodiments, the process 1200 can be performed by the processor 102 and/or the user device 106 to generate the magnitude of the connecting vector and/or to determine the amount of time spent in traversing the connecting vector. The process 1200 begins at block 1202 wherein an indicator of a selected connecting vector is received. In some embodiments, this indicator can be received by the user device 106 in response to the user selection of the connecting vector for traversal.

After the indicator of the selected connecting vector is received, the process 1200 proceeds to block 1204 wherein an indicator of the start of the traversal is received. In some embodiments, the indicator of the start of the traversal can be an indicator of user action relating to one or several of the content objects of the terminal data object of the connecting vector. In one embodiment, for example, the indicator of the start of the traversal of the connecting vector can be provided when the user accesses the content of the terminal data object. In some embodiments, this access can be satisfied when a user merely opens and/or retrieves content from the terminal data object, and in some embodiments, this access is satisfied when the user achieves and/or maintains a desired level of interaction with the content of the terminal data object. Advantageously, determining access based on user levels of interaction with the content of the terminal data object can increase the accuracy of the determination of the magnitude of the connecting vector by allowing the elimination of nonproductive time in which the content of the terminal data object is merely open and in which the user is not interacting with the content of the terminal data object and/or in which the user is trivially interacting with the content of the terminal data object such as when the user's interaction with the content of the terminal data object does not reach a desired level. In some embodiments, the indicator of the start of the traversal of the connecting vector can comprise a timestamp indicating the date and/or time at which the user accessed the content of the terminal data object and/or interacted with the content of the terminal data object at a desired level.

After the indicator of the start of the traversal has been received, the process 1200 proceeds to block 1206 wherein an indicator of the completion of the traversal of the connecting vector is received. In some embodiments, for example, the indicator of the completion of the traversal of the connecting vector can identify when the user has completed the tasks associated with the terminal data object and/or ended access to content associated with the terminal data object. In some embodiments, the indicator of the completion of the traversal of the connecting vector can comprise a timestamp identifying the date and/or time at which the user completed the tasks associated with the terminal data object and/or ended access to content associated with the terminal data object. In some embodiments, steps 1202 to 1206 can be repeated until the connecting vector has been traversed.

After the indicator of the completion of the traversal of the connecting vector has been received, the process 1200 proceeds to block 1208 wherein the traversal time is determined. In some embodiments, this determination of the traversal time can comprise determining the total time between the receipt of the indicator of the start of the traversal of the connecting vector and the receipt of the indicator of the completion of the traversal of the connecting vector, determining the amount of time between the receipt of the indicator of the start of the traversal of the connecting vector and the receipt of the indicator of the completion of the traversal of the connecting vector in which the user was interacting with the content of the terminal data object at or above a satisfactory level, repeating the previous two steps if multiple indicators of the start of the traversal of the connecting vector and the completion of the traversal of the connecting vector were received, and, if multiple indicators of the start of the traversal of the connecting vector and of the completion of the traversal of the connecting vector were received, aggregating the time, including one or both of the total time and the time in which the user interaction with the content of the terminal data object is at or above a satisfactory level.

After the traversal time has been determined, the process 1200 proceeds to block 1210 wherein the vector magnitude is generated. In some embodiments, the vector magnitude can comprise a value indicative of the amount of time used in traversing the connecting vector. This value can be generated with, for example, the processor 102 and/or the user device 106. In some embodiments, when a magnitude for the connecting vector has already been generated using data relating to previous user traversals of the connecting vector, the magnitude of the connecting vector can be updated with the traversal time determined in block 1208.

After the vector magnitude has been generated, the process 1200 proceeds to block 1212 wherein the connecting vector context is updated. In some embodiments, for example, the update of the connecting vector context can be performed by retrieving the connecting vector context from one of the databases 104, updating the connecting vector context with the new and/or updated magnitude of the connecting vector, and saving the updated connecting vector context in one of the databases 104 such as, for example, the vector database 152 by outputting the connecting vector context to the desired one of the database servers.

Figure 19:
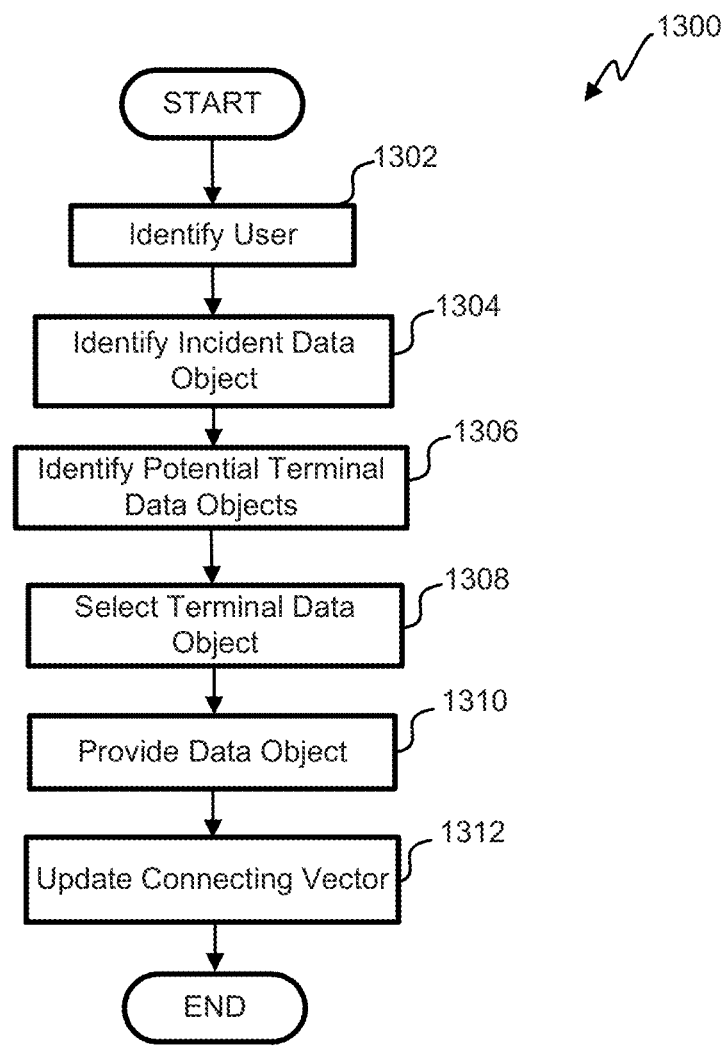
FIG. 19 is a flowchart illustrating one embodiment of a process for selecting a terminal data object and updating a connecting vector.

With reference now to FIG. 19, a flowchart illustrating one embodiment of a process 1300 for selecting a terminal data object and updating a user context is shown. The process 1300 begins at block 1302 wherein a user is identified. In some embodiments, the user is identified based on inputs received from the user device 106 and/or based on information stored within the user profile database 140. After the user has been identified, the process 1300 proceeds to block 1304 wherein the incident data object is identified. In some embodiments, after the user has been identified, information relating to the user's progress in the object network 300 can be retrieved from the user profile database 140. This information can include, for example, the user context. This information can identify data objects that the user has completed and can be used to thereby identify the incident data object. In some embodiments, for example, the user context can include one or several values associated with one or several of the data objects, which values can indicate whether the user has completed the one or several of the data objects. In one embodiment, for example, these values can be extracted from the user context and the processor 102 can identify the incident data object as the data object from which no connecting vector has been traversed.

After the data object has been identified, the process 1300 proceeds block 1306 wherein potential terminal data objects are identified. In some embodiments, for example, the potential terminal data objects are data objects connected to the incident data object via a single connecting vector. In one embodiment, for example, after the processor 102 has identified the incident data object, the processor 102 can retrieve information relating to connecting vectors from the incident data object. The processor 102 can then identify the data objects at which the identified connecting vectors terminate. These identified data objects are the potential terminal data objects. In some embodiments, a value can be associated with the potential terminal data objects, which value can identify the potential terminal data objects.

After the potential terminal data objects have been identified, the process 1300 proceeds to block 1308 wherein a terminal data object is selected, for example, from one of the identified potential terminal data objects. In some embodiments, for example, the selection can be made by the processor 102 based on information relating to the terminal data objects and/or the connecting vector leading to the terminal data object. In some embodiments, for example, the combination of the user context as well as the connecting vector context can be used by the processor 102 in selecting the terminal data object.

After the terminal data object has been selected, the process 1300 proceeds to block 1310 wherein the data object is provided. In some embodiments, for example, the data object can be provided to the user including, for example, the user, via the user device 106, and specifically via the network interface 170, the content engine 232, and/or the user interface 238. In some embodiments, providing the data object to the user can further include receiving answers which can be, for example, the inputs provided by the user in response to the assessment and/or answer data which answer data can be, for example, data generated based on the answers such as an indication of correct or incorrect answers, a score, an evaluation, or the like.

After the data object has been provided, the process 1300 proceeds to block 1312 wherein the user context is updated. In some embodiments, for example, the user context can be updated, by the processor 102 and/or the user device 106, according to the received answers and/or answer data. In some embodiments, the user context can be updated to reflect an aspect of user performance in traversing the connecting vector and/or in completing the terminal data object of the connecting vector. The user context can be updated by outputting one or several signals containing data indicative of an update to the user context to the one or several of the databases 104 containing the user context. This data is then used by the one or several databases 104 to update the user context.

The following flowcharts illustrate embodiments of processes for updating a connecting vector and/or for generating data used in updating the connecting vector. These processes can be performed as part of process 1300 depicted in FIG. 19 or separate from the process 1300 depicted in FIG. 19.

Figure 20:
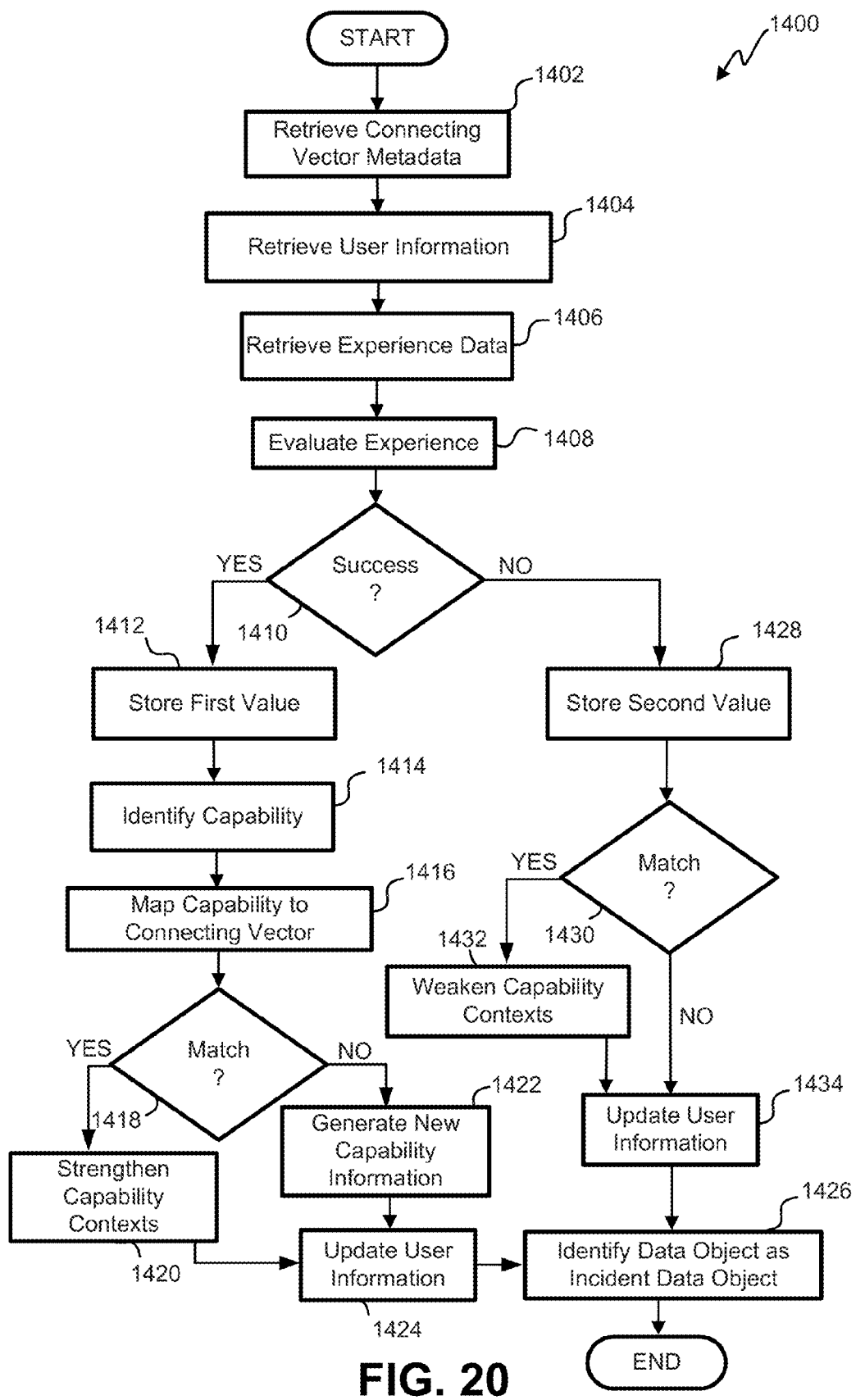
FIG. 20 is a flowchart illustrating one embodiment of a process for updating a user context based on the user outcome and a connecting vector context.

With reference now to FIG. 20, a flowchart illustrating one embodiment of a process 1400 for updating a user context based on a user outcome and a connecting vector context is shown. The process 1400 can be performed by the neural network content distribution system 100 or by a component thereof including, for example, the processor 102 and/or the user device 106. The process 1400 begins at block 1402 wherein connecting vector metadata is received. In some embodiments, the connecting vector metadata can be received from the vector database 152, and can include information identifying the strength, magnitude, direction, or other aspects of the vector. In some embodiments, the vector metadata can include information identifying a connecting vector context. The connecting vector context can comprise aggregated data relating to users who have traversed the connecting vector. In some embodiments, this information can include correlations between all or portions of the user context and outcomes of traversing the connecting vector. In some embodiments this information can include correlations between the learning style of the user and the expected level of success in traversing the connecting vector.

After the connecting vector metadata has been received, the process 1400 proceeds to block 1404 wherein user information is retrieved. In some embodiments, the user information can comprise user context information, which user context can identify a user's learning style, the user's current gaming objectives, and/or the user's learning performance history which can be, for example, biased for temporal significance. In some embodiments, the user context can be received from the user profile database 140.

After the user information has been retrieved, the process 1400 proceeds to block 1406 wherein experience data is retrieved. In some embodiments, the experience data can identify the user experience in traversing the connecting vector. Specifically, the experience data can identify the success and/or degree of success of the user in traversing the connecting vector, the speed with which the user traversed the connecting vector, or the like. In some embodiments, the experience data can be retrieved from the user device 106 and/or the data source 108.

After the experience data has been retrieved, the process 1400 proceeds to block 1408 wherein the user experience is evaluated. In some embodiments, the evaluation of the user experience can be performed by the processor 102 and/or by the user device 106. In some embodiments, this evaluation can include determining whether the user successfully traversed the connecting vector and successfully completed material associated with the data object. After the user's experience with the connecting vector has been evaluated, the process 1400 proceeds to decision state 1410 wherein it is determined if the user successfully traversed the connecting vector. In some embodiments, this determination can be made by the processor 102 or the user device 106. In some embodiments, the determination of the user success can include associating a value, according to a Boolean function, with the user. In such an embodiment, a first value can be associated with the user if the user successfully traversed the connecting vector, and a second value can be associated with the user if the user did not successfully traverse the connecting vector.

If it is determined that the user successfully traversed the connecting vector, then the process 1400 proceeds to block 1412 wherein the first value is stored. In some embodiments, the first value can be stored in one of the databases 104 including, for example, the user profile database 140. After the first value has been stored, the process 1400 proceeds to block 1414 wherein the capability of the user is identified. In some embodiments, the identification of the capability the user can include retrieving information from the user context identifying the user's learning style and/or the user's historic learning experiences. In some embodiments, this information can identify how a user learns, best modes for the user to learn, subject matter abilities or difficulties, or the like. In some embodiments, this identification can be performed by the processor 102, by the user device 106, or by a component of either of these.

After the capability of the user is identified, the process 1400 proceeds to block 1416 wherein the capability of the user is mapped to the connecting vector, and specifically to the connecting vector metadata including the connecting vector context. In some embodiments, this step can include determining whether aspects of the user context, and specifically the user learning style correspond with information generated by users that have previously traversed the connecting vector. In one embodiment, for example, this can include determining whether previously traversing users had the same learning style and/or same or similar learning context as the current traversing user. In some embodiments, this mapping can be performed by the processor 102 and/or by the user device 106.

After the capability of the user has been mapped to the connecting vector, the process 1400 proceeds to decision state 1418 wherein it is determined if the user capability, and particularly, if the user learning style corresponds to the learning styles of users who successfully traversed the connecting vector. This determination can be made, in some embodiments, by the processor 102 and/or by the user device 106. If it is determined that there is a match, then the process 1400 proceeds to block 1420 wherein the user contexts are strengthened. In some embodiments, this can include strengthening the aspects of the user context that relate to one or several learning styles. In some embodiments, for example, the strength of the user context can be increased by positively incrementing a value associated with the user context.

Returning again to decision state 1418, if it is determined that the user capability does not correspond to the learning styles of users who have successfully traversed the connecting vector, the process 1400 proceeds to block 1422, wherein new capability information is generated. In some embodiments, the new capability information can be information that relates to one or several learning styles, and can be information that can be added to the user context that can be, for example, stored in the user profile database 140. In some embodiments, the new capability information can correspond to the learning styles of users that have successfully traversed the current connecting vector. In some embodiments, the new capability information can be generated by the processor 102 and/or the user device 106.

After the new capability information has been generated, or, returning again to block 1420, after the capability contexts have been strengthened, the process 1400 proceeds to block 1424 wherein user information is updated. In some embodiments, the user information can be updated by storing information relating to the strengthening of capability contexts and/or to new capability information in the user profile database 140 via, for example, the outputting of this information to the user profile database 140. After this information has been updated, the process 1400 proceeds to block 1426 wherein the completed data object of the traversed connecting vector is identified as a new incident data object. In some embodiments, this can include associating a value with the completed data object, and storing this value in, for example, the user profile database 140. In some embodiments, this step can further include identifying a new terminal data object and the therewith associated connecting vector. In some embodiments, this identification can be performed by the processor 102 or the user device 106, and can be based on information contained within one or more of the databases 104.

Returning again to decision state 1410, if it is determined that the user did not successfully traverse the connecting vector, then the process 1400 proceeds to block 1428 wherein the second value is stored. In some embodiments, the second value can be stored in one of the databases 104 including, for example, the user profile database 140.

After the second value has been stored, the process 1400 proceeds to decision state 1430 wherein it is determined if the capability of the user that currently traversed the connecting vector, and particularly, if that user's learning style corresponds to the learning styles of users who previously successfully traversed the connecting vector. In some embodiments, this can include identifying the capability of the user as discussed in block 1414 and/or mapping the capability of the user to the connecting vector, and particularly to the context of the connecting vector as discussed in block 1416. This determination can be made, in some embodiments, by the processor 102 and/or by the user device 106. If it is determined that there is a match between the capability of the user that currently traversed the connecting vector and users that previously successfully traversed the connecting vector, then the process 1400 proceeds to block 1432 wherein the user context of the user that currently traversed the connecting vector is weakened. In some embodiments, this can include weakening aspects of the user context indicative of one or several learning styles. In some embodiments, this weakening can include decrementing a value associated with the user context.

After the user context has been weakened, or, returning again to decision state 1430, if it is determined that there is not a match between the user context of the user that currently traversed the connecting vector and users that previously successfully traversed the connecting vector, then the process 1400 proceeds to block 1434 wherein user information is updated. In some embodiments, for example, this can include updating the user context to reflect the failure of the user in traversing the connecting vector. In some embodiments, for example, this can further include updating the user context to reflect the weakening of block 1432. This updating can include the outputting of data indicative of the update of the user context to the one or several of the databases 104 containing the user context. The one or several recipient databases 104 can then use this information to update the user context.

After the user information has been updated, the process 1400 proceeds to block 1426 wherein the completed gaming objective is identified as an incident gaming objective and the new terminal gaming objective and the associated connecting vector is identified. In some embodiments, this identification can be performed by the processor 102 and/or the user device 106 and can be based on information contained within one or more of the databases 104.

Figure 21:
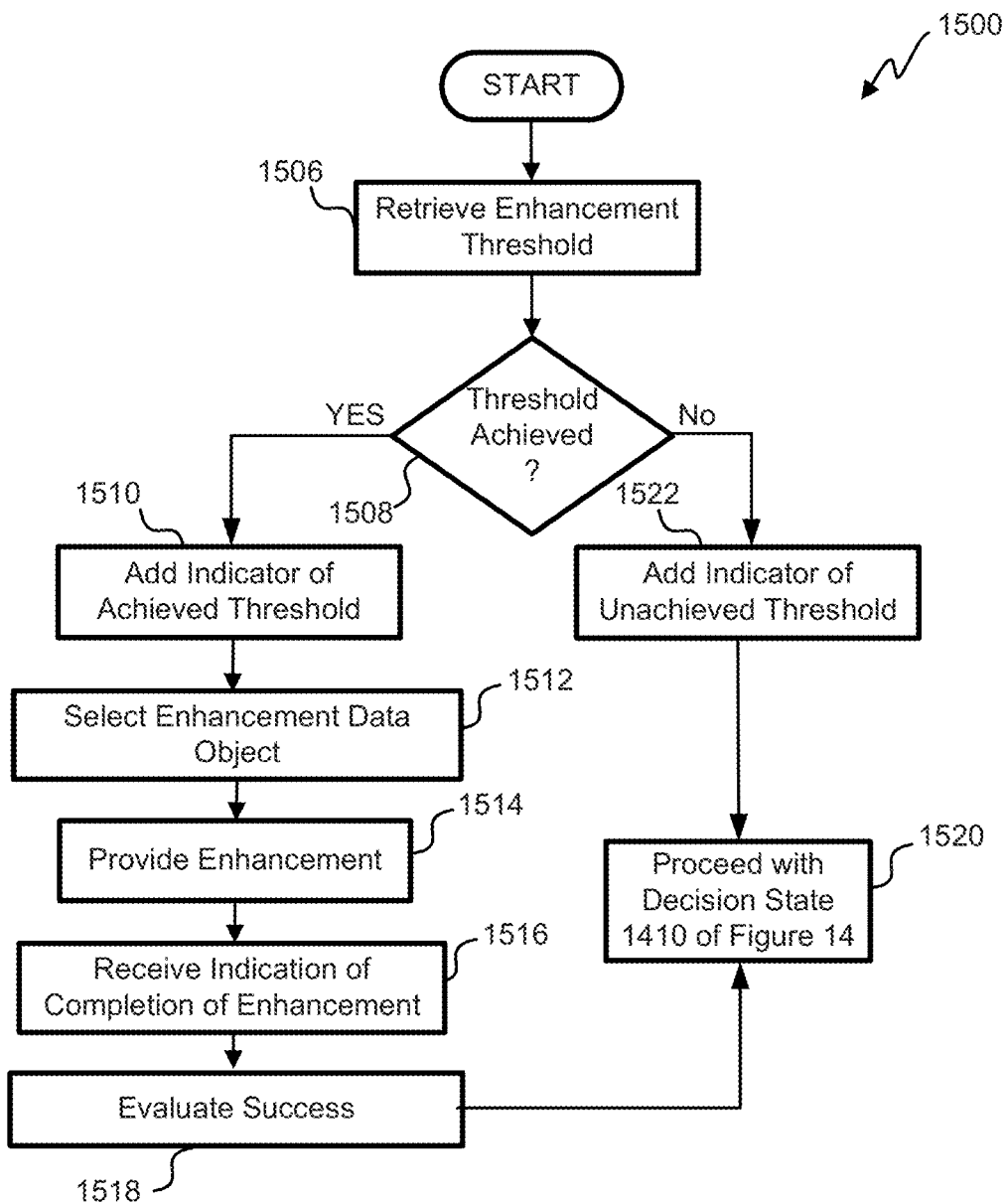
FIG. 21 is a flowchart illustrating one embodiment of a process for providing education enhancement to a user.

With reference now to FIG. 21, a flowchart illustrating one embodiment of a process 1500 for providing education enhancement is shown. In some embodiments, the process 1500 can be performed when a user's progress through data objects exceeds a threshold. In such embodiments, this exceeding of the threshold indicates that the user has additional learning capacity. In some embodiments, this threshold can be a speed threshold indicating that the user is rapidly progressing through subject matter associated with one or several data objects, and in some embodiments, the threshold can be an accuracy threshold indicating a high degree of user comprehension of the subject matter of the data objects. In some embodiments, the threshold can be triggered based on user performance with respect to a single data object, and in some embodiments, the threshold can be triggered based on user performance within a path comprising a plurality of data objects. Thus, in one embodiment, if the speed with which the user completes a single connecting vector, or completes a group of connecting vectors exceeds a threshold, the user can be designated for enhancement. In some embodiments, for example, the enhancement designation can occur without user input, and in some embodiments, the enhancement designation can include user input. Thus, in some embodiments, the user can choose whether to receive an enhancement data object. The process 1500 can be performed as a part of process 1400 depicted in FIG. 20, and specifically after the step of block 1408 of FIG. 20. The process 1500 can be performed by the neural network content distribution system 100 and/or by a component thereof including, for example, the processor 102 or the user device 106.

The process 1500 begins at block 1506 wherein an enhancement threshold is retrieved. The enhancement threshold can define the boundary that when, surpassed, identifies a user as qualifying for an enhancement. In some embodiments, and as discussed above, the enhancement can include the providing of one or several additional data objects, which data objects are not included in the path. In some embodiments, the enhancement threshold can define an accuracy, a velocity, or any other indicator of user performance. In one embodiment, for example, the enhancement threshold can specify a velocity for completion of the data object and/or a degree of success for completion of a data object. In some embodiments, for example, when a user completes the data object with a velocity higher than the threshold value and/or with a degree of success higher than the threshold value, the neural network content distribution system 100 can recommend enhancement.

In some embodiments, the enhancement threshold can be retrieved from one of the databases 104 such as, for example, the object database 144. In some embodiments, the enhancement threshold can be associated with a single data object, and in some embodiments, the enhancement threshold can be associated with the plurality of data objects. Thus, in some embodiments, an enhancement threshold is retrieved that is specific to the currently traversed data object, and in some embodiments, an enhancement threshold is retrieved that is nonspecific to the currently traversed data object.

After the enhancement threshold has been retrieved, the process 1500 proceeds to decision state 1508 wherein it is determined if the enhancement threshold has been achieved. In some embodiments, for example, this can include comparing experience data with the enhancement threshold. In some embodiments, a binary value can be associated with the user experience data so as to indicate whether the threshold has been achieved. In one embodiment, for example, the determination of whether the threshold has been achieved can be performed according to a Boolean function wherein a first value is assigned if the threshold has been triggered and a second value is assigned if the threshold is not triggered. In some embodiments, this determination can be made by the processor 102 and/or the user device 106.

If it is determined that the threshold has been achieved, then the process 1500 proceeds to block 1510 wherein an indicator of the achieved threshold is added. In some embodiments, for example, this can include the storing of the first value assigned according to the Boolean function in one of the databases 104 such as, for example, in the user profile database 140.

After the indicator of the achieved threshold has been added, the process 1500 proceeds to block 1512 wherein the enhancement data object is selected. In some embodiments, the enhancement data object can be selected in a variety of manners. In some embodiments the enhancement data object can comprise the same subject matter as the currently traversed connecting vector and the currently completed data object, and in some embodiments, the enhancement data object can comprise subject matter different than that of the currently traversed connecting vector. In some embodiments, the enhancement data object can comprise the same subject matter as the currently completed data object, but can have, for example, an increased quantile and/or lexile level. In some embodiments, the enhancement data object can comprise information related to the subject matter of the currently traversed connecting vector and the currently completed data object such as, for example, in the event that the currently completed data object is a non-history topic, the enhancement data object may include history relating to the subject matter of the currently completed data object. Thus, in some embodiments, the enhancement data object can provide information that is relevant to and/or related to the subject matter of the currently completed data object, but which information is not included in the current path.

The enhancement data object can be selected in a variety of ways. In some embodiments, the enhancement data object can be stochastically selected, and in some embodiments, the enhancement data object can be selected based on the user context. Thus, in one embodiment, the enhancement data object can be selected to facilitate the user's improvement in either expanding the user's learning styles, expanding the user's skills, and/or the like. In one embodiment, for example, the neural network content distribution system 100 can analyze a user context to identify a weakness in the user skills and the enhancement data objective can be selected so as to strengthen and/or improve this user weakness. In some embodiments, the enhancement data object can be selected by, for example, the processor 102 and/or the user device 106.

After the enhancement data object has been selected, the process 1500 proceeds to block 1514 wherein the enhancement data object is provided. In some embodiments, the enhancement data object can be provided to the user via the user device 106, and specifically via the user interface 238 of the user device 106. After the enhancement data object has been provided, the process 1500 proceeds to block 1516 wherein an indication of the completion of the enhancement and/or the traversal of the enhancement vector is received. In some embodiments, this indication can be received by and/or from the user device 106 and can be provided to the other components of the neural network content distribution system 100. In some embodiments, this indication can comprise an indication that the user received the learning material of one or several content objects of the enhancement data object. In one embodiment, for example, the indication can comprise one or several answers provided in response to the content of the assessment object of the enhancement data object.

After the indication of the completion of the enhancement object has been received, the process 1500 proceeds to block 1518 wherein the user success is evaluated. In some embodiments, the user success can be evaluated by comparing the indication of the completion of the enhancement data object to answer data stored within one of the databases 104 such as, for example, the object database 144. In some embodiments, a score can be generated based on the number of questions that the user correctly answered and/or the level of accuracy provided by the user in response to the prompts of the assessment object.

After the user success has been evaluated, the process 1500 proceeds to block 1520 and proceeds with block 1410 of FIG. 20. In some embodiments, for example, the process of FIG. 20 can be performed to update the user context with both information from the completed data object that gave rise to the enhancement, as well as with the information from the completion of the enhancement data object.

Returning again to decision state 1508, if it is determined that the threshold has not been achieved, then the process 1500 proceeds to block 1522 wherein an indicator of the unachieved threshold is added. In some embodiments, for example, this can include the storing of the second value assigned according to the Boolean function in one of the databases 104 such as, for example, the user profile database 140. After the indicator of the non-achievement of the threshold has been added, the process 1500 proceeds to block 1520 and continues with block 1410 of FIG. 20. In some embodiments, for example, the remaining steps of the process of FIG. 20 can be performed to update the user context with both information from the completed data object that gave rise to the enhancement, as well as with the information from the completion of the enhancement data object.

Figure 22:
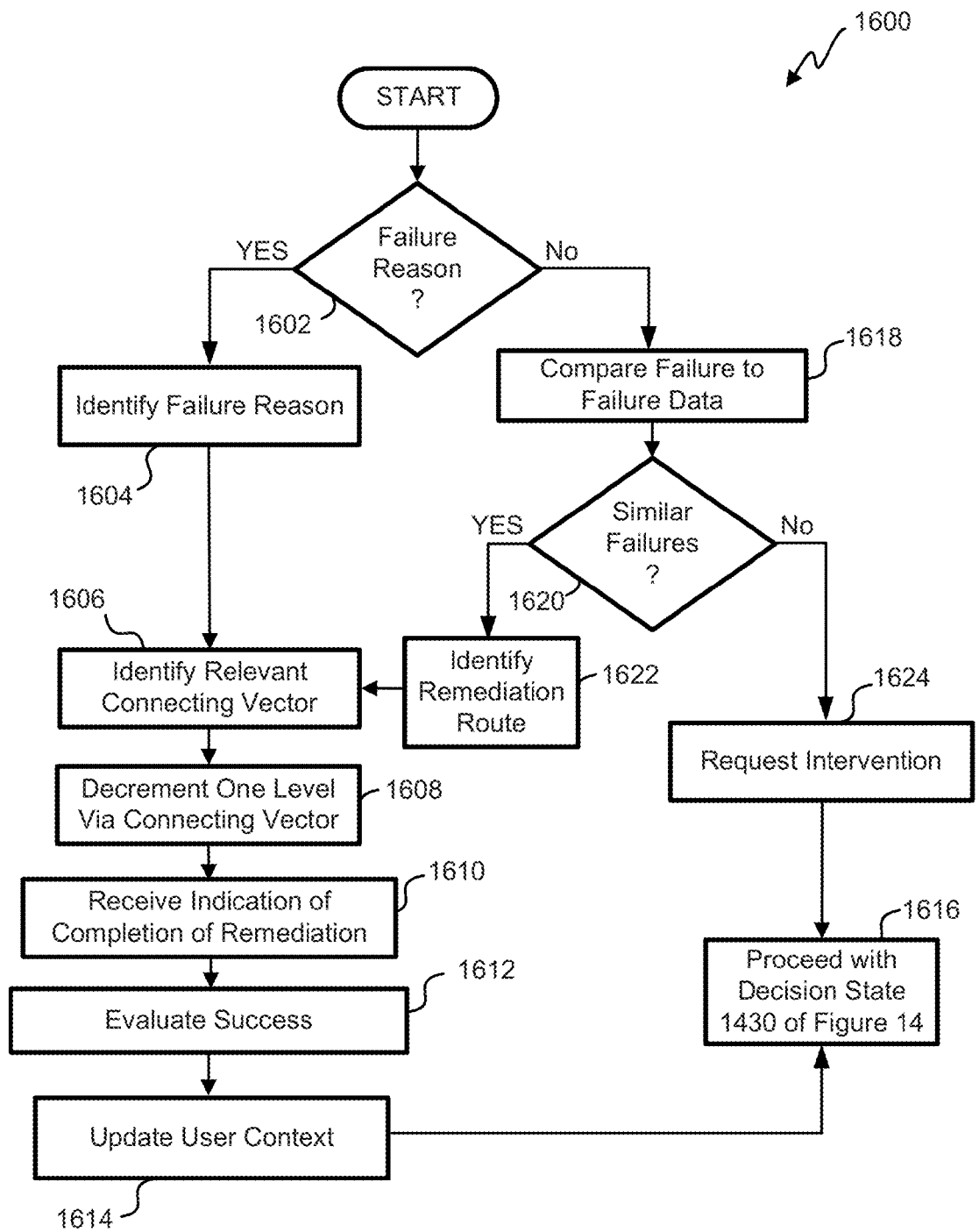
FIG. 22 is a flowchart illustrating one embodiment of a process for providing remediation to a user.

With reference now to FIG. 22, flowchart illustrating one embodiment of a process 1600 for providing remediation to a user is shown. In some embodiments, the process 1600 can be performed in response to a user failure with respect to one or several data objects. The failure with respect to one or several data objects can take a variety of forms. In one embodiment, for example, the failure can be based on responses provided to one or several assessment objects. The process 1600 can be performed by the neural network content distribution system 100 and/or a component thereof including, for example, the processor 102 and/or the user device 106.

The process begins at decision state 1602 wherein it is determined if there is an identifiable failure reason. In some embodiments, for example, a user may fail to complete a data objective based on, for example, a deficiency in unrelated subject matter such as a quantile and/or lexile deficiency, and in some embodiments, the user may fail based on a subject matter deficiency, such as, for example, failing to adequately master some or all prerequisite material. In some embodiments, this determination can be performed by the processor 102 and/or the user device 106.

If there is an identifiable failure reason, then the process 1600 proceeds to block 1604 wherein the failure reason is identified. In some embodiments, the failure reason can be identified by analysis of the user context and/or inputs provided in response to the assessment object. In some embodiments, the failure reason can be determined by analysis of information relating to the data object and/or the connecting vector such as the vector context which can be retrieved from, for example, the object database 144 and/or the vector database 152. In some embodiments, for example, a connecting vector and/or a data object can be associated with a lexile level and/or quantile level and in some embodiments, the determination of decision state 1602 can include a comparison of the quantile and/or lexile levels of the data object with context information relating to the data object and/or the connecting vector. In some embodiments, the determination of the failure reason can be performed by the processor 102 and/or the user device 106.

After the failure reason has been identified, the process 1600 proceeds to block 1606 wherein the relevant connecting vector is identified. In some embodiments, for example, the relevant connecting vector is the connecting vector that addresses the source of the failure. Thus, in some embodiments, the relevant connecting vector can correspond to a data object that will facilitate in increasing the quantile and/or lexile level of the user, and in some embodiments, the relevant connecting vector can correspond to a connecting vector that will facilitate increasing the user's comprehension of prerequisite subject matter. After the relevant connecting vector has been identified, the process 1600 proceeds to block 1608 wherein the user is stepped back to a lower level data object via the identified connecting vector. In some embodiments, for example, this can correspond to the user being stepped back to subject matter having a lower quantile and/or lexile level and/or being stepped back to a data object comprising prerequisite subject matter. In some embodiments, this step can further comprise providing the user with the decremented data object via, for example, the user interface 238 of the user device 106.

After the data object has been provided to the user, the process 1600 proceeds to block 1610 wherein an indication of the completion of the remediation data object is received. In some embodiments, the indication of the completion of the remediation data object is received via the user interface 238 of the user device 106. In some embodiments, and as discussed above with respect to block 1516 of FIG. 21, this indication can comprise user inputs provided in response to a prompt of one or several content objects of the data object including, for example, one or several assessment objects.

After the indication of the completion of the remediation data object is received, the process 1600 proceeds to block 1612 wherein the level of user success in completion of the remediation data object is evaluated. In some embodiments, the user success can be evaluated by comparing the indication of the completion of the remediation data object to answer data stored within one of the databases 104 such as, for example, the object database 144. In some embodiments, score can be generated based on the number of questions that the user correctly answered and/or the level of accuracy provided by the user in response to the prompts of the assessment object.

After the success of the user has been evaluated, the process proceeds to block 1614 wherein the user context is updated. In some embodiments, for example, the user context can be updated according to the process depicted in block 1410 through 1434 of FIG. 20. In some embodiments, the updated user context can further include the update of the vector context associated with the data object. After the user context has been updated, the process 1600 proceeds to block 1616 and continues with block 1430 of FIG. 20.

Returning again to decision state 1602, if it is determined that there is not an identifiable failure reason, then the process 1600 proceeds to block 1618 wherein the current failure of the user in traversing the connecting vector and in completing the data object is compared to failure data. In some embodiments, this failure data can be retrieved from one of the databases 104 such as, for example, the object database 144. In some embodiments, the failure data can comprise an identification of user contexts of users that failed to successfully traverse the connecting vector and complete the data object. In some embodiments, the comparison of the failure of the user in traversing the current connecting vector to the failure data can include retrieving a failure data from one of the databases 104, and specifically from the object database 144. In some embodiments, the comparison of the failure data to the current failure of the user to traverse the connecting vector can include the identification of any common traits and/or attributes of the user context of the user that currently failed to traverse the connecting vector with the user contexts of users who previously failed to traverse the connecting vector.

After information relating to the current user failure to traverse the connecting vector has been compared with failure data, the process 1600 proceeds to decision state 1620 wherein it is determined if similar failures are identified within failure data. In some embodiments, the similar failures can be identified based on commonalities between the user context of users who previously failed to traverse the connecting vector and the user context of the user who currently failed to traverse the connecting vector. In some embodiments, the determination can be made according to a Boolean function wherein a first value is associated with the experience data of the user who currently failed to traverse the connecting vector if that user shares commonalities with users who previously failed to successfully traverse the connecting vector, and wherein a second value is associated with the experience data of the user who currently failed to traverse the connecting vector if that user does not share commonalities with users who previously failed to traverse the connecting vector.

If it is determined that the user who currently failed to traverse the connecting vector shares commonalities with users that previously failed to successfully traverse the connecting vector, then the process 1600 proceeds to block 1622 and the remediation route is identified. In some embodiments, the remediation route can comprise one or several data objects that were used to remedy the failure of users who previously failed to traverse the connecting vector. After the remediation route is identified, the process 1600 proceeds to block 1606 and continues as outlined above.

Returning to decision state 1620, if it is determined that the user who currently failed to traverse the connecting vector does not share commonalities with users who previously failed to successfully traverse the connecting vector, the process 1600 proceeds to block 1624 wherein intervention is requested. In some embodiments, the intervention can comprise an intervention request that can include associating a value indicative of the request for intervention with the user experience information and adding the value indicative of the request for intervention to one of the databases 104 such as, for example, the user profile database 140. After the value indicative of the request for intervention has been associated with the user experience data, a request for information can be provided to the user via the user device 106. After the request for intervention has been made, the process 1600 proceeds to block 1616 and continues with block 1430 of FIG. 20.

Figure 23:
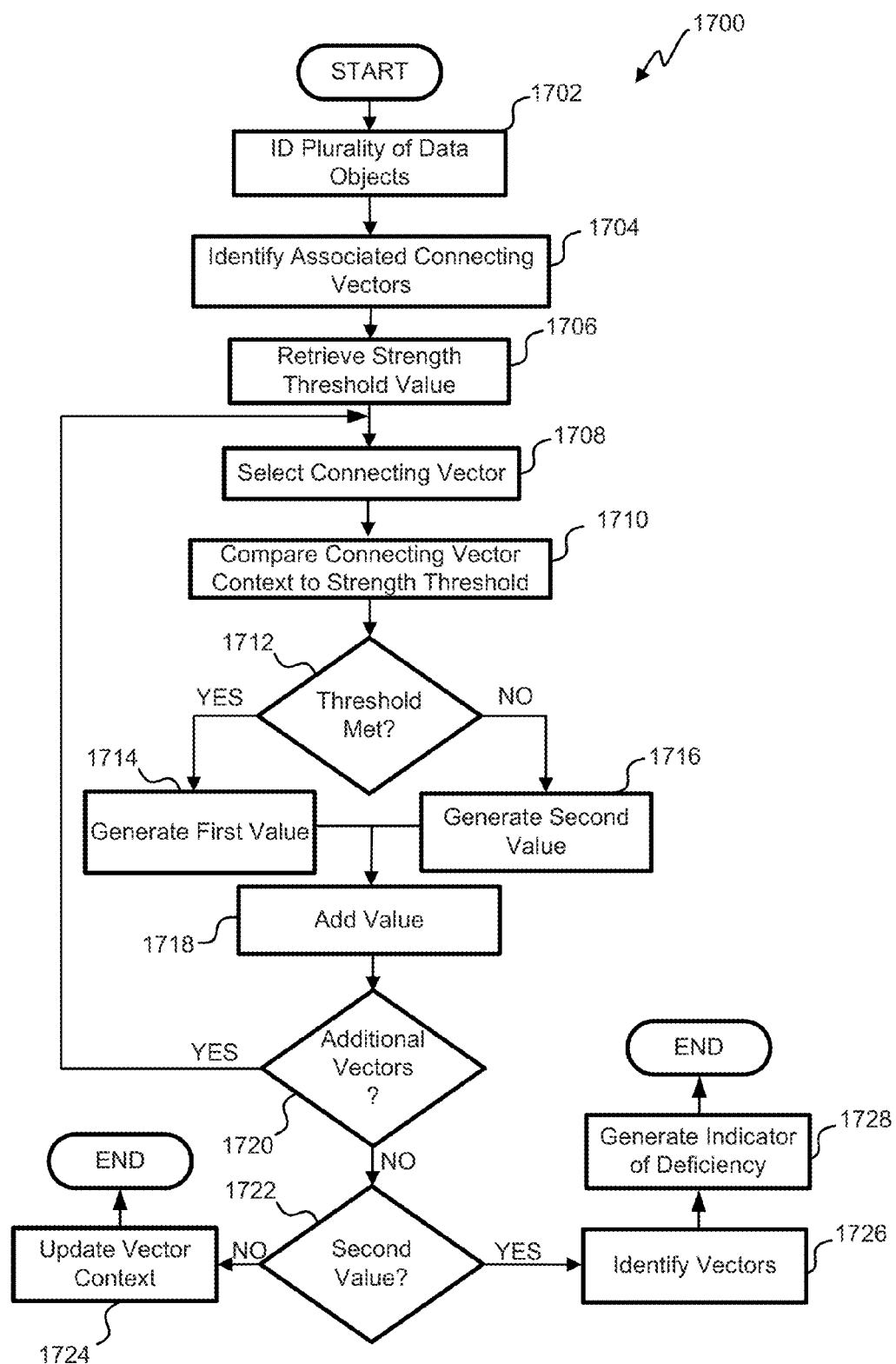
FIG. 23 is a flowchart illustrating one embodiment of a process for identifying a data object for improvement via comparison to a strength threshold.

With reference now to FIG. 23, a flowchart illustrating one embodiment of a process 1700 for optimizing a data object is shown. In some embodiments, the process 1700 can be used in connection with the object network 300 to identify data objects for optimization, improvement, and/or update. In some embodiments, the process 1700 can be performed by the neural network content distribution system 100 and/or a component thereof including, for example, the processor 102 and/or the user device 106. The process begins at block 1702 wherein a plurality of data objects is identified. In some embodiments, the plurality of data objects can correspond to a set of data objects that can include every data object within the object network 300, or can include a portion of the data objects within the object network 300.

The plurality of data objects can be identified in any desired manner. In some embodiments, for example, the plurality of data objects can be identified based on association with a subject matter, a skill, a learning ability, a learning style, a user, a teacher, or any other desired parameter. In one embodiment, for example, the plurality of data objects can be randomly selected from the data objects contained within the object network 300. In some embodiments, the processor 102 can identify a plurality of data objects by retrieving and using information relating to the data objects from the object database 144 and/or the vector database 152.

In some embodiments, identifying the plurality of data objects can include, for example, identifying the plurality of servers including, for example, databases 104 and/or data sources 108 that contain the desired data objects. After the servers storing the desired data objects are identified, identifying the plurality of data objects can include outputting a request to the identified servers for the desired data objects. In response to this request, the identified servers can provide a response such as, for example, providing information relating to the desired data objects to the server 102 and/or providing the desired data objects to the server 102.

After the plurality of data objects has been identified, the process 1700 proceeds to block 1704 wherein connecting vectors associated with the data objects are identified. In some embodiments, the connecting vectors associated with the data objects can include connecting vectors coming to the data objects and connecting vectors going from the data objects. In some embodiments, the processor 102 can identify the associated connecting vectors by retrieving and using information relating to the data objects from the object database 144 and/or the vector database 152. In some embodiments, this can also include identifying the one or several servers containing the connecting vectors and/or information relating thereto. In some embodiments, this can be, for example, the same one or several servers containing the data objects, and in some embodiments, this can be one or several different servers than those containing the data objects. In some embodiments, the one or several servers containing the connecting vectors can be identified through a series of queries and response, and the information relating to the connecting vectors and/or the connecting vectors can be provided to the server 102.

After the associated connecting vectors have been identified, the process 1700 proceeds to block 1706 wherein a strength threshold value is retrieved. In some embodiments, the strength threshold value can identify a minimum vector strength and/or vector magnitude that is acceptable. In some embodiments, the strength threshold value can be any value and can, in some embodiments, be selected based on a desired educational outcome. The strength threshold value can be retrieved by the processor 102 and/or the user device 106 from, for example, the evaluation database 156. In some embodiments, the strength threshold value can be retrieved by querying the evaluation database 156 for the strength threshold value, and, in response to the query, receiving an input containing the strength threshold value from the evaluation database 156.

After the strength threshold value has been retrieved, the process 1700 proceeds to block 1708 wherein a connecting vector is selected. In some embodiments, for example, the connecting vector can be randomly selected, and in some embodiments, the connecting vector can be selected according to a selection pattern. In one embodiment, for example, the data objects within the plurality of data objects can be assigned a value based on the skill and/or knowledge level associated with each of the data objects, based on the prerequisite relationships between the data objects, or the like. In some embodiments, the connecting vector can be selected based on its skill and the/or knowledge level, based on a prerequisite relationship, or in any other desired fashion. In some embodiments, a connecting vector can be selected that is one of the identified associated connecting vectors and that has not been analyzed as part of process 1700 and/or for which a condition has been met such as, for example, a specified amount of time has not passed since the last time the connecting vector was analyzed as part of process 1700.

After the connecting vector has been selected, the process 1700 proceeds to block 1710 wherein aspects of the connecting vector context are compared to the strength threshold. In some embodiments, the comparison of aspects of the connecting vector context can include the retrieval of the connecting vector context from the vector database 152 and the identification and selection of connecting vector context information relevant to the strength threshold value. In some embodiments, for example, the relevant aspects of the connecting vector context can include, the vector strength, the vector strength as a function of user context, the vector magnitude, the vector magnitude as a function a user context, or the like. After the vector context information has been retrieved, and, if desired, relevant aspects of the vector context data have been identified, the vector context data can be compared to the strength threshold value according to a Boolean function. This comparison can be performed by the processor 102 and/or by the user device 106.

After the connecting vector context has been compared to the strength threshold, the process 1700 proceeds to decision state 1712 wherein it is determined if the threshold is met. In some embodiments, this determination can be made by the processor 102 and/or the user device 106. If it is determined that the threshold has been met, then the process 1700 proceeds to block 1714 wherein a first, true value indicative of the threshold being met is generated, and in some embodiments, if it is determined that the threshold has not been met, then the process 1700 proceeds to block 1716 wherein a second, false value indicative of the threshold not being met is generated.

After either the first or the second value has been generated, the process 1700 proceeds to block 1718 wherein the generated value is added to the vector context data for the therewith associated connecting vector. In some embodiments, this value can be added to one of the databases 104 including, for example, the vector database 152. After the value has been added, the process 1700 proceeds to decision state 1720 wherein it is determined if there are additional vectors. In some embodiments, this can include determining if all of the connecting vectors have been compared to the strength threshold value, or if any of the connecting vectors have not been compared to the strength threshold value. In some embodiments, this determination can be made by identifying the connecting vectors associated with the plurality of data objects, retrieving the vector context information for the identified connecting vectors, and determining if any of the identified connecting vectors is not associated with either the first or the second value. If additional connecting vectors are identified, or in one embodiment, if a connecting vector is identified that is not associated with either the first or the second value, then the process 1700 returns to block 1708 and continues as outlined above.

Returning again to decision state 1720, if no additional connecting vector is identified, or in one embodiment, it is determined that all of the connecting vectors are associated with either the first or the second value, then the process 1700 proceeds to decision state 1722 wherein it is determined if any of the connecting vectors did not meet the strength threshold. In some embodiments, this can include identifying connecting vectors associated with the plurality of data objects and determining if any of those connecting vectors is associated with the second value. If none of the connecting vectors are associated with the second value, then the process 1700 proceeds to block 1724 wherein the connecting vector context is updated. In some embodiments, for example, the connecting vector context can be updated with a value indicating the comparison of the data object to the strength threshold. In some embodiments, this value can identify a time and/or date of the comparison of the data object to the strength threshold, can identify the level of the aspect of the connecting vector context compared to the strength threshold, and/or the number of users who had traversed the connecting vector at the time of the comparison of the connecting vector context to the strength threshold value. In some embodiments, this value can be stored in the vector database 152.

Returning again to decision state 1722, if it is determined that second value has been added to one or several of the connecting vectors associated with the identified data objects, then the process 1700 proceeds to block 1726 wherein those connecting vectors are identified. In some embodiments, the connecting vectors can be identified by the processor 102 and/or by the user device 106 by retrieving the connecting vector context information from the vector database 152 and searching the connecting vector context information for the second value. In some embodiments, connecting vectors associated with the second value can be added to a database of inadequate connecting vectors. In some embodiments, this database of the inadequate connecting vectors can be a sub database within the vector database 152. In some embodiments, inadequate connecting vectors can be prioritized within the sub database such that connecting vectors failing to meet the strength threshold by the greatest margin are identifiable.

After connecting vectors have been identified that are associated with the second value, then the process 1700 proceeds to block 1728 wherein an indicator of the deficiency of the connecting vector is generated. In some embodiments, this indicator can be, for example, a message identifying one or several inadequate connecting vectors. This message can be generated by the processor 102 and/or the user device and can be provided to a user via the user interface 238 and/or be provided to a data source 108 such as an educational resource 108-A. In some embodiments, this indicator of the deficiency of the connecting vector can be used as a prompt to modify and/or update the terminal data object of the connecting vector and/or to evaluate the prerequisite relationship between the incident data object in the terminal data objects connected by the identified connecting vector. This indicator of deficiency can be output to one of the databases 104, and can be, for example, stored in the object database of the recipient one of the databases 104. In some embodiments, this indicator can be provided to one of the data servers 108, and specifically to the content server 108-A.

Figure 24:
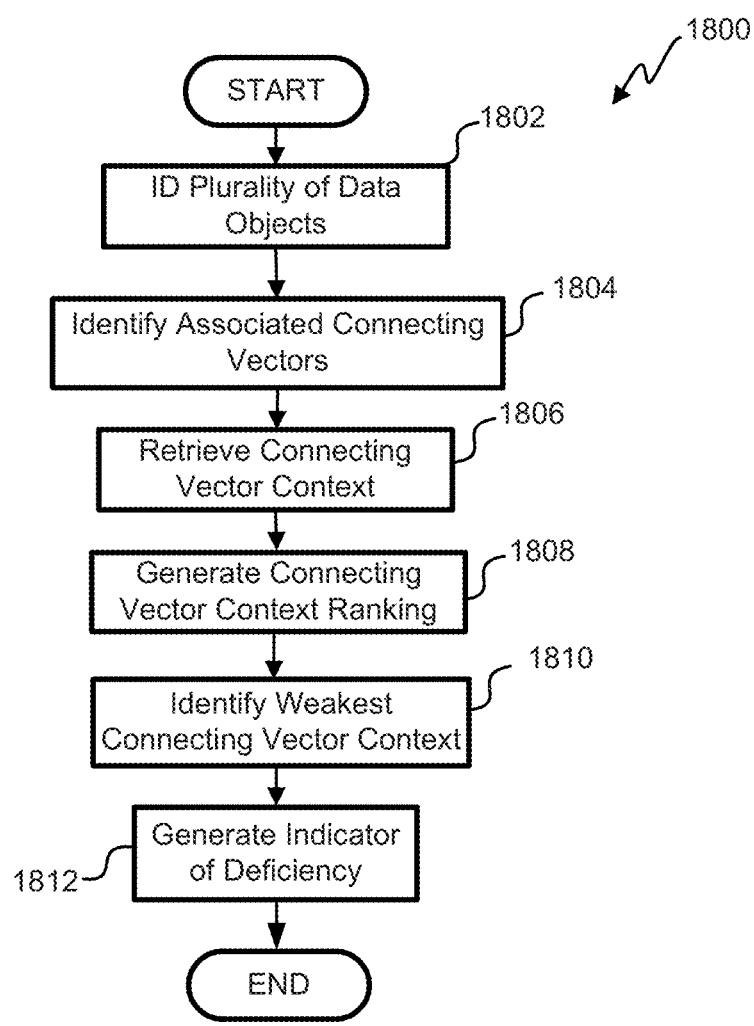
FIG. 24 is a flowchart illustrating one embodiment of a process for identifying a data object for improvement via relative ranking.

With reference now to FIG. 24, a flowchart illustrating one embodiment of a process 1800 for optimizing a data object is shown. In some embodiments, the process 1800 can be used in connection with the object network 300 to identify data objects for optimization, improvement, and/or update. In some embodiments, the process 1800 can be performed by the neural network content distribution system 100 and/or a component thereof including, for example, the processor 102 and/or the user device 106. The process begins at block 1802 wherein a plurality of data objects is identified. In some embodiments, the plurality of data objects can correspond to a set of data objects that can include every data object within the object network 300, or can include a portion of the data objects within the object network 300.

The plurality of data objects can be identified in any desired manner. In some embodiments, for example, the plurality of data objects can be identified based on association with a subject matter, a skill, a learning ability, a learning style, a user, a teacher, or any other desired parameter. In one embodiment, for example, the plurality of data objects can be randomly selected from the data objects contained within the object network 300. In some embodiments, the processor 102 can identify a plurality of data objects by retrieving and using information relating to the data objects from the object database 144 and/or the vector database 152.

In some embodiments, identifying the plurality of data objects can include, for example, identifying the plurality of servers including, for example, databases 104 and/or data sources 108 that contain the desired data objects. After the servers storing the desired data objects are identified, identifying the plurality of data objects can include outputting a request to the identified servers for the desired data objects. In response to this request, the identified servers can provide a response such as, for example, providing information relating to the desired data objects to the server 102 and/or providing the desired data objects to the server 102.

After the plurality of data objects has been identified, the process 1800 proceeds to block 1804 wherein connecting vectors associated with the data objects are identified. In some embodiments, the connecting vectors associated with the data objects can include connecting vectors coming to the data objects and connecting vectors going from the data objects. In some embodiments, the processor 102 can identify the associated connecting vectors by retrieving and using information relating to the data objects from the object database 144 and/or the vector database 152. In some embodiments, this can also include identifying the one or several servers containing the connecting vectors and/or information relating thereto. In some embodiments, this can be, for example, the same one or several servers containing the data objects, and in some embodiments, this can be one or several different servers than those containing the data objects. In some embodiments, the one or several servers containing the connecting vectors can be identified through a series of queries and response, and the information relating to the connecting vectors and/or the connecting vectors can be provided to the server 102.

After the associated connecting vectors have been identified, the process 1800 proceeds to block 1806 wherein connecting vector context information is retrieved. In some embodiments, this connecting vector context information can identify the effectiveness of the connecting vector and/or of the therewith associated data objects. In some embodiments, this effectiveness can describe the likelihood of the successful traversal of the connecting vector by a user/student. The connecting vector contexts can be retrieved from one or several of the databases 104, and specifically can be retrieved from one or several databases of the one or several databases 104 such as, for example, the vector database 152. In some embodiments, the retrieval of the connecting vector contexts can comprise one or several queries by the server 102 and/or the user device 106 and one or several responses by the one or several databases 104. In some embodiments, these one or several responses can comprise the outputting of one or several electric signals containing and/or encoding the connecting vector contexts.

After the connecting vector contexts have been retrieved, the process 1800 proceeds to block 1808 wherein a connecting vector context ranking is generated. In some embodiments, this can include, the aggregation of all of the connecting vector contexts, and the comparison of the connecting vector contexts such as, for example a comparison of pairs of connecting vector contexts. In some embodiments, values indicative of the relative ranking of the connecting vector contexts can be associated with some or all of the connecting vector contexts. In some embodiments, these values can be outputted from the server 102 to one of the databases 104 to be stored in one of the databases of the database server such as, for example, the vector database 152.

After a ranking of the connecting vector contexts has been generated, the process 1800 proceeds to block 1810, wherein the weakest connecting vector context is identified. In some embodiments, the weakest connecting vector context is the lowest ranked of the connecting vector contexts, and/or is the connecting vector context associated with a value indicative of the lowest relative ranking and/or of the greatest weakness.

After the weakest connecting vector context has been identified, the process 1800 proceeds to block 1812, wherein an indicator of the deficiency of the connecting vector associated with the weakest connecting vector context is generated. In some embodiments, this indicator can be, for example, a message identifying one or several inadequate connecting vectors. This message can be generated by the processor 102 and/or the user device and can be provided to a user via the user interface 238 and/or be provided to a data source 108 such as an educational resource 108-A. In some embodiments, this indicator of the deficiency of the connecting vector can be used as a prompt to modify and/or update the terminal data object of the connecting vector and/or to evaluate the prerequisite relationship between the incident data object in the terminal data objects connected by the identified connecting vector. This indicator of deficiency can be output to one of the databases 104, and can be, for example, stored in the object database of the recipient one of the databases 104. In some embodiments, this indicator can be provided to one of the data servers 108, and specifically to the content server 108-A.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A machine learning system for generating a request for improvement of a data object in a neural network, the system comprising:
　a database server comprising:
　　a plurality of data objects comprising an aggregation of content associated with an assessment, wherein the plurality of data objects are included in a neural network;
　　information associated with the data objects and identifying an aspect of the therewith associated data object;
　a supervisor device configured to remotely access the database server and to edit one or several of the plurality of data objects;
　a content management server configured to:
　　identify a set of the plurality of data objects;
　　output a query requesting information relating to at least one of the set of the plurality of data objects from the database server;
　　identify a plurality of connecting vectors, wherein each of the plurality of connecting vectors connects two of the set of the plurality of data objects in a prerequisite relationship, wherein each of the plurality of connecting vectors comprises a direction identifying the hierarchy of the prerequisite relationship and a magnitude, wherein the magnitude of at least one of the plurality of connecting vector is the aggregate of binary indicators based on a user experience with the at least one of the plurality of connecting vectors generated via machine learning from iterated traversals of the connecting vector;
　　determine a deficiency in the content of at least one of the data objects based on the magnitude of at least one connecting vector of the at least one of the data objects; and
　　alert the supervisor device to trigger modification of the at least one of the data objects having a determined deficiency.

2. The machine learning system of claim 1, wherein determining a deficiency in the content of at least one of the data objects based on the magnitude of at least one connecting vector of the at least one of the data objects comprises:
　retrieving a strength threshold value, wherein the strength threshold value indicates a minimum acceptable strength; and
　comparing the magnitude of at least some of the plurality of connecting vectors to the strength threshold value.

3. The machine learning system of claim 2, wherein determining a deficiency in the content of at least one of the data objects based on the magnitude of at least one connecting vector of the at least one of the data objects comprises assigning a value to the connecting vectors of the plurality of connecting vectors according to a Boolean function, wherein a first value is assigned to one of the connecting vectors of the plurality of connecting vectors if the strength of the one of the connecting vectors of the plurality of connecting vectors exceeds the strength threshold value, and a second value is assigned to one of the connecting vectors of the plurality of connecting vectors if the strength of the one of the connecting vectors of the plurality of connecting vectors does not exceed the strength threshold value.

4. The machine learning system of claim 3, wherein the content management server is further configured to output a message indicating a deficiency in the at least one of the data objects if the connecting vector associated with the data object is assigned the second value.

5. The machine learning system of claim 4, wherein the content management server is further configured to identify connecting vectors assigned the second value.

6. The machine learning system of claim 5, wherein the content management server is further configured to relatively rank the plurality of connecting vectors.

7. The machine learning system of claim 6, wherein the content management server relatively ranks the plurality of connecting vectors according to the degree to which users successfully traverse the plurality of connecting vectors.

8. The machine learning system of claim 7, wherein the strength threshold value identifies a minimum acceptable relative rank.

9. The machine learning system of claim 1, wherein the content management server is configured to identify a set of the plurality of connecting vectors, wherein the connecting vectors in the set of the plurality of connecting vectors have stabilized.

10. The machine learning system of claim 9, wherein determining a deficiency in the content of the at least one of the data objects based on the magnitude of at least one connecting vector of the at least one of the data objects comprises selecting at least one of the connecting vectors from the set of the plurality of connecting vectors and identifying the at least one of the data objects that is connected by the connecting vector.

11. A method of generating a request for improvement of a data object in a neural network, the method comprising:
identifying a plurality of data objects stored in at least one database, wherein each of the data objects comprises an aggregation of content associated with an assessment, wherein the plurality of data objects are included in a neural network;
identifying a plurality of connecting vectors stored in at least one vector database, wherein each of the plurality of connecting vectors connects two of the plurality of data objects and identifies a prerequisite relationship between the connected two of the plurality of data objects, wherein each of the plurality of connecting vectors comprises a direction identifying the prerequisite relationship and a magnitude, wherein the magnitude of at least one of the plurality of connecting vector is the aggregate of binary indicators based on a user experience with the at least one of the plurality of connecting vectors generated via machine learning from iterated traversals of the connecting vector; and
determining a deficiency in the content of at least one of the data objects based on the magnitude of at least one connecting vector of the at least one of the data objects.

12. The method of generating a request for improvement of a data object in a neural network of claim 11, wherein determining a deficiency in the content of at least one of the data objects based on the magnitude of at least one connecting vector of the at least one of the data objects comprises:
retrieving a strength threshold value, wherein the strength threshold value indicates a minimum acceptable strength; and
comparing the magnitude of at least some of the plurality of connecting vectors to the strength threshold value.

13. The method of generating a request for improvement of a data object in a neural network of claim 12, wherein determining a deficiency in the content of at least one of the data objects based on the magnitude of at least one connecting vector of the at least one of the data objects comprises assigning a value to the connecting vectors of the plurality of connecting vectors according to a Boolean function, wherein a first value is assigned to one of the connecting vectors of the plurality of connecting vectors if the strength of the one of the connecting vectors of the plurality of connecting vectors exceeds the strength threshold value, and a second value is assigned to one of the connecting vectors of the plurality of connecting vectors if the strength of the one of the connecting vectors of the plurality of connecting vectors does not exceed the strength threshold value.

14. The method of generating a request for improvement of a data object in a neural network of claim 13, further comprising outputting a message indicating a deficiency in a data object if the connecting vector associated with the data object is assigned the second value.

15. The method of generating a request for improvement of a data object in a neural network of claim 14, wherein the binary indicators are generated for successful traversal of the connecting vector and for failed traversals of the connecting vector.

16. The method of generating a request for improvement of a data object in a neural network of claim 15, further comprising identifying connecting vectors assigned the second value.

17. The method of generating a request for improvement of a data object in a neural network of claim 16, further comprising relatively ranking the plurality of connecting vectors.

18. The method of generating a request for improvement of a data object in a neural network of claim 17, wherein the plurality of connecting vector are relatively ranked according to the degree to which students successfully traverse the plurality of connecting vectors.

19. The method of generating a request for improvement of a data object in a neural network of claim 18, wherein the strength threshold value identifies a minimum acceptable relative rank.

20. The method of generating a request for improvement of a data object in a neural network of claim 11, further comprising:
identifying a set of the plurality of connecting vectors, wherein the connecting vectors in the set of the plurality of connecting vectors have stabilized,
wherein determining a deficiency in the content of the at least one of the data objects based on the magnitude of at least one connecting vector of the at least one of the data objects comprises selecting at least one of the connecting vectors from the set of the plurality of connecting vectors and identifying the at least one of the data objects that is connected by the connecting vector.

* * * * *